United States Patent
Takenaka et al.

(10) Patent No.: US 7,319,302 B2
(45) Date of Patent: Jan. 15, 2008

(54) GATE GENERATING SYSTEM FOR MOBILE ROBOT

(75) Inventors: Toru Takenaka, Wako (JP); Takashi Matsumoto, Wako (JP); Takahide Yoshiike, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/597,732

(22) PCT Filed: Feb. 16, 2005

(86) PCT No.: PCT/JP2005/002354

§ 371 (c)(1),
(2), (4) Date: Aug. 4, 2006

(87) PCT Pub. No.: WO2005/077611

PCT Pub. Date: Aug. 25, 2005

(65) Prior Publication Data

US 2007/0168080 A1     Jul. 19, 2007

(30) Foreign Application Priority Data

Feb. 16, 2004    (JP) ............................. 2004-038961

(51) Int. Cl.
*B25J 9/08* (2006.01)

(52) U.S. Cl. .................. 318/568.12; 700/252; 701/23; 901/1

(58) Field of Classification Search ........... 318/568.12; 701/23; 901/1; 700/252
See application file for complete search history.

(56) References Cited

U.S. PATENT DOCUMENTS

| | | | | |
|---|---|---|---|---|
| 5,936,367 A | * | 8/1999 | Takenaka | 318/568.12 |
| 6,876,903 B2 | * | 4/2005 | Takenaka | 700/245 |
| 6,969,965 B2 | * | 11/2005 | Takenaka et al. | 318/568.12 |
| 7,236,852 B2 | * | 6/2007 | Moridaira et al. | 700/245 |
| 2004/0138780 A1 | * | 7/2004 | Lewis | 700/245 |
| 2004/0205417 A1 | * | 10/2004 | Moridaira et al. | 714/48 |
| 2005/0051368 A1 | * | 3/2005 | Takenaka et al. | 180/8.6 |
| 2005/0115747 A1 | * | 6/2005 | Takenaka et al. | 180/8.1 |

(Continued)

FOREIGN PATENT DOCUMENTS

JP    05-305584    11/1993

(Continued)

*Primary Examiner*—Rita Leykin
(74) *Attorney, Agent, or Firm*—Rankin, Hill, Porter & Clark LLP

(57) ABSTRACT

A gait generating system for a mobile robot has n dynamic models and determines a first gait parameter defining a desired gait such that the boundary condition of a gait on a first dynamic model is satisfied. The first gait parameter is corrected step by step by using an m-th dynamic model (m: integer satisfying $2 \leq m \leq n$), which is each dynamic model other than the first dynamic model, and an m-th gait parameter that satisfies the boundary condition on the m-th dynamic model is determined. The m-th gait parameter is determined by correcting an object of an (m−1)th gait parameter to be corrected on the basis of the degree of deviation of the gait generated on the m-th dynamic model by using the (m−1)th gait parameter from the boundary condition. A final determined n-th gait parameter and an n-th dynamic model are used to generate a desired gait.

23 Claims, 27 Drawing Sheets

U.S. PATENT DOCUMENTS

2006/0106495 A1* 5/2006 Takenaka et al. ........... 700/253

FOREIGN PATENT DOCUMENTS

| JP | 2002-326173 | 11/2002 |
| WO | 00/49669 | 8/2000 |
| WO | 02/40224 | 5/2002 |
| WO | 03/057427 | 7/2003 |
| WO | 03/057429 | 7/2003 |

* cited by examiner

BODY INCLINATION RESTORING MOMENT ZMP-CONVERTED VALUE OF NORMAL GAIT (ZMPrec)

BODY INCLINATION RESTORING MOMENT
ZMP-CONVERTED VALUE OF CURRENT TIME GAIT (ZMPrec)

Fxmin, Fxmax FOR FIRST MODEL

Fxmin, Fxmax FOR m-TH MODEL (WHERE 1<m<n, ex. m=2,n=3)

Fxmin, Fxmax FOR n-TH MODEL (ex. n=3)

GATE GENERATING SYSTEM FOR MOBILE ROBOT

TECHNICAL FIELD

The present invention relates to a system for generating gaits of a mobile robot, such as a bipedal mobile robot.

BACKGROUND ART

As techniques for generating desired gaits of a mobile robot, such as a bipedal mobile robot, one disclosed in, for example, Japanese Unexamined Patent Application Publication No. 2002-326173 (patent document 1) and one disclosed in PCT international publication WO/03/057427/A1 (patent document 2) have been proposed by the present applicant. According to the techniques disclosed in these documents, an instantaneous desired gait composed of an instantaneous value of a desired motion (instantaneous desired motion) of a robot and an instantaneous value of a desired floor reaction force (instantaneous desired floor reaction force) is sequentially created using a first dynamic model (simplified model) representing a relationship between a motion of the robot (position and posture of each part) and a floor reaction force such that a dynamic balance condition (a condition, such as the one in which a translational force component of a floor reaction force reaches a desired value or a floor reaction force moment about a certain point reaches a desired value) on the first dynamic model is satisfied. Then, the instantaneous desired gait is input to a second dynamic model (full model) wherein a part of the instantaneous desired motion (desired body position/posture, a desired moment about a desired ZMP, or the like) is corrected so as to generate a final instantaneous desired gait in a time series manner. According to the technologies disclosed in documents 1 and 2, a desired gait is generated for each step, a gait for the period of one step of a bipedal mobile robot being the unit. In this case, to generate an instantaneous value of a desired gait for each step of the robot, the gait parameter (composed of the parameters defining the position/posture trajectory of each foot, the parameters defining a desired ZMP trajectory, etc.) that specifies a normal gait, which is a virtual cyclic gait that follows the desired gait, is first determined by using the gait parameter and the aforesaid first dynamic model such that a predetermined boundary condition (a condition in which the gait states at the start and the end, respectively, of one cycle of a normal gait coincide with each other) is satisfied. Further, the gait parameter defining a desired gait are determined such that a gait generated by using the gait parameter and the aforesaid first dynamic model satisfies a predetermined boundary condition (a condition in which the desired gait approaches the normal gait at the end side thereof). Then, the gait parameter of the desired gait determined as described above and the first dynamic model are used to generate the time series of the instantaneous values of the desired gait.

According to the technologies for generating desired gaits as described above, a model having high linearity is generally used as the first dynamic model (simplified model). Creating instantaneous desired gaits by using a dynamic model with high linearity make it possible to efficiently and promptly create a gait that connects to or gradually approximates a normal gait, which is a virtual cyclic gait (a gait that enables the robot to continue stable motions). As a result, instantaneous desired gaits of the robot can be sequentially generated in real time while performing actual motions of the actual robot. Moreover, when determining the gait parameter of a normal gait, it is possible to efficiently and promptly determine the gait parameter that allows the boundary condition of the normal gait to be satisfied.

However, a dynamic model with high linearity generally tends to have relatively low dynamic accuracy in a variety of operations of a robot. More specifically, the kinetics of a robot on its dynamic model is prone to errors relative to the actual kinetics of an actual robot. For this reason, if an instantaneous desired gait created using the first dynamic model is directly applied to the actual robot to make the actual robot operate, then a dynamic balance condition guaranteed on the first dynamic model will not be satisfied, frequently causing the operations of the actual robot to lack in stability.

Hence, in the technologies disclosed in the aforesaid patent documents 1 and 2, a part of the instantaneous desired gait created using the first dynamic model is further subjected to a correction by using a second dynamic model. In this case, a model whose dynamic accuracy is higher than that of the first dynamic model is used as the second dynamic model. This makes it possible to generate gaits of higher dynamic accuracy (closer to the dynamics of an actual robot) than that of gaits created using the first dynamic model.

However, in the technologies disclosed in the aforesaid patent documents 1 and 2, gaits created using the second dynamic model tend to diverge, so that it has been necessary to correct a desired ZMP trajectory or generate a floor reaction force moment about a desired ZMP so as to restrain a desired motion trajectory of a robot from deviating from a gait created using the first dynamic model. And, in this case, the correction amount of the desired ZMP trajectory or the floor reaction force moment about the desired ZMP occasionally becomes relatively large, and in such a case, it has become difficult to maintain an ample stability margin. Conversely, if the correction amount of the desired ZMP trajectory or the permissible range of the floor reaction force moment about the desired ZMP is set to be smaller in order to maintain an ample stability margin, then the likelihood of the divergence of a gait has inconveniently increased.

Further, when determining the gait parameter of a normal gait, if the dynamic accuracy of the first dynamic model is set to be high, then the linearity of the first dynamic model deteriorates, making it difficult to efficiently and promptly find a normal gait parameter that is capable of satisfying the boundary condition of the normal gait. Hence, it has been difficult to determine an appropriate normal gait parameter that is resistant to the divergence of a gait in the aforesaid second dynamic model. As a result, there has been an inconvenience in that maintaining an ample stability margin is difficult or gaits generated using the second dynamic model are apt to diverge, as described above.

The present invention has been made with a view of the above background, and it is an object thereof to provide a gait generating system for a mobile robot that is capable of efficiently generating desired gaits that allow a predetermined boundary condition to be satisfied with high dynamic accuracy, while preventing the desired gaits from diverging. Another object of the present invention is to provide a gait generating system for a mobile robot that is, when determining a gait parameter defining a normal gait, capable of efficiently determining a normal gait parameter that allows the normal gait to satisfy a predetermined boundary condition with high dynamic accuracy and also of preventing a desired gait from diverging.

DISCLOSURE OF INVENTION

To fulfill the aforesaid objects, according to a first invention of a gait generating system for a mobile robot in accordance with the present invention, there is provided a gait generating system for a mobile robot, the system determining a gait parameter, which is composed of a set of a plurality of parameters defining a gait of a mobile robot in a predetermined period, and generating a desired gait of the mobile robot in the predetermined period by using the determined gait parameter and a dynamic model of the aforesaid mobile robot, comprising:

n (n: an integer of 2 or more) dynamic models that include a motion/floor reaction force model representing a relationship between aforesaid mobile robot and the floor reaction forces acting on the robot and that are constructed such that at least one of the motion/floor reaction force model, a restrictive condition added to a motion of the mobile robot in the motion/floor reaction force model, and a restrictive condition added to the floor reaction force in the motion/floor reaction force model is different from each other;

a first gait parameter determining means for determining a first gait parameter, which is composed of a set of provisional values of the aforesaid plurality of parameters, such that a gait in the aforesaid predetermined period that is generated using the first gait parameter and a first dynamic model, which is a predetermined dynamic model among the aforesaid n dynamic models, satisfies a predetermined boundary condition; and a gait parameter correcting means for determining an m-th gait parameter, which is a gait parameter obtained by correcting a predetermined parameter to be corrected out of an (m−1)th gait parameter, from a second gait parameter to an n-th gait parameter in order by using a m-th dynamic model (m: integer satisfying $2 \leq m \leq n$), wherein each of n−1 dynamic models excluding the aforesaid first dynamic model among the aforesaid n dynamic models is defined as the m-th dynamic model, wherein the gait parameter correcting means comprises a means for determining the aforesaid m-th gait parameter by, when the aforesaid m-th gait parameter is respectively determined, generating a gait in the aforesaid predetermined period by using the (m−1)th gait parameter and the m-th dynamic model and by correcting the aforesaid parameter to be corrected out of the aforesaid (m−1)th gait parameter such that the degree of deviation after correction, which is the degree of deviation of a gait in the aforesaid predetermined period that is generated using the m-th gait parameter and the m-th dynamic model from the aforesaid predetermined boundary condition is smaller than the degree of deviation before correction or the degree of deviation after correction falls within a predetermined degree of deviation permissible range on the basis of at least the degree of deviation before correction, which is the degree of deviation of the generated gait from the aforesaid predetermined boundary condition, and a desired gait in the aforesaid predetermined period is generated using an n-th gait parameter out of the aforesaid determined m-th gait parameter and an n-th dynamic model.

Incidentally, in the inventions of the present application, including the first invention, a desired gait is composed of the time series of the desired instantaneous values of motions of a robot (the position/posture of each portion or the displacement amount of each joint) or it is composed of the time series of the desired instantaneous values of the motions and the time series of the desired instantaneous values of floor reaction forces (at least one of translational forces, moments, and points of action) acting on the robot. A dynamic model of the robot is a model that includes at least a motion/floor reaction force model (a dynamic equation of the robot) that expresses a relationship between motions of the robot and floor reaction forces acting on the robot. A restrictive condition related to motions of the robot (a range in which a certain portion of the robot can move, etc.) or a restrictive condition related to floor reaction forces (a permissible range of a predetermined component of a floor reaction force, a range in which the point of action of the floor reaction force may exist, etc.) may be added to the above dynamic model. In such a case, the dynamic model combines the restrictive conditions and the aforesaid motion/floor reaction force model. Generating a gait by using a gait parameter and a dynamic model means determining the amount of input to the dynamic model or the state amount of the dynamic model on the basis of a gait parameter and then generating a gait that satisfies the dynamics on the dynamic model (the relationship of the motion/floor reaction force model or the relationship and the added restrictive conditions).

According to the aforesaid first invention, when a gait in the aforesaid predetermined period is generated using the first gait parameter and the first dynamic model, the first gait parameter is determined such that the gait satisfies a predetermined boundary condition on the first dynamic model. The boundary condition is, for example, a condition in which a predetermined state amount (e.g., the position or the posture of a certain portion of a robot or their changing speeds, or a floor reaction force) of a gait (instantaneous value) at one end (the time of the start or the end) of the aforesaid predetermined period agrees or substantially agrees with a predetermined value. And, the processing for determining, with the first gait parameter defined as the starting point, an m-th gait parameter that makes it possible to generate a gait satisfying the aforesaid predetermined boundary condition on the m-th dynamic model or the m-th gait parameter that makes it possible to generate, on the m-th dynamic model, a gait that is more matching to the aforesaid predetermined boundary condition than the (m−1)th gait parameter is by correcting the parameter to be corrected out of the (m−1)th gait parameter by using the m-th dynamic model is sequentially carried out by the aforesaid gait parameter correcting means, thereby finally determining an n-th gait parameter. In other words, the first gait parameter is corrected in steps by using. dynamic models except the first dynamic model.

Thus, for example, by making an arrangement so that the dynamic accuracy of the m-th dynamic model is higher than that of the (m−1)th dynamic model relative to an arbitrary m and also that the difference in the dynamic accuracy is not extremely large, it is possible to determine an n-th gait parameter that allows a gait capable of properly satisfying a predetermined boundary condition to be generated on an n-th dynamic model, while enhancing dynamic accuracy when the n-th gait parameter is finally determined. Incidentally, the dynamic accuracy of a dynamic model means the degree of agreement between the relationship between a motion of a robot and a floor reaction force on the dynamic model and the relationship between an actual robot motion and a floor reaction force. The degree of the agreement increases as the dynamic accuracy increases.

Here, the m-th gait parameter is determined by correcting the parameter to be corrected out of the (m−1)th gait parameter on the basis of the degree of deviation of a gait generated using the (m−1)th gait parameter and the m-th dynamic model from the aforesaid predetermined boundary condition (the degree of deviation before correction), that is, on the basis of the degree of matching of the (m−1)th gait parameter to the aforesaid predetermined boundary condition on the m-th dynamic model. Then, the correction is determined such that, when a gait is generated using the m-th gait parameter determined thereby and the m-th dynamic model, the degree of the deviation of the gait from the aforesaid predetermined boundary condition (the degree of deviation after correction) is smaller than the degree of deviation before correction corresponding to the (m−1)th gait parameter and that the degree of deviation after correction falls within a predetermined permissible range of the degree of deviation.

In this case, the (m−1)th gait parameter is a gait parameter that satisfies the aforesaid predetermined boundary condition on the (m−1)th dynamic model or a gait parameter close thereto. Hence, by setting the dynamic accuracy of the m-th dynamic model slightly higher than the dynamic accuracy of the (m−1)th dynamic model, as described above, it is possible to easily predict the correction amount of the parameter to be corrected that makes it possible to determine a proper m-th gait parameter (the m-th gait parameter that satisfies a predetermined boundary condition or that is highly matching to the boundary condition) on the m-th dynamic model on the basis of the aforesaid degree of deviation before correction. Hence, even if the final dynamic accuracy of the n-th dynamic model is relatively high, a proper n-th gait parameter can be efficiently determined on the n-th dynamic model in steps from the first gait parameter without causing divergence of a gait corresponding to the n-th gait parameter. And, according to the first invention, a finally determined n-th gait parameter and the n-th dynamic model are used to generate a desired gait in the aforesaid predetermined period, so that the desired gait will be a gait that is capable of fully satisfying the aforesaid predetermined boundary condition on the n-th dynamic model.

Thus, according to the first invention, it is possible to efficiently generate a desired gait capable of satisfying a predetermined boundary condition with high dynamic accuracy while preventing divergence of the desired gait. Moreover, it is possible to generate desired gaits that do not diverge or that are resistant to divergence, thus obviating the need for making significant corrections of the desired ZMPs or desired floor reaction force moments of the desired gaits to prevent divergence. This enables a mobile robot to have a greater stability margin.

Further, to fulfill the aforesaid objects, a second invention of a gait generating system for a mobile robot in accordance with the present invention provides:

a gait generating system for a mobile robot, when generating a desired gait of a mobile robot in a predetermined period, the system determining a normal gait parameter, which is formed of a set of a plurality of parameters defining a normal gait, which is a virtual cyclic gait following the desired gait, and generating the desired gait such that the desired gait approximates a normal gait generated using the determined normal gait parameter and a predetermined dynamic model of the mobile robot, comprising:

n (n: an integer of 2 or more) dynamic models that include a motion/floor reaction force model representing a relationship between motions of the aforesaid mobile robot and the floor reaction forces acting on the robot and that are constructed such that at least one of the motion/floor reaction force model, a restrictive condition added to a motion of the mobile robot in the motion/floor reaction force model, and a restrictive condition added to a floor reaction force in the motion/floor reaction force model is different from each other;

a first normal gait parameter determining means for determining a first normal gait parameter, which is formed of a set of provisional values of the aforesaid plurality of parameters, such that a normal gait generated using the first normal gait parameter and a first dynamic model, which is a predetermined dynamic model among the aforesaid n dynamic models, satisfies a predetermined boundary condition; and a normal gait parameter correcting means for determining an m-th normal gait parameter, which is a normal gait parameter obtained by correcting a predetermined parameter to be corrected out of an (m−1)th normal gait parameter, from a second normal gait parameter to an n-th normal gait parameter in order by using an m-th dynamic model (m: integer satisfying $2 \leq m \leq n$), wherein each of n−1 dynamic models excluding the aforesaid first dynamic model among the aforesaid n dynamic models is defined as the m-th dynamic model wherein the normal gait parameter correcting means comprises a means for determining, when the aforesaid m-th normal gait parameter is determined, the aforesaid m-th normal gait parameter by generating gaits for the period of at least one cycle of the aforesaid normal gait by using the (m−1)th normal gait parameter and the m-th dynamic model and by correcting the aforesaid parameter to be corrected out of the aforesaid (m−1)th normal gait parameter on the basis of at least the degree of deviation before correction, which is the degree of deviation of the generated gait from the aforesaid predetermined boundary condition, such that the degree of deviation after correction, which is the degree of deviation of a gait generated using the m-th normal gait parameter and the m-th dynamic model from the aforesaid predetermined boundary condition, is smaller than the aforesaid degree of deviation before correction or the degree of deviation after correction falls within a predetermined permissible range of the degree of deviation, and a desired gait in the aforesaid predetermined period is generated such that the desired gait approximates a normal gait generated using an n-th normal gait parameter out of the aforesaid determined m-th normal gait parameter and an n-th dynamic model.

According to the second invention, when the aforesaid normal gait is generated using the first normal gait parameter and the first dynamic model, the first normal gait parameter is determined such that the normal gait satisfies a predetermined boundary condition on the first dynamic model. The boundary condition is, for example, a condition in which predetermined state amounts (e.g., the position or the posture of a certain portion of a robot, or their changing speeds, or a floor reaction force) of the gait at both ends (the starting end and the terminating end of the period) of a one-cycle period of a normal gait agree or substantially agree with each other. And, the processing for determining, with the first normal gait parameter defined as the starting point, an m-th normal gait parameter that makes it possible to generate a normal gait satisfying the aforesaid predetermined boundary condition on the m-th dynamic model or the m-th normal gait parameter that makes it possible to generate, on the m-th dynamic model, a normal gait that is more matching to the aforesaid predetermined boundary condition than the (m−1) th normal gait parameter is by correcting the parameter to be corrected out of the (m−1)th normal gait parameter by using the m-th dynamic model is sequentially carried out by the aforesaid normal gait parameter correcting means, thereby finally determining an n-th normal gait parameter. In other words, the first gait parameter is corrected in steps by using dynamic models except the first dynamic model.

Thus, as with the case of the first invention, by, for example, making an arrangement so that the dynamic accuracy of the m-th dynamic model is higher than that of the (m−1)th dynamic model relative to an arbitrary m and also that the difference in the dynamic accuracy is not extremely large, it is possible to determine an n-th normal gait parameter that allows a normal gait capable of properly satisfying a predetermined boundary condition to be generated on an n-th dynamic model, while enhancing dynamic accuracy when the n-th normal gait parameter is finally determined.

Here, the m-th normal gait parameter is determined by correcting the parameter to be corrected out of the (m−1)th normal gait parameter on the basis of the degree of deviation of a normal gait (normal gait for at least one-cycle period) generated using the (m−1)th normal gait parameter and the m-th dynamic model from the aforesaid predetermined boundary condition (the degree of deviation before correction), that is, on the basis of the degree of matching of the (m−1)th normal gait parameter to the aforesaid predetermined boundary condition on the m-th dynamic model. Then, the correction is determined such that, when a gait is generated using the m-th normal gait parameter determined thereby and the m-th dynamic model, the degree of the deviation of the normal gait from the aforesaid predetermined boundary condition (the degree of deviation after correction) is smaller than the degree of deviation before correction corresponding to the (m−1)th normal gait parameter and that the degree of deviation after correction falls within a predetermined permissible range of the degree of deviation.

In this case, the (m−1)th normal gait parameter is a normal gait parameter that satisfies the aforesaid predetermined boundary condition on the (m−1)th dynamic model or a normal gait parameter close thereto. Hence, by setting the dynamic accuracy of the m-th dynamic model slightly higher than the dynamic accuracy of the (m−1)th dynamic model, as described above, it is possible to easily predict the correction amount of the parameter to be corrected that makes it possible to determine a proper m-th normal gait parameter (the m-th normal gait parameter that satisfies a predetermined boundary condition or that is highly matching to the boundary condition) on the m-th dynamic model on the basis of the aforesaid degree of deviation before correction. Hence, even if the final dynamic accuracy of the n-th dynamic model is relatively high, a proper n-th normal gait parameter can be efficiently determined on the n-th dynamic model in steps from the first normal gait parameter without causing divergence of a normal gait corresponding to the n-th normal gait parameter.

As a result, according to the second invention, it is possible to efficiently determine a gait parameter of a normal gait (normal gait parameter) capable of satisfying a predetermined boundary condition with high dynamic accuracy. And, according to the second invention, a desired gait in the aforesaid predetermined period is generated such that it approximates a normal gait generated using finally determined n-th normal gait parameter and the n-th dynamic model; therefore, the desired gait will be a gait capable of properly enhancing continued stability of a robot on the n-th dynamic model, making possible to prevent divergence of the desired gait. Moreover, it is possible to generate desired gaits that do not diverge or that are resistant to divergence, thus obviating the need for making significant corrections of the desired ZMPs or desired floor reaction force moments of the desired gaits to prevent divergence. This enables a mobile robot to have a greater stability margin.

The first invention and the second invention may be combined. More specifically, in the first invention, a desired gait in a predetermined period is generated such that the desired gait in a predetermined period approximates a normal gait in the second invention, and at this time, the normal gait parameter defining the normal gait is determined as in the second invention. In this case, the n dynamic models for determining gait parameters up to the n-th in the first invention and the n dynamic models for determining normal gait parameters up to the n-th in the second invention may be the same dynamic models. However, they do not have to be the same, and a plurality of dynamic models that are different from each other (or only some dynamic models are different) may be used for a case where gait parameters are determined and for a case where normal gait parameters are determined. Furthermore, the number of dynamic models used in both cases may be different from each other.

In the aforesaid first invention, preferably, the aforesaid n dynamic models are constructed such that the linearity between the degree of deviation of a gait generated using an arbitrary gait parameter and the aforesaid (m−1)th dynamic model from the aforesaid predetermined boundary condition and the aforesaid parameter to be corrected out of the gait parameter is higher than the linearity between the degree of deviation of a gait generated using the gait parameter and the aforesaid m-th dynamic model from the aforesaid predetermined boundary condition and the aforesaid parameter to be corrected out of the gait parameter (a third invention).

Similarly, in the second invention, preferably, the aforesaid n dynamic models are constructed such that the linearity between the degree of deviation of a normal gait generated using an arbitrary normal gait parameter and the aforesaid (m−1)th dynamic model from the aforesaid predetermined boundary condition and the aforesaid parameter to be corrected out of the normal gait parameters is higher than the linearity between the degree of deviation of a normal gait generated using the normal gait parameter and the aforesaid m-th dynamic model from the aforesaid predetermined boundary condition and the aforesaid parameter to be corrected out of the gait parameter (a fourth invention).

According to the aforesaid third invention, the linearity between the degree of deviation from the aforesaid predetermined boundary condition and the aforesaid parameter to be corrected out of the gait parameter is higher in the (m−1)th dynamic model than in the m-th dynamic model; therefore, especially when exploratorily determining a parameter to be corrected out of a gait parameter of each number, a gait parameter using a dynamic model having a lower gait number can be efficiently and quickly determined. This is because appropriate values can be easily searched even if the initial value of a parameter to be corrected relatively considerably deviates from an original appropriate value in search processing. In this case, a dynamic model having a higher number (this is defined as, for example, an ma-th dynamic model) uses an (ma−1)th dynamic model, which is the dynamic model having a preceding number thereof, to determine an (ma−1)th gait parameter close to an appropriate ma-th gait parameter, so that the ma-th gait parameter can be determined without taking much time by setting the (ma−1)th gait parameter as the initial value of search processing, although the linearity deteriorates. As a result, the determination processing up to an n-th gait parameter can be carried out quickly and efficiently. Similarly, the fourth invention makes it possible to quickly and efficiently carry out the determination processing up to an n-th normal gait parameter.

Further, in the aforesaid first invention, preferably, the aforesaid n dynamic models are constructed such that the calculation time for generating a gait in the aforesaid predetermined period by a computer by using an arbitrary gait parameter and the aforesaid (m−1)th dynamic model is shorter than the calculation time for generating a gait in the aforesaid predetermined period by the aforesaid computer by using the gait parameter and the aforesaid m-th dynamic model (a fifth invention).

Similarly, in the second invention, preferably, the aforesaid n dynamic models are constructed such that the calculation time for generating a gait in the aforesaid one-cycle period of the normal gait by a computer by using an arbitrary normal gait parameter and the aforesaid (m−1)th dynamic model is shorter than the calculation time for generating a gait in the aforesaid one-cycle period of the normal gait by the aforesaid computer by using the gait parameter and the aforesaid m-th dynamic model (a sixth invention).

According to the aforesaid fifth invention, especially when a parameter to be corrected in a gait parameter of each number is exploratorily determined, a gait parameter using a dynamic model having a lower number can be promptly determined. This is because the processing for actually generating gaits in the search processing can be promptly carried out. Furthermore, a dynamic model having a higher number (e.g., an ma-th dynamic model) uses an (ma−1)th dynamic model, which is the dynamic model having a preceding number thereof, to determine an appropriate ma-th gait parameter or an (ma−1)th gait parameter close to the ma-th; therefore, using the (ma−1)th gait parameter as the initial value of search processing allows the ma-th gait parameter to be determined without requiring much time, although it requires longer time to generate gaits. As a result, the determination processing up to an n-th gait parameter can be carried out quickly and efficiently. Similarly, the sixth invention makes it possible to quickly and efficiently carry out the determination processing up to an n-th gait parameter.

Further, in the first invention or the second invention described above, if the aforesaid mobile robot is a legged mobile robot, then preferably, at least the first dynamic model and a second dynamic model out of the aforesaid n dynamic models are constructed such that the ratio of the mass of the legs of the robot to the total mass of the mobile robot in the first dynamic model is smaller than the ratio of the mass of the legs of the robot to the total mass of the mobile robot in the aforesaid second dynamic model (a seventh invention).

According to the seventh invention, the linearity is higher at least in the first dynamic model than in the second dynamic model. Hence, especially when the first dynamic model is used to exploratorily determine the aforesaid first gait parameter or a first normal gait parameter, it is possible to efficiently and promptly determine the gait parameter or the normal gait parameter corresponding to a gait or a normal gait in the aforesaid predetermined period that satisfies a boundary condition on the first dynamic model.

In the first invention or the second invention described above, it is desirable that the n dynamic models basically have motion/floor reaction force model structures (the number of mass points and inertias of components) or dynamic equations (equations of motion) that are different from each other; however, it is not essential that the motion/floor reaction force models are different from each other.

For example, in the first invention, if one predetermined dynamic model out of the aforesaid n dynamic models, excluding the n-th dynamic model, is denoted as a k-th dynamic model (k: any integer that satisfies $1 \leq k \leq n-1$), then at least the k-th dynamic model and a (k+1)th dynamic model are dynamic models, respectively, to which a condition in which at least one of a motion of the mobile robot and a floor reaction force in a gait generated using the dynamic models and an arbitrary gait parameter falls within the predetermined permissible ranges set for the individual dynamic models is added as the aforesaid restrictive condition, and the aforesaid permissible range used with the aforesaid (k+1)th dynamic model may be set to be narrower than the aforesaid permissible range used with the aforesaid k-th dynamic model (an eighth invention).

Similarly, in the second invention, if one predetermined dynamic model out of the aforesaid n dynamic models, excluding the n-th dynamic model, is denoted as a k-th dynamic model (k: any integer that satisfies $1 \leq k \leq n-1$), then at least the k-th dynamic model and a (k+1)th dynamic model are dynamic models, respectively, to which a condition in which at least one of a motion of the mobile robot and a floor reaction force in a normal gait generated using the dynamic models and arbitrary normal gait parameters falls within the predetermined permissible ranges set for the individual dynamic models is added as the aforesaid restrictive condition, and the aforesaid permissible range used with the aforesaid (k+1)th dynamic model may be set to be narrower than the aforesaid permissible range used with the aforesaid k-th dynamic model (a ninth invention).

In such a case, the dynamic accuracy can be enhanced more in the (k+1)th dynamic model than in the k-th dynamic model, while the k-th dynamic model permits higher linearity to be achieved than the (k+1)th dynamic model does. Therefore, the (k+1)th dynamic model can be used to determine a (k+1)th gait parameter or a (k+1)th normal gait parameter that allows a gait with high dynamic accuracy to be generated while promptly determining a k-th gait parameter or a k-th normal gait parameter by using the k-th dynamic model.

Further, in the first invention or the second invention described above, the aforesaid n dynamic models do not necessarily have to have mutually independent structures; for example, two mutually different motion/floor reaction force models may be combined to construct a plurality of dynamic models. To be specific, if a predetermined motion/floor reaction force model representing a relationship between motions of the aforesaid mobile robot and floor reaction forces is defined as an A-th motion/floor reaction force model, a predetermined motion/floor reaction force model that represents a relationship between the motions of the aforesaid mobile robot and floor reaction forces and the aforesaid relationship is constructed such that the floor reaction forces generated in response to predetermined motions of the robot are different from those of the aforesaid A-th motion/floor reaction force model is defined as a B-th motion/floor reaction force model, and one predetermined dynamic model out of the aforesaid n dynamic models, excluding the n-th dynamic model, is defined as a k-th dynamic model (k: any integer that satisfies $1 \leq k \leq n-1$), then the aforesaid k-th dynamic model is a dynamic model in which the floor reaction force generated on the k-th dynamic model in response to an arbitrary motion of the aforesaid mobile robot takes a weighted mean value calculated using a predetermined weight from the floor reaction force generated on the aforesaid A-th motion/floor reaction force model in response to the motion and the floor reaction force generated on the aforesaid B-th motion/floor reaction force model in response to the motion, and the (k+1)th dynamic model is a dynamic model in which the floor reaction force generated on the k-th dynamic model in response to an arbitrary motion of the aforesaid mobile robot takes a weighted mean value calculated using a predetermined weight different from that in the aforesaid k-th dynamic model from the floor reaction force generated on the aforesaid A-th motion/floor reaction force model in response to the motion and the floor reaction force generated on the aforesaid B-th motion/floor reaction force model in response to the motion (a tenth invention).

By doing so, the k-th dynamic model and the (k+1)th dynamic model whose relationships between motions and floor reaction forces (e.g., the motion/floor reaction force models) are different from each other can be synthetically constructed from the A-th motion/floor reaction force model and the B-th motion/floor reaction force model. If, for example, the dynamic accuracy of the A-th motion/floor reaction force model is higher than the dynamic accuracy of the B-th motion/floor reaction force model, then a floor reaction force relative to a predetermined motion in the (k+1)th dynamic model is preferably closer to that in the A-th motion/floor reaction force model than that in the k-th dynamic model is. Further, if the total number n of the dynamic models in the first invention or the second invention is 3 or more, then all dynamic models except the k-th dynamic model and the (k+1)th dynamic model or a plurality of dynamic models may be constructed such that the weighted mean values of the floor reaction forces of the A-th motion/floor reaction force model and the B-th motion/floor reaction force model are generated in response to the aforesaid predetermined motions, as in the k-th dynamic model or the (k+1)th dynamic model. In this case, the weights corresponding to those dynamic models (including the k-th dynamic model and the (k+1)th dynamic model) are set to be weights that are different from each other.

Further, in the aforesaid first invention, the aforesaid gait parameter preferably includes a parameter specifying a desired ZMP trajectory in the gait during the aforesaid predetermined period as the aforesaid parameter to be corrected (an eleventh invention).

According to the eleventh invention, a desired gait capable of satisfying a boundary condition can be generated on an n-th dynamic model, while preventing a desired ZMP trajectory from being considerably corrected from a trajectory that is ideal for securing a stability margin of a robot.

Further, in the aforesaid second invention, the aforesaid normal gait parameter preferably includes a parameter that specifies a predetermined state amount of a motion of the mobile robot at one end of the one-cycle period of the aforesaid normal gait as the aforesaid parameter to be corrected (a twelfth invention).

According to the twelfth invention, a normal gait parameter that satisfies a boundary condition of a normal gait on an m-th dynamic model or a normal gait parameter close thereto is determined by adjusting a predetermined state amount of a motion of the mobile robot at one end of the one-cycle period of a normal gait, thus making it possible to determine a normal gait parameter that defines a normal gait with a high stability margin. Incidentally, a normal gait is a cyclic gait, so that adjusting the predetermined state amount of a motion of the robot at one end of the one cycle means adjusting the predetermined state amount of a motion of the robot at the other end of one cycle.

Further, in the aforesaid first invention, the aforesaid predetermined boundary condition includes a condition in which a predetermined state amount of a motion of the mobile robot in a boundary of a gait during the aforesaid predetermined period agrees with the predetermined state amount of the motion of the mobile robot in an adjacent gait in the aforesaid boundary (a thirteenth invention).

More specifically, a desired gait is required to be continuous, so that, when generating a desired gait in the aforesaid predetermined period, a predetermined state amount of a motion of a gait of a mobile robot (e.g., the position or the posture of a certain portion of a mobile robot, or their changing speeds) in a boundary of a gait in the predetermined period (a gait at the starting end or the terminating end of the predetermined period) preferably agrees with a predetermined state amount of the motion in a gait adjacent to that gait.

If a normal gait (or a normal gait parameter defining the normal gait), which is a virtual cyclic gait following a desired gait in the aforesaid predetermined period, is determined and then a desired gait is generated such that it approximates the aforesaid desired gait, then the aforesaid predetermined boundary condition preferably includes a condition in which the predetermined state amount of a motion of a mobile robot in the boundary of at the terminating end of a gait in the aforesaid predetermined period agrees with the predetermined state amount of a motion of the mobile robot in a normal gait determined as the virtual cyclic gait that is to follow the aforesaid gait (a fourteenth invention).

By determining the boundary condition corresponding to the aforesaid desired gait as described above, an n-th gait parameter that makes it possible to generate a desired gait that approximates a normal gait at the terminating end (the terminating end side of the aforesaid predetermined period) of the desired gait can be efficiently generated on an n-th dynamic model. Incidentally, in the fourteenth invention, it is not always necessary to determine, in steps, the normal gait parameters that define normal gaits by using a plurality of dynamic models as with the second invention; however, they may be determined as with the second invention.

Further, in the aforesaid second invention, the aforesaid predetermined boundary condition preferably includes a condition in which the predetermined state amounts of a motion of a mobile robot at the starting end and the terminating end of one cycle of the aforesaid normal gait agree with each other (a fifteenth invention).

A normal gait is a cyclic gait, so that a normal gait parameter that allows a normal gait satisfying a periodicity condition to be generated can be properly determined by determining a boundary condition as described above. Incidentally, the starting end of one cycle of a normal gait in the fifteenth invention does not necessarily have to coincide with the terminating end of the aforesaid desired gait.

In the twelfth to the fifteenth inventions described above, especially if the aforesaid mobile robot is a legged mobile robot equipped with a plurality of legs extended from the body, then the aforesaid predetermined state amount preferably includes at least one of the position of the body of the robot, the velocity of the body, the posture angle of the body, the angular velocity of the posture angle of the body, the weighted mean values of the position and the velocity of the body, the position of the total center-of-gravity of the robot, the velocity of the total center-of-gravity, the weighted mean values of the position and the velocity of the total center-of-gravity, and a divergence component (a sixteenth invention).

According to this, in the twelfth invention, it is possible to efficiently determine an m-th normal gait parameter that satisfies a boundary condition of a normal gait while at the same time reducing the parameters to be corrected when determining the m-th normal gait parameter. Further, in the fourteenth invention, it is possible to efficiently determine an m-th gait parameter for bringing a desired gait in the aforesaid predetermined period close to a normal gait while at the same time reducing the parameters to be corrected. In the fourteenth invention, the aforesaid predetermined state amount, in particular, is ideally the weighted mean values of the position and the velocity of the body or the weighted mean values of the position and the velocity of the total center-of-gravity or a divergence component.

Further, in the aforesaid first invention, the aforesaid gait parameter correcting means is preferably a means that, when determining each of the aforesaid m-th gait parameters, generates a gait in the aforesaid predetermined period by using the (m−1)th gait parameter and the m-th dynamic model, determines at least one set of auxiliary gait parameters obtained by correcting the aforesaid parameter to be corrected out of the aforesaid (m−1)th gait parameter by a predetermined amount, generates a gait in the aforesaid predetermined period by using the determined auxiliary gait parameter of each set and the aforesaid m-th dynamic model, determines the correction amount of the aforesaid parameter to be corrected out of the aforesaid (m−1)th gait parameter on the basis of the degree of deviation before correction, which is the degree of deviation of the gait, which has been generated using the aforesaid (m−1)th gait parameter, from the aforesaid predetermined boundary condition and the auxiliary degree of deviation of the gait, which has been generated using the aforesaid auxiliary gait parameter of each set, from the aforesaid predetermined boundary condition, and corrects the parameter to be corrected, thereby determining the aforesaid m-th gait parameter (a seventeenth invention).

Similarly, in the second invention, the normal gait parameter correcting means is preferably a means that, when determining each of the aforesaid m-th normal gait parameters, generates a gait for at least one-cycle period of the aforesaid normal gait by using the (m−1)th normal gait parameters and the m-th dynamic model, determines at least one set of auxiliary normal gait parameters obtained by correcting the parameter to be corrected out of the aforesaid (m−1)th gait parameters by a predetermined amount, generates a gait for at least the aforesaid one-cycle period of the normal gait by using the determined auxiliary normal gait parameters of each set and the aforesaid m-th dynamic model, determines the correction amount of the aforesaid parameter to be corrected out of the aforesaid (m−1)th normal gait parameters on the basis of the degree of deviation before correction, which is the degree of deviation of the gait, which has been generated using the aforesaid (m−1)th normal gait parameters, from the aforesaid predetermined boundary condition and the auxiliary degree of deviation, which is the degree of deviation of a gait generated using the aforesaid auxiliary normal gait parameters of each set from the aforesaid predetermined boundary condition, and determines the aforesaid m-th normal gait parameters by correcting the aforesaid parameter to be corrected (an eighteenth invention).

In the aforesaid seventeenth invention, when determining each of the aforesaid m-th gait parameters, the (m−1)th gait parameter and the m-th dynamic model are used to generate a gait in the aforesaid predetermined period, at least one set of auxiliary gait parameters obtained by correcting, by a predetermined amount, the aforesaid parameter to be corrected out of the aforesaid (m−1)th gait parameters is determined, and the determined auxiliary gait parameters of each set and the aforesaid m-th dynamic model are used to generate a gait in the aforesaid predetermined period; therefore, when a parameter to be corrected out of the (m−1)th gait parameters is corrected, how a gait generated on the m-th dynamic model is changed can be observed, so that the correction amount of a parameter to be corrected out of the m-th gait parameters that satisfies a boundary condition on the m-th dynamic model or an m-th gait parameter close thereto can be easily estimated. Hence, a proper correction amount of the parameter to be corrected out of the aforesaid (m−1)th gait parameters can be easily determined on the basis of the degree of deviation before correction, which is the degree of deviation of the gait generated using the aforesaid (m−1)th gait parameter from a boundary condition, and the auxiliary degree of deviation, which is the degree of deviation of a gait generated using the aforesaid auxiliary gait parameters of each set, from a boundary condition, thus permitting easier and efficient search of a proper m-th gait parameter.

Similarly, the eighteenth invention makes it easy to determine a proper correction amount of a parameter to be corrected out of the aforesaid (m−1)th normal gait parameters, thus permitting easier efficient search of a proper m-th normal gait parameter.

BEST MODE FOR CARRYING OUT THE INVENTION

The following will explain embodiments of the present invention with reference to the accompanying drawings. In the embodiments in the present description, as mobile robots, bipedal mobile robots will be used as examples of legged mobile robots.

FIG. 1 is a schematic diagram showing the outline of the entire structure of a bipedal mobile robot to which an embodiment of the present invention is applied.

As shown in the figure, a bipedal mobile robot (hereinafter referred to as "the robot") 1 is equipped with a pair of right and left leg bodies (leg links) 2, 2 extended downward from a body (a base body of the robot 1) 3. The two leg bodies 2, 2 share the same structure, each having six joints. The six joints are comprised of, in the following order from the body 3 side, joints 10R, 10L for swinging (rotating) a hip (waist)(for rotating in a yaw direction relative to the body 3), joints 12R, 12L for rotating the hip (waist) in a roll direction (about an X axis), joints 14R, 14L for rotating the hip (waist) in a pitch direction (about a Y axis), joints 16R, 16L for rotating knees in the pitch direction, joints 18R, 18L for rotating ankles in the pitch direction, and joints 20R, 20L for rotating the ankles in the roll direction. In the present description, the symbols R and L mean that they correspond to the right side and the left side, respectively, of the robot 1.

A foot (foot portion) 22R(L) constituting a distal portion of each leg body 2 is attached to the bottoms of the two joints 18R(L) and 20R(L) of the ankle of each leg body 2. The aforesaid body 3 is installed at the uppermost top of the two leg bodies 2, 2 through the intermediary of the three joints 10R(L), 12R(L) and 14R(L) of the hip of each leg body 2. A control unit 60 and the like, which will be discussed in detail hereinafter, is housed in the body 3. For convenience of illustration, the control unit 60 is shown outside the body 3 in FIG. 1.

In each leg body 2 having the aforesaid structure, a hip joint (or a waist joint) is formed of the joints 10R(L), 12R(L) and 14R(L), the knee joint is formed of the joint 16R(L), and the ankle joint is formed of the joints 18R(L) and 20R(L). The hip joint and the knee joint are connected by a thigh link 24R(L), and the knee joint and the ankle joint are connected by a crus link 26R(L).

A pair of right and left arm bodies 5, 5 is attached to both sides of an upper portion of the body 3, and a head 4 is disposed at a top end of the body 3. Each arm 5 is provided with a shoulder joint composed of three joints 30R(L), 32R(L), and 34R(L), an elbow joint composed of a joint 36 R(L), a wrist joint composed of a joint 38R(L), and a hand 40R(L) connected to the wrist joint. The links between shoulder joint and the elbow joint, and between the elbow joint and the wrist joint, respectively, are formed of rigid bodies.

The structure of the robot 1 described above imparts six degrees of freedom to the foot 22R(L) of each leg body 2 relative to the body 3. During a travel, such as walking, of the robot 1, desired motions of the two feet 22R and 22L can be accomplished by driving 6*2=12 joints of the two leg bodies 2, 2 together ("*" in this description denotes multiplication as scalar calculation, while it denotes an outer product in vector calculation) at appropriate angles. This arrangement enables the robot 1 to arbitrarily move in a three-dimensional space. Furthermore, each arm body 5 is capable of performing a motion, such as arm swinging, by rotating the shoulder joint, the elbow joint, and the wrist joint thereof.

As shown in FIG. 1, a publicly known six-axis force sensor 50 is provided under the ankle joints 18R(L), 20R(L) and between the ankle joints and the foot 22R(L) of each leg body 2. The six-axis force sensor 50 detects primarily whether the foot 22R(L) of each leg body 2 is in contact with the ground and a floor reaction force (ground contact load) acting on each leg body 2, and it outputs detection signals of three-direction components Fx, Fy and Fz of a translational force of the floor reaction force and three-direction components Mx, My and Mz of a moment to the control unit 60. Furthermore, the body 3 is equipped with a posture sensor 54 for detecting an inclination angle (posture angle) of the body 3 relative to a Z-axis (vertical direction (gravitational direction)) and an angular velocity thereof, detection signals thereof being output from the posture sensor 54 to the control unit 60. The posture sensor 54 is provided with an accelerometer and a gyro sensor, which are not shown, and the detection signals of these sensors are used to detect inclination angles of the body 3 and angular velocities thereof. Although detailed structures are not shown, each joint of the robot 1 is provided with an electric motor 64 (refer to FIG. 3) for driving the joint and an encoder (rotary encoder) 65 (refer to FIG. 3) for detecting a rotational amount of the electric motor 64 (a rotational angle of each joint). Detection signals of the encoder 65 are output from the encoder 65 to the control unit 60.

Furthermore, although not shown in FIG. 1, a joystick (operating device) 73 (refer to FIG. 3) for manipulating the robot 1 is provided on the exterior of the robot 1. The joystick 73 is constructed in such a manner that a request or a restrictive condition on a gait of the robot 1, such as turning the robot 1 that is traveling straight, specifying the moving direction of the robot 1, or specifying the motion mode of the robot 1, such as walking or running, or the frictional condition of a floor surface (road surface condition), is input to the control unit 60 as necessary by operating the joystick 73. Communication between the joystick 73 and the control unit 60 is effected by a wire or wireless means.

FIG. 2 schematically shows the basic structure of the distal portion (including each foot 22R(L)) of each leg body 2 in the present embodiment. As shown in the figure, a spring mechanism 70 is installed between each foot 22R(L) and the aforesaid six-axis force sensor 50, and a foot sole elastic member 71 made of rubber or the like is bonded to a foot sole (the bottom surface of each foot 22R,L). These spring mechanism 70 and the foot sole elastic member 71 constitute a compliance mechanism 72. Although no detailed illustration is given, the spring mechanism 70 is constructed of a square guide member (not shown), which is installed on the upper surface of the foot 22R(L), and a piston-shaped member (not shown) that is installed adjacently to the ankle joint 18R(L) (the ankle joint 20R(L) being omitted in FIG. 2) and the six-axis force sensor 50 and housed in the guide member through the intermediary of an elastic member (rubber or spring) so that it may be moved extremely slightly.

The foot 22R(L) indicated by a solid line in FIG. 2 is in a state wherein it is being subjected to no floor reaction force. When each leg body 2 is subjected to a floor reaction force, the spring mechanism 70 and the foot sole elastic member 71 of the compliance mechanism 72 flex, causing the foot 22R(L) to shift to the position/posture illustrated by a dashed line in the figure. The structure of the compliance mechanism 72 is important not only to ease a landing impact but also to enhance controllability. The details thereof have been explained in, for example, Japanese Unexamined Patent Publication Application No. 5-305584 previously proposed by the present applicant, so that no further explanation will be given in the present description.

FIG. 3 is a block diagram showing a structure of the control unit 60. The control unit 60 is comprised of a microcomputer, and it includes a first calculator 90 and a second calculator 92 formed of CPUs, an A/D converter 80, a counter 86, a D/A converter 96, a RAM 84, a ROM 94, and a bus line 82 for transferring data among them. In the control unit 60, output signals of the six-axis force sensor 50 of each leg body 2, the posture sensor 54 (an accelerometer and a rate gyro sensor), the joystick 73, etc. are converted into digital values by the A/D converter 80 and sent to the RAM 84 via the bus line 82. Outputs of the encoder 65 (rotary encoder) of each joint of the robot 1 are input to the RAM 84 via the counter 86.

As will be discussed hereinafter, the first calculator 90 generates desired gaits, calculates a joint angle displacement command (a command value of a displacement angle of each joint or a rotational angle of each electric motor 64), and sends the calculation result to the RAM 84. The second calculator 92 reads the joint angle displacement command and an actual measurement value of a joint angle detected on the basis of an output signal of the encoder 65 from the RAM 84 to calculate a manipulated variable required for driving each joint and outputs the calculated manipulated variable to the electric motor 64 for driving each joint through the intermediary of the D/A converter 96 and a servo amplifier 64a.

FIG. 4 is a block diagram showing major functional structure of the control unit 60 of the robot 1 in an embodiment in the present description. A portion except the "actual robot" in FIG. 4 is constituted of processing functions implemented by the control unit 60 (primarily the functions of the first calculator 90 and the second calculator 92). The processing function is implemented by programs or the like installed in the control unit 60. In the following explanation, the aforesaid symbols R and L will be omitted as long as it is not particularly necessary to discriminate right and left of each part of the robot 1 (the leg bodies 2, the arm bodies 5, etc.).

An explanation will now be given. The control unit 60 is equipped with a gait generating device 100 that generates and outputs desired gaits freely in real time, as it will be discussed later. The gait generating device 100 implements an embodiment of the present invention by its functions. A desired gait output by the gait generating device 100 is constituted of a corrected desired body posture trajectory (the trajectory of desired postures of the body 3), a corrected desired body position trajectory (the trajectory of desired positions of the body 3), a desired foot position/posture trajectory (the trajectories of desired positions and desired postures of each foot 22), a desired arm posture trajectory (the trajectory of desired postures of each arm body), a desired ZMP (desired total floor reaction force central point) trajectory, the trajectory of corrected desired floor reaction force moments about a desired ZMP, and a desired total floor reaction force trajectory. If a part (a head or the like) that can be moved relative to the body 3 is provided in addition to the leg bodies 2 and the arm bodies 5, then a desired position/posture trajectory of the movable part is added to a desired gait.

Here, the definitions and the like of basic terms related to gaits in the present description will be explained. The term "trajectory" in a gait means a temporal change pattern (time series pattern) and it may be referred to as "pattern" in place of "trajectory." Furthermore, a "posture" means a spatial orientation. For example, a body posture is represented by an inclination angle (posture angle) of the body 3 in the roll direction (about the X-axis) relative to the Z-axis (vertical axis) and an inclination angle (posture angle) of the body 3 in the pitch direction (about the Y-axis), and a foot posture is represented by means of a two-axis spatial azimuth fixedly set on each foot 22. In the present description, a body posture may be referred to as a body posture angle or a body inclination angle. A desired arm posture related to the arm bodies 5 is represented by means of a relative posture with respect to the body 3 in the embodiments of the present description.

The position of the body means the position of a predetermined representative point of the body 3 (a certain fixed point on a local coordinate system arbitrarily and fixedly set relative to the body 3). Similarly, the position of a foot means the position of a predetermined representative point of each foot 22 (a fixed point on a local coordinate system arbitrarily and fixedly set relative to each foot 22). For example, the representative point of each foot 22 is set on the bottom surface of each foot 22 (more specifically, for example, a point at which a perpendicular line from the center of the ankle joint of each leg body 2 to the bottom surface of each foot 22 intersects with the bottom surface).

The aforesaid corrected desired body posture and corrected desired body position related to the body 3 are obtained by correcting a certain desired body posture that provides a reference (provisional desired body posture) and a desired body position (provisional desired body position). In the embodiments in the present description, the desired body position/posture determined as discussed later (the desired body position/posture determined in S032 of FIG. 12, which will be discussed later) correspond to the desired body position/posture that provide the reference.

In the explanation hereinafter, the term "desired" will be frequently omitted if there is no danger of misunderstanding.

In a gait, the constituent elements except those related to a floor reaction force, namely, the constituent elements related to the position/posture of each part of the robot 1, such as foot position/posture and body position/posture, are referred generically to "motions." Further, a floor reaction force acting on each foot 22 (a floor reaction force composed of a translational force and a moment) is referred to as "the each foot floor reaction force," and the resultant force of "the floor reaction forces of individual feet" related to all (two) feet 22R and 22L of the robot 1 is referred to as "the total floor reaction force." However, in the following explanation, the each foot floor reaction force will be hardly referred to, so that "the floor reaction force" will be handled as synonymous with "the total floor reaction force" unless otherwise specified.

A desired floor reaction force is generally represented in terms of a point of action and a translational force and moment acting on the point. The point of action can be set anywhere, so that innumerable expressions are conceivable for the same desired floor reaction force; if, however, a desired floor reaction force is represented using, in particular, a desired floor reaction force central point (the desired position of the central point of a total floor reaction force) as the point of action, then the moment component of the desired floor reaction force except for a vertical component (the moment component about a vertical axis (Z-axis)) will be zero. In other words, a horizontal component (the moment about horizontal axes (X-axis and Y-axis)) of the moment of the desired floor reaction force about the desired floor reaction force central point will be zero.

In a gait that satisfies a dynamic balance condition, the ZMP calculated from a desired motion trajectory of the robot 1 (the point at which a moment excluding its vertical component becomes zero, the moment acting about the point due to the resultant force of the inertial force calculated from the desired motion trajectory and the gravity) coincides with the desired floor reaction force central point. This is, therefore, equivalent to providing a desired ZMP trajectory in place of a desired floor reaction force central point trajectory.

Here, when walking of the robot 1 is performed, the vertical component of a translational floor reaction force is subordinately determined as the vertical position of the body 3 (body height) of the robot 1 is determined by the technique for determining a body height previously proposed in, for example, Japanese Unexamined Patent Application Publication No. 10-86080 by the present applicant. Furthermore, the horizontal component of the translational floor reaction force is also subordinately determined as the body horizontal position trajectory (or the positional trajectory of the total center of gravity) of the robot 1 is determined such that the horizontal component of the moment generated about a desired ZMP by the resultant force of an inertial force attributable to a motion of a desired gait and gravity becomes zero. For this reason, when performing the walking of the robot 1, only the desired ZMP may be set as the physical amount to be explicitly set in relation to the floor reaction force of the desired gait.

Meanwhile, if a travel of the robot 1, e.g., running of the robot 1, is performed with a gait that includes a period during which the floor reaction force becomes zero or substantially zero, then a translational floor reaction force vertical component is also important in controlling the operation of the robot 1. Hence, it is preferred to explicitly set the desired trajectory of the translational floor reaction force vertical component and then to determine the trajectory of a desired body vertical position or the like of the robot 1. Also, when the walking of the robot 1 is performed, if the robot 1 is to travel on a floor surface with a low friction coefficient (on a low-μ road), it is preferred to explicitly set the desired trajectory of the translational floor reaction force vertical component to prevent slippage or the like of the robot 1, because the translational floor reaction force vertical component (more precisely, the component of the translational floor reaction force that is perpendicular to the floor surface) influences a frictional force. Furthermore, according to the embodiments of the present invention, in a desired gait finally output by the gait generating device 100, a corrected desired floor reaction force moment (a moment whose horizontal component is not necessarily zero) is generated about a desired ZMP.

Thus, in the embodiments of the present description, the constituent elements related to the floor reaction forces of desired gaits output from the gait generating device 100 include a corrected desired floor reaction force moment about a desired ZMP and a desired translational floor reaction force vertical component in addition to a desired ZMP trajectory.

And, in the present description, a desired gait output by the gait generating device 100 is used to mean "a set of a desired motion trajectory and a desired floor reaction force trajectory in the period of one step or a plurality of steps" in a broad sense, and to mean "a set of a desired motion trajectory and a desired floor reaction force trajectory that includes a desired ZMP, a corrected desired floor reaction force moment and a desired translational floor reaction force vertical component in the period of one step" in a narrow sense.

However, according to the embodiments of the present description, in a desired gait (provisional desired gait) prepared in the process before a final desired gait (a desired gait output from the gait generating device 100) is determined, the horizontal component of a desired floor reaction force moment about a desired ZMP is set to zero as defined by an original desired ZMP. Accordingly, in a provisional desired gait other than a desired gait that is finally determined, a gait obtained by removing a corrected desired floor reaction force moment from the desired gait in the aforesaid narrow sense is used to mean a desired gait. Supplementally, according to the embodiments in the present description, a desired gait (a provisional desired gait) prepared in the process before a final desired gait (a desired gait output by the gait generating device 100) is determined is closely associated with the present invention. Hence, the majority of a desired gait appearing in the following explanation will be used to mean a gait (a gait that satisfies a desired ZMP) obtained by removing a corrected desired floor reaction force moment from a desired gait in the aforesaid narrow sense.

In the following explanation, "a floor reaction force vertical component" will mean "a translational floor reaction force vertical component," and the vertical component (a component about a vertical axis) of the moment in a floor reaction force will use the term "moment" to distinguish it from "a floor reaction force vertical component." Similarly, "a floor reaction force horizontal component" will mean "a translational floor reaction force horizontal component."

"One step" of a desired gait will be used to mean a period from the moment one leg body 2 of the robot 1 lands to the moment the other leg body 2 lands.

A two-leg supporting period in a gait refers to a period during which the robot 1 supports its own weight by the two leg bodies 2, 2, a one-leg supporting period refers to a period during which the robot 1 supports its own weight only by one leg body 2, and a floating period refers to a period during which both leg bodies 2, 2 are apart from a floor (floating in the air). In the one-leg supporting period, the leg body 2 not supporting the self-weight of the robot 1 is referred to as a free leg. A running gait of the robot 1, in which the one-leg supporting period and the floating stance period are alternately repeated, does not have the two-leg supporting period. In this case, during the floating period, both leg bodies 2, 2 do not support the self-weight of the robot 1; however, for the sake of convenience, the leg body 2 that was a free leg and the leg body 2 that was a supporting leg during a one-leg supporting period immediately before the floating period will be referred to as a free leg and a supporting leg, respectively, even in the floating period.

The trajectory of a desired gait is described using a global coordinate system (a coordinate system fixed to a floor). As a global coordinate system, a supporting leg coordinate system defined, for example, on the basis of landing position/posture of the supporting leg foot 22 is used. This supporting leg coordinate system is, for example, a coordinate system in which the point at which a perpendicular line extended to a floor surface from the center of the ankle joint to which the foot 22 is connected intersects with the floor, while substantially the entire bottom surface of the supporting leg foot 22 is in contact with the floor, is defined as the origin, and when the supporting leg foot 22 is projected onto a horizontal plane that passes the origin, the longitudinal direction of the foot 22 is defined as the X-axis direction and the lateral direction is defined as the Y-axis direction (the Z-axis direction being the vertical direction). In the following explanation, the X, Y, Z coordinates will mean the coordinates in this supporting leg coordinate system unless otherwise specified.

FIG. 5 is a block diagram showing the details of the gait generating device 100. Referring to this FIG. 5, more specific overview of the processing of the gait generating device 100 will be explained below.

As illustrated, the gait generating device 100 is equipped with a gait parameter determiner 100*a*. The gait parameter determiner 100*a* determines the values of gait parameters that define a desired gait or a time series table. This gait parameter determiner 100*a* is responsible for the processing related to the core of the present invention.

According to the embodiments of the present description, a gait parameter determined by the gait parameter determiner 100*a* includes the parameters that define a desired foot position/posture trajectory, a desired arm posture trajectory, a desired ZMP trajectory, and a desired floor reaction force vertical component trajectory, respectively, of a desired gait.

When the gait generating device 100 generates a desired gait, estimated landing position/posture and estimated landing time of the free leg foot 22, or basic required values (required parameters) for generating a gait, such as the length of a step and moving velocity, are supplied to the gait generating device 100 from the aforesaid joystick 73 or an action planner (a device for preparing action plans of the robot 1), which is not shown. Alternatively, the gait generating device 100 reads the required parameters from a storage medium in which the aforesaid required parameters have been stored beforehand and retained. Then, the gait parameter determiner 100*a* of the gait generating device 100 determines a gait parameter on the basis of the required parameters.

In the embodiments of the present description, the gait parameter determined by the gait parameter determiner 100*a* also includes parameters that define a reference body posture trajectory, a ZMP permissible range, and a floor reaction force horizontal component permissible range, respectively.

Although the aforesaid reference body posture trajectory is not the one finally output from the gait generating device 100, it is referred to when determining a desired gait. The reference body posture trajectory is supplied in relation to the body posture of the robot 1 from the joystick 73 or the action planner, or it is a body posture trajectory generated directly on the basis of a requirement (a requirement for retaining a body posture at a vertical posture, or the like) that has been set in advance. A desired body posture (hereinafter, "body posture" with no "reference" attached thereto will indicate a desired body posture) is generated such that it follows a reference body posture for a long time or coincides therewith.

To add a supplemental explanation regarding the aforesaid ZMP permissible range, in the embodiments in the present description, a desired gait is corrected so as to generate a corrected desired floor reaction force moment (this generally being not zero) about a desired ZMP. Therefore, the desired ZMP will be a point having a different definition from an original definition (the definition in that it is a point with zero floor reaction force moment horizontal component), and a ZMP that satisfies the original definition (hereinafter referred to as true ZMP) moves to a position shifted from the desired ZMP by a value obtained by dividing the corrected desired floor reaction force moment by a desired floor reaction force vertical component.

The true ZMP of a corrected gait (the desired gait finally output from the gait generating device 100) must fall within a range wherein at least ZMP can exist (a so-called supporting polygon: a range wherein a floor reaction force point of action (ZMP) can exist when it is assumed that no adhesive force acts between a floor and the bottom surface of the foot 22). Further, in order to secure a sufficient stability margin of the robot 1, the true ZMP of a corrected gait preferably falls within a range near the center in the range wherein the ZMP can exist. Hence, in the embodiments in the present description, a permissible range wherein a true ZMP of a corrected gait can exist is set. This range is called a ZMP permissible range. The ZMP permissible range is set to coincide with a range wherein a ZMP can exist or to be included in a range wherein a ZMP can exist.

As described above, the value obtained by dividing a corrected desired floor reaction force moment about a desired ZMP by a desired floor reaction force vertical component indicates the amount of positional deviation of a true ZMP from the desired ZMP; therefore, the amount of positional deviation of the true ZMP from the desired ZMP (a ZMP-converted value of a corrected desired floor reaction force moment) may be set instead of setting the corrected desired floor reaction force moment about the desired ZMP. Moreover, a ZMP permissible range can be converted into a permissible range of a corrected desired floor reaction force moment by multiplying the position of its boundary by a desired floor reaction force vertical component, and the permissible range of the corrected desired floor reaction force moment may be set in place of a ZMP permissible range.

The aforesaid floor reaction force horizontal component permissible range is the permissible range of a floor reaction force horizontal component that makes it possible to generate a frictional force having a magnitude that prevents the foot 22 from slipping on the surface of foot 22 of the robot 1 that is in contact with a floor. According to the embodiments in the present description, at least a motion of a desired gait (a desired motion) finally output from the gait generating device 100 is generated such that a floor reaction force horizontal component balancing out the horizontal component of an inertial force of the robot 1 that is produced thereby falls within a floor reaction force horizontal component permissible range.

The floor reaction force horizontal component permissible range set in the embodiments in the present description comes in one for normal gaits set by the processing of S022 to be discussed hereinafter, one for standard gaits set by the processing of S026, and one for gait corrections (for full-model corrections) set in S030. However, these floor reaction force horizontal component permissible ranges do not necessarily have to differ from each other; they may be the same. Meanwhile, the ZMP permissible range is only the one for gait corrections (for full-model corrections) set by the processing of S030.

Supplementally, a gait parameter for generating a desired gait includes parameter in addition to the aforesaid parameters. They are determined in the gait parameter determiner 100a such that they satisfy predetermined boundary conditions.

The gait parameter determined by the gait parameter determiner 100a is input to a desired instantaneous value generator 100b. Based on the input gait parameter, the desired instantaneous value generator 100b sequentially calculates (generates) the instantaneous values (values for each predetermined control processing cycle of the aforesaid control unit 60) of the constituent elements of a desired gait, such as desired body position/posture, desired foot position/posture, a desired ZMP, a desired floor reaction force vertical component, a ZMP permissible range, and floor reaction force horizontal component permissible range by using a dynamic model. Incidentally, FIG. 5 shows only some of the desired instantaneous values as representative ones.

The desired instantaneous values calculated by the desired instantaneous value generator 100b are input to a full-model corrector 100c. The full-model corrector 100c calculates corrected desired body position/posture obtained by correcting the desired body position/posture, which have been determined by the desired instantaneous value generator 100b, by using a full model as a dynamic model with high dynamic accuracy, and also calculates a corrected desired floor reaction force moment, which is a desired value of the horizontal component of a floor reaction force moment about a desired ZMP.

More generally, the full-model corrector 100c carries out processing of E1 or E2 to satisfy the following conditions D1 to D3. Specifically, the full model corrector 100c:

E1) corrects the body position/posture of a gait generated by the desired instantaneous value generator 100b, or E2) corrects the body position/posture of a gait generated by the desired instantaneous value generator 100b and also outputs a corrected desired floor reaction force moment about a desired ZMP (corrects a desired floor reaction force) in order to satisfy the following conditions:

D1) A dynamic balance condition is satisfied with accuracy that is higher than a gait generated by the desired instantaneous value generator 100b;

D2) A true ZMP (a ZMP satisfying the original definition that has been corrected by generating a corrected desired floor reaction force moment about a desired ZMP) falls within a ZMP permissible range (a permissible range that allows a sufficient stability margin to be maintained); and D3) A floor reaction force horizontal component falls within a floor reaction force horizontal component permissible range.

In the embodiments in the present description, the processing of E2 is carried out to satisfy the conditions D1 to D3. The processing by the full-model corrector 100c in the embodiments in the present description is the same as that explained in detail in, for example, PCT international publication WO/03/057427/A1 previously proposed by the present applicant (specifically, the processing of S038 shown in FIG. 13 of the publication). Hence, detailed explanation of the processing by the full-model corrector 100c in the present description will be omitted.

Further, in the embodiments in the present description, corrections by the full-model corrector 100c are made. Alternatively, such correction may be omitted, and the instantaneous values of a desired gait determined by the desired instantaneous value generator 100b may be directly output from the gait generating device 100.

Referring back to FIG. 4, the instantaneous values of a desired gait, including the instantaneous values of corrected desired body position/posture, a corrected desired floor reaction force moment about a desired ZMP, and desired foot position/posture determined as described above, are supplied to a composite-compliance control unit 101 (the portion enclosed by the dashed line in FIG. 4). The composite-compliance control unit 101 controls a joint actuator (an electric motor 64) so as to follow a desired gait, while maintaining the balance of the robot 1. More specific processing of the composite-compliance control unit 101 will be discussed later.

The above provides the outline of the gait generating device 100. The outline of the gait generating device 100 explained above will be applied to all embodiments in the present description.

A first embodiment in accordance with the present invention will now be specifically explained. According to the first embodiment, for each control processing cycle of the aforesaid control unit 60, the gait parameter determiner 100a uses a plurality of dynamic models to determine step by step a parameter for correcting a desired ZMP trajectory (more precisely, the parameter that defines a desired ZMP trajectory in a gait parameter) or exploratorily determine parameters other than the aforesaid parameter so as to determine a set of gait parameters that defines a desired gait. Then, the determined gait parameter and one dynamic model are used to determine the time series of the instantaneous values of a desired gait by the desired instantaneous value generator 100b.

A body motion mode and dynamic models used for generating gaits in the first embodiment will now be explained.

In a gait that includes a floating period, such as a running gait, or walking on a low-friction floor surface, there are cases where a dynamic balance condition cannot be satisfied while the floor reaction force horizontal component of a desired gait being within a permissible range (or within friction limits) simply by adjusting a body horizontal acceleration. Hence, in the present embodiment, two motion modes (a body translation mode and a body rotation mode) of the body 3 explained below are compositively generated so as to satisfy the dynamic balance condition while the floor reaction force horizontal component of a desired gait being within a permissible range (or within friction limits).

As shown in FIG. 6(a), if only a body horizontal acceleration is perturbed from a certain motion state, then the total center-of-gravity horizontal acceleration and the angular momentum about the total center-of-gravity are perturbed. More specifically, in the perturbation of the body horizontal acceleration, the floor reaction force moment about a desired ZMP (excluding the component about a vertical axis) and a floor reaction force horizontal component (to be precise, a translational floor reaction force horizontal component) are perturbed without perturbing a floor reaction force vertical component that dynamically balances out the resultant force of the inertial force generated thereby and gravity. This motion mode is referred to as the body translation mode.

In other words, a motion in which the horizontal component of a floor reaction force moment about a desired ZMP and a floor reaction force horizontal component (translational floor reaction force horizontal component) are changed without changing a floor reaction force vertical component is referred to as the body translation mode.

A change in the floor reaction force moment component per unit acceleration at that time is denoted by $\Delta Mp$ and a change in the floor reaction force horizontal component per unit acceleration is denoted by $\Delta Fp$. If the body 3 in the state shown in FIG. 6(a) is horizontally accelerated forward, then $\Delta Mp$ and $\Delta Fp$ act in the directions of the arrows shown in FIG. 6(a).

For the ease of sensory perception, a floor reaction force balancing out the resultant force of an inertial force generated by a motion and gravity has been used for the expression; however, an expression using the resultant force of the inertial force and gravity is theoretically accurate. Incidentally, the aforesaid resultant force and floor reaction force have the same magnitude but are in the opposite directions.

Meanwhile, if a body posture angular acceleration is perturbed about a certain point Pr from a certain motion state as shown in FIG. 6(b), then the angular momentum about the total center-of-gravity is perturbed without the total center-of-gravity being perturbed. This means that the body posture angular acceleration perturbation about the point Pr perturbs the horizontal component of the floor reaction force moment about a desired ZMP without causing a floor reaction force vertical component and a floor reaction force horizontal component (strictly speaking, a translational floor reaction force vertical component and a translational floor reaction force horizontal component) to be perturbed. This motion mode is referred to as the body rotation mode.

In other words, the motion in which the horizontal component of a floor reaction force moment about a desired ZMP is changed without causing a change in a floor reaction force vertical component and a floor reaction force horizontal component is referred to as the body rotation mode.

A change in the floor reaction force moment component per unit angular acceleration at that time is denoted by $\Delta Mr$ and a change in the floor reaction force horizontal component per unit angular acceleration is denoted by $\Delta Fr$. $\Delta Fr$ is zero. If an angular acceleration is applied such that the body inclines forward in the state shown in FIG. 6(b), then $\Delta Mr$ acts in the direction of an arrow shown in FIG. 6(b).

The motions of the body 3 include a body vertical movement mode in addition to the body translation mode and the body rotation mode. This is a motion for moving the body 3 in the vertical direction.

In the first embodiment, the gait generating device 100 generates gaits by using a plurality of dynamic models shown below. In the present embodiment, three dynamic models, for example, first to third ones are used as the plurality of dynamic models.

FIG. 7 shows an example of the first dynamic model (more precisely, a structure of a motion/floor reaction force model that expresses the relationship between motions of the robot 1 and floor reaction forces in the first dynamic model). The first dynamic model is a model constructed of an inverted pendulum having a body mass point corresponding to the body 3 and foot mass points corresponding to feet 22, the horizontal motion of the body mass point corresponds to the aforesaid body translation mode. The body mass point is a point that has a predetermined positional relationship with the representative point of the body 3 in a local coordinate system arbitrarily set fixedly on the body 3. Similarly, each foot mass point is a point that has a predetermined positional relationship with the representative point of the foot 22 in a local coordinate system arbitrarily set fixedly on the foot 22 corresponding thereto. The first dynamic model is the dynamic model previously illustrated in Japanese Unexamined Patent Application Publication No. 2002-542574 or PCT international publication WO/02/040224 by the present applicant. Hence, detailed explanation will be omitted in the present description. The dynamics (the relationship between motions and floor reaction forces) of the first dynamic model is represented by expressions 1a to 1d when variables are defined as follows.

msup1: Mass of supporting leg foot mass point; mswg1: Mass of free leg foot mass point; mb1: Mass of body mass point; mtotal: Total mass of the robot 1 (=msup1+mswg1+mb1); mfeet: Mass of both legs (=msup1+mswg1); xsup: Position of supporting leg foot mass point; xswg: Position of free leg foot mass point; xb: Position of body mass point; h: Height of inverted pendulum (the height from the supporting point of the inverted pendulum to the body mass point); g: Gravitational acceleration constant; G: Gravitational acceleration vector whose X, Y coordinate components are zero, and Z coordinate component is −g. In the present description, $d2X/dt2$ relative to an arbitrary variable X means the second-order differential value of X.

Leg total inertial force moment about point
P=msup1*(xsup1−xp)*G−msup1*(xsup1−xp)
*d2xsup1/dt2+mswg1*(xswg1−xp)*G−mswg*
(xswg1−xp)*d2xswg1/dt2           Expression 1a Leg total inertial force moment about point
P=mfeet*(ZMPfeet−xp)*G           Expression 1b ZMPpend=mtotal/mb*Desired ZMP−mfeet/
mb*ZMPfeet           Expression 1c Horizontal component of d2xb/dt2=g/h*(Horizontal
component of xb−Horizontal component of
ZMPpend)           Expression 1d where ZMPpend denotes the ZMP of the body mass point and the position of the supporting point of the inverted pendulum. ZMPfeet denotes the ZMP (ZMP-converted value of leg total inertial force moment; hereinafter referred to as leg ZMP) associated in a pseudo manner with a moment (leg total inertial force moment) generated about a certain point P by the resultant force (total inertial force) of an inertial force produced by the motions of both leg bodies 2,2 (both foot mass points) and gravity, the position of the point P is xp. In this case, the point P is set such that the approximate accuracy of the first dynamic model becomes as high as possible. Supplementally, in the first dynamic model, as the ratio of the mass of both legs mfeet relative to the total mass mtotal approximates zero, the linearity of a simple inverted pendulum becomes higher.

FIG. 8 is a block diagram showing the processing of calculating body position/posture by using the first dynamic model. In the first dynamic model, desired body position/posture are calculated by performing calculation according to the block diagram of the figure from desired foot position/posture, a desired ZMP, and a desired body posture. In this case, in the processing of calculating body position/posture by using the first dynamic model, the body posture is identical to a reference body posture. Here, a leg ZMP calculator 200 in the block diagram is adapted to calculate ZMPfeet on the basis of the aforesaid expressions 1a and 1b, and a linear inverted pendulum 201 is adapted to determine the horizontal component of d2xb/dt2 on the basis of the aforesaid expression 1d and then subject the determined horizontal component to second-order integration so as to determine the horizontal position xb of the body mass point. A body position/posture determiner 202 determines desired body position/posture from a desired body posture and the horizontal position xb of the body mass point. In this case, the desired body posture output by the body position/posture determiner 202 is identical to the desired body posture (reference body posture) that is input. Further, the vertical position of the body mass point (the height of the inverted pendulum) is determined in the body position/posture determiner 202 such that the resultant force of the inertial force in the vertical direction of the total center-of-gravity of the first dynamic model and the gravity balances out a desired floor reaction force vertical component (such that it is equal to a desired floor reaction force vertical component with a reversed sign).

FIG. 9 shows an example of the second dynamic model (more precisely, of the second dynamic model, the structure of a motion/floor reaction force model representing the relationship between motions and floor reaction forces of the robot 1). As illustrated, the second dynamic model is a model composed of a total of three mass points, namely, two mass points (foot mass points) 2m, 2m corresponding to the individual leg bodies 2 of the robot 1 and a mass point corresponding to the body 3 (body mass point) 24m, and a flywheel FH that has inertia but no mass. The body mass point is a point that has a predetermined positional relationship with the representative point of the body 3 in a local coordinate system arbitrarily set fixedly on the body 3. Similarly, each foot mass point is a point that has a predetermined positional relationship with the representative point of the foot 22 in a local coordinate system arbitrarily set fixedly on the foot 22 corresponding thereto. The second dynamic model is the dynamic model shown in PCT international publication WO/03/057427/A1 previously proposed by the present applicant. Hence, detailed explanation will be omitted in the present description. The dynamics of the second dynamic model is represented by expressions 2a to 2c when variables are defined as follows. Here, for easy understanding of the present description, only the dynamic equations (expressions indicating the relationships between motions and floor reaction forces) on a sagittal plane (plane including a longitudinal axis (X axis) and a vertical axis (Z axis)) will be described, and the dynamic equations on a lateral plane (plane including a lateral axis (Y axis) and the vertical axis (Z axis)) will be omitted.

Zsup2: Vertical position of supporting leg mass point; Zswg2: Vertical position of free leg mass point; Zb2: Vertical position of body mass point; ZGtotal2: Vertical position of the total center-of-gravity; Xsup2: Horizontal position of supporting leg mass point; Xswg2: Horizontal position of free leg mass point; Xb2: Horizontal position of body mass point; XGtotal2: Horizontal position of total center-of-gravity; θby2: Body posture angle about Y-axis relative to vertical direction (inclination angle); mb2: Mass of body mass point; msup2: Mass of supporting leg mass point; mswg2: Mass of free leg mass point; mtotal: Total mass of robot (=mb2+msup2+mswg2); J: Body inertial moment (Equivalent inertial moment in the body rotation mode); Fx: Floor reaction force horizontal component (specifically, the component in the longitudinal direction (X axis) of a translational floor reaction force); Fz: Floor reaction force vertical component (specifically, the component in the vertical direction (Z axis) of a translational floor reaction force); and My: Floor reaction force moment about a desired ZMP (specifically, the component about a lateral axis (Y axis) of a floor reaction force moment).

$$Fz=mb2*(g+d2Zb2/dt2)+msup2*(g+d2Zsup2/dt2)+mswg2*(g+d2Zswg2/dt2) \quad \text{Expression 2a}$$

$$Fx=mb2*d2Xb/dt2+msup2*d2Xsup2/dt2+mswg2*d2Xswg2/dt2 \quad \text{Expression 2b}$$

$$My=-mb2*(Xb2-Xzmp)+(g+d2Zb2/dt2)+mb2* \\ (Zb2-Zzmp)*d2Xb2/dt2-msup2*(Xsup2- \\ Xzmp)*(g+d2Zsup2/dt2)+msup2*(Zsup2-Zzmp) \\ *d2Xsup2/dt2-mswg2*(Xswg2-Xzmp)*(g+ \\ d2Zswg2/dt2)+mswg2*(Zswg2-Zzmp)* \\ (d2Xswg2/dt2)+J*d2\theta by/dt2 \quad \text{Expression 2c}$$

The following relational expression holds for the position of the total center-of-gravity of a robot:

$$ZGtotal2=(mb2*Zb2+msup2*Zsup2+mswg2*Zswg2)/mtotal \quad \text{Expression 2d}$$

$$XGtotal2=(mb2*Xb2+msup2*Xsup2+mswg2*Xswg2)/mtotal \quad \text{Expression 2e}$$

The second dynamic model is constructed such that the dynamics of the leg bodies 2, 2 (the dynamics of the mass points 2m, 2m) and the dynamics of the body 3 (the dynamics of the mass point 24m and the flywheel FH) do not interfere with each other, the dynamics of the entire robot 1 being expressed by the linear combinations thereof. Further, the relationship between the motions of the body 3 and floor reaction forces is divided into the relationship between the translational motions of the body 3 (the body translation mode) and floor reaction forces and the relationship between the rotational motions of the body 3 (the body rotation mode) and floor reaction forces. To be specific, a floor reaction force generated by a horizontal motion of the body mass point 24m corresponds to a floor reaction force generated by a horizontal translational motion of the body 3 (the body translation mode), and a floor reaction force generated by a rotational motion of the flywheel corresponds to a floor reaction force generated by a rotational motion of a posture angle of the body 3 (the body rotation mode).

The mass of the arm bodies of the robot 1 is included in the body mass point 24m, and the body mass point 24m has the mass that includes the mass of the arm bodies. In the present embodiment, as it will be discussed later, the motions of the arm bodies (arm swinging motion) in a desired gait are performed such that the relative position of the total center-of-gravity of both arm bodies in relation to the body 3 remains unchanged while canceling the moment of an inertial force about the vertical axis that is generated in the robot 1 by a motion other than the arm swinging of the robot 1; therefore, the influences exerted by the arm swinging motions of the arm bodies (excluding the component about the vertical axis) and the influences exerted on a floor reaction force horizontal component are ignored. Supplementally, the ratio of the mass of both leg bodies 2,2 (the sum of the masses of both foot mass points) relative to the total mass of the second dynamic model is larger than the ratio of the mass of both leg bodies 2,2 (the sum of the masses of both foot mass points) relative to the total mass of the aforesaid first dynamic model.

FIG. 10 illustrates a third dynamic model (to be more precise, the structure of a motion/floor reaction force model expressing the relationship between the motions of the robot 1 and floor reaction forces in the third dynamic model). As shown in the figure, the third dynamic model is a model that has corresponding mass points in the body 3, each foot 22, and in the portion near the knee joint of each leg body 2 (the portion adjacent to the knee joint of a thigh link), respectively, the body 3 having an inertia (inertial moment) Ib about the body mass point. In the third dynamic model, the relationship between the motions of the robot 1 and floor reaction forces is described as the relationship between the translational motions of the mass points and the posture changing motions of the body 3 and floor reaction forces (the translational floor reaction forces and the floor reaction force moments about desired ZMPs), as with the aforesaid second dynamic model, although the dynamic equations will be omitted. Once the position/posture of the body 3 of the robot 1 and the positions/postures of both feet 22 are determined, the position/posture of each portion of the each leg body 2 will be uniquely determined. In the third dynamic model, therefore, a predetermined restrictive condition is added to the positional relationship among the body mass point, the foot mass points, and the mass points of the portions near the knee joints, permitting the motions of the mass points within the range of the restrictive condition.

The first to the third dynamic models have dynamic accuracy that increases in this order. In the present embodiment, a restrictive condition related to floor reaction force horizontal components is added to each dynamic model, permitting motions of the mass points of each dynamic model within a range that satisfies the restrictive condition, as will be described hereinafter.

The full model used in the aforesaid full-model corrector 100c is a multi-mass-point model having a mass point in each link of the robot 1, as shown in, for example, FIG. 11. In this case, each link of the robot 1 may have inertia about the mass point corresponding thereto.

Now, in relation to the first embodiment of the present invention, the processing of the gait generating device 100 will be explained in more detail.

The gait generating device 100 in the present embodiment defines, as the unit, the desired gait (the desired gait in the aforesaid narrow sense) for the period of one step from the moment one leg body 2 of the robot 1 lands to the moment the other leg body 2 lands, and generates desired gaits for the period of the one step in order. Here, the desired gait to be newly generated is referred to as "the current time's gait," the next desired gait is referred to as "the next time's gait," and the further next desired gait is referred to as "the next but one time's gait." Further, the desired gait generated immediately before "the current time's gait" is referred to as "the last time's gait." The "current time's gait" corresponds to "the desired gait in a predetermined period" in the present invention.

When the gait generating device 100 newly generates a current time's gait, the estimated landing positions/postures, the required values (requests) of the estimated landing time, and the like of the free leg foot 22 of the robot 1 for two steps ahead are input as required parameters for the gait to the gait generating device 100 (or the gait generating device 100 reads the required parameters from storage). Based on these required parameters, the gait generating device 100 generates a corrected desired body position/posture trajectory, a desired foot position/posture trajectory, a desired ZMP trajectory, a desired floor reaction force vertical component trajectory, a desired arm posture trajectory, a corrected desired floor reaction force moment trajectory, and the like. In the present embodiment, required parameters include the parameters that specify the requirement on a reference body posture, the requirement on a relative arm posture in relation to a body posture, the requirement on the pattern of a desired floor reaction force vertical component, and the requirement on a floor friction force (or a friction coefficient) in addition to the required values of the estimated landing position/posture and the estimated landing time of the free leg foot 22 for two steps ahead. The requirement on the reference body posture is, for example, the requirement for maintaining the body posture at a vertical posture, and the requirement on an arm posture is, for example, the requirement for maintaining the arm posture at a predetermined posture relative to the body 3. Further, the requirement on the pattern of a desired floor reaction force vertical component is, for example, the requirement for setting a desired floor reaction force vertical component to zero in a floating period of the robot 1 and for changing the desired floor reaction force vertical component in a trapezoidal pattern in a one-leg supporting period. Further, the requirement on the friction force of a floor is, for example, the requirement for setting a certain range of desired floor reaction force horizontal components in relation to the limit of friction forces determined by the product of a desired floor reaction force vertical component and a friction coefficient (required value).

The details of the gait generation processing of the gait generating device 100 will be given below with reference to FIG. 12 to FIG. 27. FIG. 12 is a flowchart (structured flowchart) showing the main routine of the gait generation processing executed by the gait generating device 100. The procedure of the main routine processing itself is the same as that in, for example, the aforesaid PCT international publication WO/03/057427/A1 (hereinafter referred to as "publication document 1") by the present applicant except for a part of its subroutine processing.

First, in S010, various types of initializations are performed, including the initialization of time t to zero. This processing is performed when the gait generating device 100 is started up or the like. Subsequently, the procedure advances to S014 via S012, and the gait generating device 100 waits for a timer interrupt for each control cycle (the calculation processing cycle in the flowchart in FIG. 12). The control cycle is denoted by Δt.

Subsequently, the procedure proceeds to S016 wherein it is determined whether the gait is changing, and if the gait is changing, then the procedure proceeds to S018, or if the gait is not changing, then the procedure proceeds to S030. Here, the aforesaid "the change of a gait" means the timing at which the generation of a current time's gait is begun after the generation of the last time's gait has been completed. For example, a control cycle following the control cycle in which the generation of the last time's gait has been completed is the timing of a gait change.

When the procedure proceeds to S018, time t is initialized to zero, then it proceeds to S020 wherein a supporting leg coordinate system of next time's gait, a supporting leg coordinate system of next but one gait, a current time's gait cycle, and a next time's gait cycle are read. These supporting leg coordinate systems and gait cycles are decided by the aforesaid required parameters. More specifically, in the present embodiment, the required parameters supplied from a joystick 44 or the like to the gait generating device 100 include the required values of the estimated landing positions/postures of the free leg foot 22 (the foot positions/postures in a state wherein, after landing, the foot 22 is rotated without a slippage such that substantially the entire sole thereof is in contact with a floor surface) for two steps ahead and estimated landing time. The required value of the first step and the required value of the second step are supplied as the ones corresponding to the current time's gait and the next time's gait, respectively, to the gait generating device 100 before the generation of the current time's gait begins (at the gait change timing of the aforesaid S016). Incidentally, these required values can be changed in the middle of the generation of the current time's gait.

Then, the supporting leg coordinate system of next time's is decided on the basis of the required values of the estimated landing position/posture of the first-step free leg foot 22 (the free leg foot 22 in the current time's gait) in the aforesaid required parameters. Further, the supporting leg coordinate system of next but one time's gait is decided on the basis of the required values of the estimated landing positions/postures of the second-step free leg foot 22. Further, the current time's gait cycle is defined as the time from the estimated landing time (required value) of the supporting leg foot 22 of the current time's gait to the time estimated landing time (required value) of the free leg foot 22 of the first step (the current time's gait), and the next time's gait cycle is defined as the time from the estimated landing time (required value) of the first-step free leg foot 22 to the estimated landing time (required value) of the second-step free leg foot 22.

The processing of S020 is the same as the processing of S020 of FIG. 13 in the aforesaid publication document 1, so that no further explanation will be given in the present description.

Subsequently, the procedure proceeds to S022 wherein the gait generating device 100 determines the gait parameter of a normal gait (normal gait parameter) as a virtual cyclic gait that follows the current time's gait. As the gait parameter determined here, there are a foot trajectory parameter that defines a desired foot position/posture trajectory of each foot 22 in the normal gait, a reference body posture trajectory parameter that defines the body posture trajectory providing a reference, an arm posture trajectory parameter that defines a desired arm posture trajectory, a ZMP trajectory parameter that defines a desired ZMP trajectory, a floor reaction force vertical component trajectory parameter that defines a desired floor reaction force vertical component trajectory, and a parameter that defines a desired floor reaction force horizontal component permissible range.

The "normal gait" in the present description is used to mean a cyclic gait that does not develop discontinuity in the motion states (the states of foot position/posture, body position/posture, and the like) of the robot 1 at the boundaries of gaits when the gait is repeated. The "normal gait" includes, of course, a cyclic gait for making the robot 1 advance straight and also includes a cyclic gait for making the robot 1 turn. In this case, setting the turning rate to zero means advancing straight; therefore, "turning" includes advancing straight in a broad sense. For this reason, the "normal gait" may be frequently referred to as "normal turning gait" in the embodiments in the present description.

The normal turning gait is explained in detail in, for example, the aforesaid publication document 1 and Japanese Patent Application No. 2000-352011, so that detailed explanation thereof in the present description will be omitted. The outline thereof is given below.

In the present embodiment, the normal turning gait, which is a cyclic gait, is the gait for two steps of the robot 1. In other words, a gait composed of the first turning gait following the current time's gait and the second turning gait following the first turning gait is defined as the gait for one cycle of the normal turning gait, and the gait for one cycle is repeated. If the current time's gait to be generated is, for example, a running gait for the robot 1 to run (gait having a one-leg supporting period and a floating period), then the first turning gait and the second turning gait of the normal turning gait are also running gaits, while if it is a walking gait for the robot 1 to walk (gait having a one-leg supporting period and a two-leg supporting period), then the first turning gait and the second turning gait of the normal turning gait are also walking gait. This means that the basic gait modes of the first turning gait and the second turning gait are the same as those of the current time's gait.

In the following explanation, unless otherwise specified, running gaits will be taken as examples of the gaits to be generated.

Normal turning gaits are provisionally prepared to determine the state amounts of a motion of the robot 1, such as a divergence component, a body vertical position/velocity, a body posture angle and the angular velocity thereof, at the terminating end of the current time's gait in the gait generating device 100, and they are not directly output from the gait generating device 100.

Incidentally, "divergence" means that the position of the body 3 of the robot 1 is undesirably shifted to a position that is far apart from the positions of both feet 22 and 22. The value of a divergence component is a numeric value that indicates how far the position of the body 3 of the robot 1 is apart from the positions of both feet 22 and 22 (more specifically, the origin of the global coordinate system (supporting leg coordinate system) set on the ground contact surface of the supporting leg foot 22). For instance, in the embodiments in the present description, a divergence component relative to each dynamic model described above is determined by the following expression.

$$\text{Divergence component} = \text{Body mass point horizontal position} + \text{Body mass point horizontal velocity}/\omega 0 \quad \text{Expression 3}$$

$\omega 0$ in this expression 3 denotes a predetermined value. For a divergence component in a gait, a body horizontal position and a body horizontal velocity are used in place of the body mass point horizontal position and the body mass point horizontal velocity in expression 3 to determine the divergence component.

In the embodiments in the present description, gaits (current time's gaits) are generated using divergence components as indicators such that desired gaits are continuously generated without causing the aforesaid divergence. More specifically, a current time's gait is generated such that a normal gait (more precisely, a normal gait parameter) following a current time's gait to be generated is determined on the basis of the required parameters or the like related to the aforesaid current time's gait, an initial divergence component of the normal gait is determined, and then the terminating divergence component of the current time's gait is made to agree with the initial divergence component of the normal gait (more generally, the current time's gait is made to continue or approximate to the normal gait).

Returning to the main subject, in S022, the gait parameter of the normal gait is determined according to the flowchart of the subroutine processing shown in FIG. 13. More specifically, the foot trajectory parameter, the reference body posture trajectory parameter, the arm trajectory parameter, the ZMP trajectory parameter, the floor reaction force vertical component trajectory parameter, and the parameter defining the desired floor reaction force horizontal component permissible range related to the normal gait described above are individually determined by the processing of S100 to S110. Then, in S112, initial time Ts of the normal gait and a one-step period (the time for one cycle of the normal gait) Tcyc are redefined. The processing is the same as the processing of the flowchart of FIG. 15 in the aforesaid publication document 1, so that detailed explanation thereof will be omitted. The parameters of the normal gait determined in S100 to S110 are the parameters that are determined to satisfy the requirements related to the gait, which are represented by the required parameters described above, while the trajectories specified by the individual parameters satisfy the periodicity of the normal gait at the same time. For example, as explained with conjunction with the flowchart of FIG. 15 in the aforesaid publication document 1, the foot trajectory parameter of the normal gait is determined such that the estimated landing position/posture of the free leg foot 22 of the first turning gait following the current time's gait (the estimated landing position/posture observed in the aforesaid supporting leg coordinate system of next time's gait) agrees with the estimated landing position/posture (required values) of the second step described above, and the estimated landing position/posture of the free leg foot 22 of the second turning gait (the estimated landing position/posture observed in the aforesaid supporting leg coordinate system of next but one time's gait) agrees with the estimated landing position/posture (required values) of the free leg foot 22 of the current time's gait. The ZMP trajectory parameter is determined on the basis of a foot trajectory parameter such that a desired ZMP is positioned substantially near the center of the ground contact surface of the supporting leg foot 22 and continuously changes over the entire period of the normal gait.

The initial time Ts of the normal gait redefined in S112 of FIG. 13 means the time of the start point when creating gaits for one cycle of the normal gait, as will be described later (this differs from the time of the terminating end of the current time's gait in the present embodiment), and it is the time immediately before the start of the floating period (the timing when a desired floor reaction force vertical component becomes zero) of the first turning gait. Further, the one-step period Tcyc of the normal gait is the period of the total time of the first turning gait and the second turning gait of the normal gait. The normal gait is a gait whose state at arbitrary time Tx (the state of the position/posture of each portion of the robot 1 and the changing velocities thereof) becomes the same as the state at time Tx+Tcyc, depending on the periodicity thereof. The normal gait is a cyclic gait having the gait for two steps as one cycle; therefore, in the present description, the total time of the one-cycle period (the first turning gait and the second turning gait) is regarded as one-step period of the normal gait.

Supplementally, the parameters of the normal gait determined by the processing of S100 to S110 are not all the parameters constituting the normal gait parameter. In the present embodiment, the gait parameter defining the normal gait (normal gait parameter) includes the position and velocity of the body 3 and the posture angle and the angular velocity of the body 3 at the starting end (the start time of the period) or the terminating end (the end time of the period) of the one-cycle period of the normal gait and the peak value of a body inclination restoring moment ZMP-converted value, which will be discussed hereinafter, in addition to the parameters determined in S022. Of these parameters, the horizontal position and horizontal velocity of the body 3, the angular velocity of a posture angle of the body 3, and the peak value of the body inclination restoring moment ZMP-converted value are exploratorily determined by the processing of S024, which will be discussed hereinafter. The normal gait parameter is a gait parameter that allows a normal gait to be uniquely generated using the values of the parameters constituting the normal gait parameter and the aforesaid dynamic models.

Subsequently, the procedure proceeds to S024 wherein the initial state of the normal gait is calculated. The initial state to be calculated here includes the initial body horizontal position/velocity (the initial body position and the initial body velocity in the horizontal direction), the initial body vertical position/velocity (the initial body position and the initial body velocity in the vertical direction), the initial divergence component, and the initial body posture angle and its angular velocity of the normal gait. The calculation of the initial state is performed by step-by-step exploratory processing that sequentially uses the aforesaid first to third dynamic models according to the flowchart of the subroutine processing of FIG. 14.

As shown in FIG. 14, the processing of S200-1, S200-2 . . . S200-n (n=3 in the first embodiment), S204, S222, and S224 is sequentially carried out to determine, lastly on an n-th model (an n-th dynamic model), the initial state of the normal gait such that the boundary condition of the normal gait (the condition in which the state at arbitrary time of the normal gait and the state at time in one cycle agree or substantially agree) is satisfied. Incidentally, the initial state of the normal gait lastly determined by the processing of FIG. 14 is the state at the time of the terminating end of the current time's gait (the original initial time 0 of the normal gait); however, in the present embodiment, the state at initial time Ts set in S112 of FIG. 13 is defined as the initial state of the normal gait until the processing of S200-1 to S200-n is terminated.

Supplementally, "the first model," "the second model,". . ., and "the n-th model" in FIG. 14 refer to the first dynamic model, the second dynamic model . . . , and the n-th dynamic model. Hereinafter, in this description, generally, a k-th dynamic model (k=1, 2, . . . , n) will be referred to simply as the k-th model in some cases. In the first embodiment, n=3. Further, the body inclination restoring moment ZMP-converted value peak value ZMPrecpeak determined in the processing of the flowchart shown in FIG. 14 indicates the peak value of the ZMP-converted value ZMPrec (the amount of deviation from a reference desired ZMP (the desired ZMP defined by the ZMP trajectory parameters determined in S022)) of the floor reaction force moment required for bringing the body posture close to a reference body posture in the one-leg supporting period of the robot 1 (more specifically, the period from the moment immediately after the one-leg supporting period begins to the moment immediately before it ends. Hereinafter, it will be referred to as the body inclination angle restoring period in some cases), an example thereof being shown in FIG. 25. As shown in the figure, ZMPrec is shown in the trapezoidal patterns, the peak values (the heights of the trapezoids) being denoted by ZMPrecpeak.

The overview of the processing shown in FIG. 14 will be explained. First, the initial state (the state at time Ts) of the normal gait is exploratorily determined such that the boundary condition of the normal gait is satisfied on the first dynamic model (such that the normal gait generated using the normal gait parameter including the parameters determined in the aforesaid S022 and the first dynamic model satisfies the boundary condition). Then, the initial state of the normal gait determined using the first dynamic model is used as a new exploratory initial value to exploratorily determine anew the initial state time (the state at Ts) of the normal gait such that the boundary condition of the normal gait is satisfied on the second dynamic model (such that the normal gait generated using the normal gait parameter including the parameters determined in the aforesaid S022 and the second dynamic model satisfies the boundary condition). Further, the initial state of the normal gait determined using the second dynamic model is used as the search initial value to exploratorily determine anew the initial state (the state at Ts) of the normal gait such that the boundary condition of the normal gait is satisfied on the third dynamic model (such that the normal gait generated using the normal gait parameter including the parameters determined in the aforesaid S022 and the third dynamic model satisfies the boundary condition). More generally, when the quantity of the dynamic models is denoted by n, the processing in which the initial state of the normal gait determined using an (m−1)th dynamic model (m: integer of 2 or more but n or less) is used as the search initial value to exploratorily determine the initial state (the state at Ts) of the normal gait such that the boundary condition of the normal gait is satisfied on an m-th dynamic model (such that the normal gait generated using the normal gait parameter including the parameters determined in the aforesaid S022 and the m-th dynamic model satisfies the boundary condition) is repeated. Then, lastly, the initial state (the state at time 0) of the normal gait determined using the n-th dynamic model is obtained as the initial state to be determined (the normal gait parameter having the initial state as a parameter is determined).

The processing of S200-1 is, to be more specific, carried out as shown by the flowchart of FIG. 15. First, in S250, the initial states (the states at the initial time Ts of the normal turning gait) of foot positions/postures, a body posture angle θbs1, and the arm postures are determined on the basis of a normal turning gait parameter. These initial states are the states observed in the supporting leg coordinate system (the aforesaid supporting leg coordinate system of next time's gait) of the first turning gait. In this processing, the initial states of the foot positions/postures are determined to be the positions/postures of the feet 22 at time Ts in the foot position/posture trajectory calculated using a finite-duration setting filter on the basis of the foot trajectory parameter determined in the aforesaid S022. The finite-duration setting filter is explained in the aforesaid publication document 1 and the like, so that the explanation thereof will be omitted herein. The initial state of the body posture angle θbs1 is determined to be identical to the reference body posture angle at time Ts decided from the reference body posture trajectory parameter determined in S022, and the initial state of the arm postures are determined to be identical to the state at time Ts decided by the arm posture trajectory parameter determined in S022.

Subsequently, in S252, the initial (time Ts) body horizontal position, the initial body horizontal velocity, the initial body posture angular velocity, and the body inclination restoring moment ZMP-converted value peak value on the first model (the first dynamic model) are taken as the search objects (the search objects correspond to the parameters to be corrected in the aforesaid second invention), and the candidates (Xs1, Vx1, ωbs1, and ZMPrecpeak1) of the initial states of the search objects are provisionally determined (the initial values of the candidate values of the parameters of the search objects in the normal gait parameter are determined). In this case, the candidate values to be provisionally determined may be basically arbitrary; they may be determined on the basis of, for example, the initial states of the normal gait determined for generating the last time's gait. This provisional determination will provisionally determine the entire normal gait parameter, including the search objects. These provisionally determined values are the values observed in the supporting leg coordinate system of the first turning gait (the aforesaid supporting leg coordinate system of next time's gait).

Subsequently, the loop processing of S256 to S268 is carried out. To schematically explain the processing, a gait up to the terminating end (time Ts+Tcyc) of a normal gait is generated using the normal gait parameter including the search objects provisionally determined as described above and the first dynamic model. Then, it is determined whether the generated normal gait satisfies the boundary condition (the condition in which the states (the body horizontal position, the body horizontal velocity, the body posture angle, and the body posture angular velocity in the present embodiment) at the beginning and the end substantially agree), and if it does not satisfy the boundary condition, then the values of the search objects are changed. This is repeated so as to finally determine the initial states of the normal gait that can satisfy the boundary condition of the normal gait on the first model.

The following will explain the processing of S256 to S268 more specifically. In S256, the body vertical position and the body vertical velocity (Zs1, Vzs1) at the beginning (time Ts) of a normal gait on the first model are determined. In this case, they are determined such that the resultant force of the inertial force in the vertical direction of the total center-of-gravity of the robot 1 and gravity on the first model balances out a desired floor reaction force vertical component, and the vertical position of the total center-of-gravity satisfies the boundary condition of the normal gait. This processing is carried out in the same manner as that of the processing of S206 shown in FIG. 20 in the aforesaid publication document 1. However, the dynamic model used here is the aforesaid first model in the present embodiment, only the dynamic model being different from that in the publication document 1. Incidentally, (Zs1, Vzs1) depend upon Xs1, Vxs1, θbs1, and ωs1 determined or provisionally determined as described above.

Subsequently, in S258, a first model gait as the normal gait is generated using the first dynamic model up to the time Ts+Tcyc (the terminating end of the normal gait) on the basis of the normal gait parameter that includes the values of current search candidates, the vertical position and the vertical velocity of the body 3, and ZMPrecpeak1. This processing is executed by the subroutine processing shown by the flowchart of FIG. 17, and further, the processing of S304 of this FIG. 17 is executed by the subroutine processing shown by the flowchart of FIG. 18. Further, the processing of S412 of FIG. 18 is executed by the subroutine processing shown by the flowchart of FIG. 19. These processing will be described hereinafter.

Subsequently, in S260, the body horizontal position, the body horizontal velocity, and the body posture angle and its angular velocity at the terminating end of the gait (the first model gait) generated in S258 are converted into the values observed from the supporting leg coordinate system of the next one step of the first model gait (the supporting leg coordinate system of the first turning gait following the second turning gait of the first model gait), and the obtained values are denoted as (Xe1, Vxe1, θbe1, ωbe1).

Then, in S262, the differences between the values of the current (Xs1, Vxs1, θbs1, ωbs1) and the values of (Xe1, Vxe1, θbe1, ωbe1) are determined as boundary condition errors (errx, errv, errθ, errω) of the first model gait (normal gait). To satisfy the boundary condition of the normal gait, the boundary condition error must be substantially zero. The boundary condition error indicates the degree of deviation of the normal turning gait created in S258 from the boundary condition.

Subsequently, in S264, it is determined whether all of errx, errv, errθ, and errω fall within a sufficiently small (in the vicinity of zero) predetermined permissible range, and if the determination result is YES, then the loop processing of S256 to S268 is terminated (the processing of S200-1 is terminated). In this case, the current normal gait parameter is obtained as the normal gait parameter that can satisfy the boundary condition on the first model.

Meanwhile, if the determination result of S264 is NO, then the candidates of a plurality of (four in the present embodiment) search objects obtained by changing the values of the individual parameters by a predetermined extremely small amounts ΔXs, ΔVx, Δωbs, ΔZMPrecpeak are determined in the vicinity of the values of the current search objects (Xs1, Vx1, ωbs1, ZMPrecpeak1), and the same processing as that of S258 to S262 is carried out to determine the boundary condition errors corresponding to the candidates of the individual search objects on the basis of the normal gait parameter that includes the candidates of the individual search objects (the normal gait parameter having the search objects of the current normal gait parameter corrected to the newly determined candidates).

Subsequently, in S268, the new candidates of the search objects (Xs1, Vx1, ωbs1, ZMPrecpeak1) are determined by an exploratory technique, such as the steepest descent method or the simplex method, on the basis of the current (Xs1, Vx1, ωbs1, ZMPrecpeak1) and the boundary condition errors corresponding to the individual candidates of the search objects in the vicinity thereof. Then, the processing from S256 is repeated again.

As described above, (Xs1, Vx1, ωbs1, ZMPrecpeak1) being the search objects, the normal gait parameter that satisfies the boundary condition of the normal gait is exploratorily determined.

Incidentally, the processing of S200-1 explained above constitutes the first normal gait parameter determining means in the second invention. And, the gait parameter including the lastly searched (Xs1, Vx1, ωbs1, ZMPrecpeak1) by this processing corresponds to the first normal gait parameter in the second invention.

Supplementally, the basic concept (approach) of the processing of FIG. 15 is the same as that of the processing of FIG. 20 of the aforesaid publication document 1. However, in the embodiments in the present description, the aforesaid search objects include a body posture angular velocity and the peak value of a body inclination restoring moment ZMP-converted value. This is different from the processing of FIG. 20 of the aforesaid publication document 1. Further, a part of the detailed processing (subroutine processing) of the processing of S258, which will be discussed later, is also different from that in the aforesaid publication document 1.

Further, all the processing of S200-2, . . . , S200-n of FIG. 14 is carried out as shown by the flowchart of FIG. 16. This processing differs from the processing of FIG. 15 in the initial values of search objects set in S1202 and the dynamic models used in S1208 and S1216, the rest thereof being the same as the processing of FIG. 15. In FIG. 16, "n" generally denotes an integer of 2 or more and it is 2 or 3 in the present embodiment. More specifically, the processing of S200-2 is the processing in which "n" of FIG. 16 is set to "2" and the processing of S200-3 is the processing in which "n" of FIG. 16 is set to "3."

In S1202, the values of search objects previously determined (lastly determined values in S200-m) by using the m-th model (m=n−1) are set as the initial values (initial candidate values) of search objects composed of initial (time Ts) body horizontal position/posture, an initial body horizontal velocity, an initial body posture angular velocity, and the peak value of a body inclination restoring moment ZMP-converted value on the n-th model (the n-th dynamic model). Then, the processing of S1208 and S1216 creates a normal gait by using the n-th model.

The processing of S1208 in the processing of FIG. 16 is carried out by the subroutine processing shown by the flowchart of FIG. 17, as with S258 in FIG. 15, and further, the processing of S304 in this FIG. 17 is carried out by the subroutine processing shown by the flowchart of FIG. 18. Further, the processing of S412 in FIG. 18 is carried out by the subroutine processing shown by the flowchart of FIG. 19. The following will explain the processing of FIG. 17 to FIG. 19. In the explanation of the processing of these FIG. 17 to FIG. 19, "n" denotes an integer of 1, 2 or 3. If n=1, then the processing corresponds to the processing of S258 in FIG. 15, or if n=2 or 3, then it corresponds to the processing of S1202 in FIG. 16.

The processing of FIG. 17 is, as shown in the figure, the processing (S302 to S306) in which the (Xsn, Vxsn, θbsn, ωbsn, Zsn, Vzsn) provisionally determined or determined by the processing of FIG. 15 or FIG. 16 is taken as the initial state of a motion of the body 3 in a normal gait (S300), and the instantaneous values of the normal gait are actually created in time series up to time Ts+Tcyc (until the terminating state) from the initial (time Ts) state. Incidentally, "k" in FIG. 17 denotes the time of the time series of the instantaneous values of the normal gait to be created.

The processing of FIG. 18, which is the subroutine processing of S304 in FIG. 17 (the subroutine processing for determining the instantaneous values of a normal gait by using the n-th model) determines the instantaneous values of a desired floor reaction force vertical component, a desired ZMP, desired positions/postures of both feet, a reference body posture, a desired arm posture, a desired body vertical position, and a floor reaction force horizontal component permissible range by the processing of S400 to S410 on the basis of the parameters of a normal gait determined in S022.

Further, the processing of S412 determines the instantaneous values of a body horizontal acceleration and a body posture angular acceleration by using the n-th model (n denotes "1" in the processing of S200-1, "2" in the processing of S200-2, . . . , and "n" in the processing of S200-n. The same applies to FIG. 19, which will be discussed later) such that the conditions shown in the figure are satisfied. Then, the processing of S414 subjects the body horizontal acceleration and the body posture angular acceleration to the second-order integration so as to determine the instantaneous values of the body horizontal position and the body posture angle.

Supplementally, of the processing in FIG. 18, the processing other than S412 is the same as the processing of S400 to S410 and S414 of FIG. 22 in the aforesaid publication document 1. Hence, a detailed explanation of the processing shown in FIG. 18 except for the processing of S412 will be omitted.

In the processing of FIG. 19, which is the subroutine processing of S412 in FIG. 18, first, times Tm, Ts2, and Tm2 that define a body inclination angle restoring period of a normal gait are determined. These times individually define the period during which the aforesaid body inclination restoring moment ZMP-converted value ZMPrec is generated, as shown in FIG. 25. More specifically, the time immediately after a first one-leg supporting period begins following the initial time Ts of a normal gait is denoted by Tm, the time immediately before the one-leg supporting period ends is denoted by Ts2, and the time immediately after the next one-leg supporting period begins is denoted by Tm2 in determining the above times. And, a period [Tm,Ts2] and a period [Tm2,Te] are individually defined as the periods for generating ZMPrec (hereinafter referred to as the body inclination angle restoring period). This is the same as the processing of S500 in FIG. 23 in the aforesaid publication document 1.

Subsequently, in S502, it is determined whether current time k at which an instantaneous value of a normal gait is to be created (time within a normal gait that is being created) is within a body inclination angle restoring period. And, if the current time k is not time within the aforesaid body inclination angle restoring period, i.e., if the current time k is within the period from the moment immediately before the end of a one-leg supporting period to the moment immediately after the next one-leg supporting period begins (the period during which a desired floor reaction force vertical component is zero or close to zero), then the processing of S504 to S516 determines a body horizontal acceleration α of the body translational mode and a body angular acceleration β (the angular acceleration of a body posture angle) of the body rotation mode such that a desired ZMP is satisfied on the n-th model and the floor reaction force horizontal component that balances out the inertial force attributable to a horizontal acceleration of the total center-of-gravity of the robot 1 on the n-th model falls within an instantaneous value of a floor reaction force horizontal component permissible range at time k. The processing of S504 to S516 is the same as the processing of S504 to S516 in FIG. 19 in the aforesaid publication document 1 except for the dynamic models used (the dynamic models are the same as those in the aforesaid publication document 1 when n=2).

In the present embodiment, however, the first dynamic model does not consider the body rotation mode, so that when the processing of S504 to S516 in FIG. 19 in the processing of S200-1 is carried out, the floor reaction force horizontal component permissible range is always forcibly determined to be an infinitely large range or determined to be a sufficiently large range so that a floor reaction force horizontal component securely falls within the permissible range. In this case, the processing of S516 renders α=αtmp, β=0. Alternatively, in S410 of FIG. 18 in the processing of S200-1, the floor reaction force horizontal component permissible range for the first model may be determined as described above.

Incidentally, in the first embodiment, the floor reaction force horizontal component permissible range set in S200-2 or S200-3 using the second model or the third model may be basically the same, or it may be set to a different range. In this case, since the third model has higher dynamic accuracy than the second model, the floor reaction force horizontal component permissible range set in, for example, S200-3 may be set such that it is closer to the range of an actual friction force of a floor surface than a floor reaction force horizontal component permissible range set in S200-2 is.

Further, if the current time k (the time in a normal gait that is being created) is time within the aforesaid body inclination angle restoring period, then the body angular acceleration β is determined by the processing of S518 to S526 such that a floor reaction force moment corresponding to the instantaneous value of a body inclination restoring moment ZMP-converted value pattern (this depends on the aforesaid provisionally determined body inclination restoring moment ZMP-converted value peak value and the current time k. Refer to FIG. 25) is generated about a desired ZMP on the n-th dynamic model. Further, the body horizontal acceleration is determined as the difference between a body horizontal acceleration for the floor reaction force moment about a desired ZMP generated by the body translational mode to become zero and a body horizontal acceleration that generates a floor reaction force moment equivalent to the floor reaction force moment about a desired ZMP attributable to the body angular acceleration β on the n-th dynamic model. Thus, the body angular acceleration β and the body horizontal acceleration α are determined such that a desired ZMP is satisfied while restoring a body posture toward the reference body posture in the body inclination angle restoring period.

In the present embodiment, the first model does not consider the body rotation mode; therefore, in the processing of S200-1, when the processing of S518 to S526 in FIG. 19 is carried out, β is always set to zero.

Supplementally, the processing of S518 to S526 in FIG. 19 of the present embodiment is the same processing of S520 to S528 in FIG. 23 in the aforesaid publication document 1 except for the dynamic models used (the dynamic models are also the same as those in the aforesaid publication document 1 when n=2).

To supplement the explanation of the relevancy to the invention of the present application, the processing of S200-2 to 200-n of FIG. 14 constitutes a normal gait parameter correcting means in the second invention. And the boundary condition error determined in S1212 of FIG. 16 carried out in the individual processing of S200-2 to 200-n in FIG. 14 corresponds to the degree of deviation in the second invention. Further, the gait parameter having a plurality of candidates in the vicinity of the values of current search objects (Xsn, Vxn, ωbsn, ZMPrecpeakn), which is determined in S1216 in FIG. 16, as search objects (parameters to be corrected) corresponds to the auxiliary normal gait parameter in an eighteenth invention, and the boundary condition errors individually associated with those auxiliary normal gait parameters correspond to the auxiliary degrees of deviation in the eighteenth invention. Incidentally, the search objects (Xsn, Vxn, ωbsn, ZMPrecpeakn) of course correspond to the parameters to be corrected in the second invention, but (Zsn, Vzsn) are also parameters to be corrected in the second invention. This is because (Zsn, Vzsn) depends on Xsn, Vxsn, θbsn, and ωsn determined or provisionally determined as described above, so that (Zsn, Vzsn) will be dependently corrected when Xsn, Vxsn, and ωsn are corrected. Thus, the parameters that are dependent on direct search objects and corrected are also included in the parameters to be corrected in the second invention.

In the processing of FIG. 14 explained above, the first dynamic model, the second dynamic model, and the third dynamic model have dynamic accuracy that increases in this order in the present embodiment. Hence, the processing of FIG. 14 makes it possible to efficiently and quickly create normal gaits that satisfy the boundary conditions of normal gaits and to properly determine the initial states of normal gaits without causing divergence of body positions/postures, while fully satisfying dynamic accuracy.

Further, since the n-th dynamic model (n=1, 2 or 3) is constructed as described above, when search processing is carried out according to the aforesaid processing of FIG. 15 or FIG. 16, the linearity between the aforesaid values of search objects of the normal gait parameter and the aforesaid boundary condition errors (the linearity of changes in boundary condition errors relative to changes in the values of the search objects) increases as the value of n decreases. Therefore, the aforesaid search processing of FIG. 15 that uses the first dynamic model permits the values of search objects that satisfy boundary conditions to be quickly found. And, in the search processing that uses the second dynamic model, the approximately proper normal gait parameter search objects have been obtained by the search processing that uses the first dynamic model, so that they can be used as initial candidates to perform search processing to quickly determine proper normal gait parameters (satisfying boundary conditions) without developing divergence of the values of the search objects on the second dynamic model, although the linearity deteriorates as compared with the search processing that uses the first dynamic model. The same applies to the search processing that uses the third dynamic model.

Furthermore, since the n-th dynamic model (n=1, 2 or 3) is constructed as described above, as the value of n decreases, the calculation time for actually generating a normal gait shortens. In this case, as the value of n increases, search objects that satisfy boundary conditions can be promptly found, because the initial candidates of the search objects can be properly set as described above, although the calculation time for actually generating normal gaits increases. As a result, final normal gait parameters can be efficiently and promptly determined.

In the following explanation, the initial state of a normal gait will mean the state at the original initial time zero.

Returning to the explanation of FIG. 14, after the processing of S200-1 to S200-n is carried out as described above to create a normal gait that satisfies the boundary condition on the n-th dynamic model (n=3), an n-th model initial body horizontal position X0n, an initial body horizontal velocity Vx0n, an initial body posture angle θb0n and its angular velocity ωb0n, an initial body vertical position Z0n, and an initial body vertical velocity Vz0n, which constitute the motion state of the body 3 of the normal gait at the original initial time 0, are determined on the basis of the n-th model normal turning gait in S204. Further, in S222, an n-th model normal turning initial divergence component q[0], which is a divergence component at the original initial time 0, of the n-th model normal turning gait is determined according to the definitional equation of the aforesaid initial divergence component q. The values determined in S204 and S222 are the values observed in the supporting leg coordinate system of the first turning gait of the normal turning gait following the current gait. Then, in S224, q" that is the value of the n-th model normal turning initial divergence component q[0] observed from the supporting leg coordinate system of the current gait, and (Z0",Vz0") that are the values of the n-th model initial body vertical position/velocity observed from the supporting leg coordinate system of the current gait are determined.

The above is the detailed explanation of the processing of FIG. 14.

Returning to the explanation of FIG. 12, after the processing of S024 is carried out as explained above, the gait parameter of the current gait is determined (some are provisionally determined) in S026. This processing is carried out according to the flowchart of FIG. 20. The gait parameter determined here includes the parameters that specify the foot position/posture trajectories (the position/posture trajectories of the feet 22), a reference body posture trajectory, an arm posture trajectory, a floor reaction force vertical component trajectory, a floor reaction force horizontal component permissible range, and a ZMP trajectory, respectively, in the current time's gait, these parameters being determined by the processing of S600 to S610. Then, in S612, the body inclination angle restoring period [Ta,Tb] in the current time's gait is set. These processing is the same as the processing of the flowchart of FIG. 33 in the aforesaid publication document 1, so that no detailed explanation will be given herein, but the parameters that define the trajectories are determined such that the aforesaid trajectories connect to a normal gait from the state at the terminating end of the aforesaid gait (=the initial state of the current time's gait) while satisfying the aforesaid requirements related to the current time's gait. For example, the foot trajectory parameter related to the free leg foot 22 of the current time's gait is determined such that the estimated landing position/posture and time of the free leg foot 22 of the current time's gait satisfy those required values and, at the terminating end of the current time's gait, the position/posture of the free leg foot 22 agree at the beginning of the normal gait (the time of the terminating end of the current time's gait).

Supplementally, the ZMP trajectory parameter determined in S610 is a provisional value, an example of the ZMP trajectory defined by the provisional value (an example of the trajectory in the X-axis direction) being shown at the top in FIG. 27. The ZMP trajectory parameter is determined such that a desired ZMP is positioned near the substantially center of the ground contact surface of the supporting leg foot 22 in the one-leg supporting period of the current time's gait and the desired ZMP continuously changes up to the initial ZMP of the normal gait at the terminating end of the current time's gait in the floating period following the one-leg supporting period. The body inclination angle restoring period set in S612 of FIG. 20 is the period from time Ta to time Tb in FIG. 27, or it is the period from the moment immediately after the start of the one-leg supporting period of the current time's gait to the moment immediately before the end thereof.

Supplementally, the parameters of the current time's gait determined by the processing from S600 to S610 are not all parameters constituting the current time's gait parameter. In the present embodiment, the gait parameter defining the current time's gait (the current time's gait parameter) includes a ZMP correction amount for correcting a ZMP trajectory parameter and the peak value of a body inclination restoring moment ZMP-converted value (two types of peak values in this case) in addition to the parameters determined in S022. These parameters are exploratorily determined in the processing of S028 explained below.

Subsequently, the procedure proceeds to S028 in FIG. 12 to correct the gait parameter (the ZMP trajectory parameter) of the current gait (to determine the final current time's gait parameter). In this processing, the gait parameter of the current time's gait is corrected such that the divergence component at the terminating end of the current time's gait agrees with the initial divergence component q" of the normal turning gait determined in S024 (more specifically, such that the body position/posture trajectory continues or approximates to the normal gait), thus determining the final current time's gait parameter (more specifically, the ZMP correction parameter and the two types of peak values of the body inclination restoring moment ZMP-converted values are determined). In the present embodiment, as described above, the boundary condition at the terminating end of the current time's gait is such that the divergence component at the terminating end of the current time's gait agrees (or substantially agrees) with the initial divergence component q" of the normal turning gait.

This processing is carried out by step-by-step exploratory processing that uses the aforesaid first to third dynamic models in order according to the subroutine processing shown by the flowchart in FIG. 21.

As shown in FIG. 21, the processing of S700-1, S700-2, . . . , S700-n (n=3 in the first embodiment) is sequentially carried out, and lastly, a ZMP correction parameter "a" and a first peak value ZMPrecpeaka and a second peak value ZMPrecpeakb of a body inclination restoring moment ZMP-converted value are determined such that the divergence component at the terminating end of the current gait agrees or substantially agrees with the divergence component at the beginning of a normal gait (such that the boundary condition at the terminating end of the current time's gait is satisfied) on the n-th model (the n-th dynamic model). Here, the first peak value ZMPrecpeaka and the second peak value ZMPrecpeakb of a body inclination restoring moment ZMP-converted value obtained in the processing of the flowchart in FIG. 21 indicate the two peak values of the pattern of the ZMP-converted value of a floor reaction force moment required to bring a body posture close to a reference body posture during the body inclination angle restoring period [Ta,Tb] of the current time's gait, an example thereof being shown in FIG. 26. The number of peak values of the body inclination restoring moment ZMP-converted value has been one in the case of a normal gait; in the present embodiment, however, the first peak value ZMPrecpeaka and the second peak value ZMPrecpeakb are used as the two adjustable parameters of a body inclination restoring moment ZMP-converted value so as to make the body posture angle and its angular velocity at the terminating end of the current time's gait coincide with the body posture angle and its angular velocity, respectively, at the beginning of the normal gait. In the present embodiment, as shown in FIG. 26, the body inclination restoring moment ZMP-converted value in the current time's gait has a pattern combining a trapezoidal pattern in the first half and another trapezoidal pattern in the latter half of the one-leg supporting period. The peak value of the trapezoidal pattern in the first half is the first peak value ZMPrecpeaka, and the peak value of the trapezoidal pattern in the latter half is the second peak value ZMPrecpeakb.

Further, the ZMP correction parameter "a" determined in the processing of the flowchart in FIG. 21 is the parameter for specifying the correction amount of a desired ZMP to connect a current time's gait to a normal gait (to make the divergence component at the terminating end of a current time's gait substantially agree with the divergence component q" at the beginning of a normal gait), an example thereof being shown at the middle in FIG. 27. As illustrated, the ZMP correction amount has a trapezoidal pattern generated from the moment immediately after the start to the moment immediately before the end of the one-leg supporting period, and the peak value "a" is used as the ZMP correction parameter that defines the pattern of the ZMP correction amount.

The overview of the processing shown in FIG. 21 will be explained. First, the ZMP correction parameter "a" and the first peak value ZMPrecpeaka and the second peak value ZMPrecpeakb of the body inclination restoring moment ZMP-converted value are exploratorily determined as the search objects such that the current time's gait is connected to a normal gait on the first dynamic model (the divergence component at the terminating end of a current time's gait agrees or substantially agrees with the divergence component at the beginning of a normal gait), that is, such that the current time's gait generated using the current time's gait parameter, including the parameters determined in S028, and the first dynamic model satisfies the boundary condition at the terminating end thereof. Then, the "a", ZMPrecpeaka, and ZMPrecpeakb determined using the first dynamic model are used as new exploratory initial values to exploratorily determine anew the "a", ZMPrecpeaka, and ZMPrecpeakb in order to make the current time's gait connect to the normal gait (in order to satisfy the boundary condition at the terminating end of the current time's gait) on the second dynamic model. Further, the "a", ZMPrecpeaka, and ZMPrecpeakb determined using the second dynamic model are used as new exploratory initial values to exploratorily determine anew the "a", ZMPrecpeaka, and ZMPrecpeakb in order to make the current time's gait connect to the normal gait (in order to satisfy the boundary condition at the terminating end of the current time's gait) on the third dynamic model. More generally, when the quantity of the dynamic models is denoted by n, the processing in which the "a", ZMPrecpeaka, and ZMPrecpeakb determined using an (m−1)th dynamic model (m: integer of 2 or more but n or less) are used as the search initial values to exploratorily determine anew the "a", ZMPrecpeaka, and ZMPrecpeakb such that the current time's gait is connected to the normal gait on the m-th dynamic model is repeated. Then, lastly, the "a", ZMPrecpeaka, and ZMPrecpeakb determined using the n-th dynamic model are obtained as the corrected values of the gait parameter (the gait parameter of the current time's gait) to be determined.

The processing of S700-1 is, to be more specific, carried out as shown by the flowchart of FIG. 22. First, in S750, the initial candidates of the values of "a", ZMPrecpeaka, and ZMPrecpeakb, which are search objects, on the first model (the first dynamic model) are provisionally determined. In this case, the initial candidates may basically be arbitrary and may be determined on the basis of, for example, the values of the "a", ZMPrecpeaka, and ZMPrecpeakb finally determined at the time of creating a last time's gait.

Subsequently, the loop processing of S754 to S766 is carried out. The processing will be schematically explained. First, in S754, a current time's gait (a provisional current time's gait) is calculated using the current values of the "a", ZMPrecpeaka, and ZMPrecpeakb, which are search objects, and the first model. More specifically, a provisional current time's gait is calculated using the current time's gait parameter constructed of a ZMP trajectory parameter corrected on the basis of the current value of the ZMP correction parameter "a", the current values of ZMPrecpeaka and ZMPrecpeakb, and the parameters other than the ZMP trajectory parameter determined in S026, and the first model. More specific processing of S754 will be described later.

Then, in S756 to S766, the difference between the divergence component at the terminating end of the provisional current time's gait (the estimated landing time of a free leg foot of the current time's gait) calculated in S754 and the divergence component q" at the beginning of a normal gait (lastly calculated using the n-th model in the aforesaid S024), the difference between the body posture angle at the terminating end of the provisional current time's gait and the body posture angle at the beginning of the normal gait (lastly calculated using the n-th model in the aforesaid S024), and the difference between the angular velocity of the body posture angle at the terminating end of the provisional current time's gait and the body posture angular velocity at the beginning of the normal gait (lastly calculated using the n-th model in the aforesaid S024) are determined. Then, it is determined whether all the values of these differences satisfy a condition in which they fall within permissible ranges (whether they approximate zero), and if they do not satisfy the condition, then the values of the search objects are changed. This is repeated to finally determine the "a", ZMPrecpeaka, and ZMPrecpeakb as the corrected values of the gait parameter that allows the provisional current time's gait to connect to the normal gait on the first model.

The processing of S756 to S766 will be explained more specifically. In S756, the divergence component $q01k$ at the end of the current time's gait is calculated from the body position/velocity (Xe1, Ve1) at the terminating end of the provisional current time's gait according to the definitional equation of divergence components described above.

Subsequently, in S758, the difference between the divergence component $q01k$ at the terminating end and the divergence component q" at the beginning of the normal turning gait is determined as a terminal divergence component error errq.

Further, in S760, the difference between the body posture angle at the beginning of the normal gait determined using the n-th model (n=3) and the body posture angle at the terminating end of the current time's gait determined using the first model is determined as the body posture angle error at the terminating end θberr, and the difference between the body posture angular velocity at the beginning of a normal gait determined using the n-th model (n=3) and the body posture angular velocity at the terminating end of the current time's gait determined using the first model is determined as the body posture angular velocity error at the terminating end ωberr.

The errors errq, θberr, and ωberr determined as described above indicate the degree of deviation of the provisional current time's gait created in S754 from a boundary condition.

Subsequently, in S762, it is determined whether all errq, θberr, and ωberr determined as described above fall within a predetermined permissible range in the vicinity of zero, and if the determination result is YES, then the loop processing of S754 to S766 is terminated (the processing of S700-1 is terminated). In this case, the current time's gait parameter that includes the current search objects is obtained as the current time's gait parameter that can satisfies the boundary condition on the first model.

Meanwhile, if the determination result of S762 is NO, then the candidates of a plurality of (three in the present embodiment) search objects obtained by changing the values of the individual parameters by a predetermined extremely small amounts Δa, ΔZMPrecpeaka, and ΔZMPrecpeakb are determined in the vicinity of the values of the current search objects (a1, ZMPrecpeaka1, and ZMPrecpeakb1), and the same processing as that of S754 to S760 is carried out on the basis of the current time's gait parameter that includes the candidates of the individual search objects (the current time's gait parameter in which the search objects of the present current time's gait parameter have been corrected to newly determined candidates), thereby determining a set of errors (errq, θberr, and ωberr) corresponding to the candidate of each search object.

Subsequently, in S766, the new candidates of the search objects (a1, ZMPrecpeaka1, and ZMPrecpeakb1) are determined by an exploratory technique, such as the steepest descent method or the simplex method, on the basis of the current (a1, ZMPrecpeaka1, and ZMPrecpeakb1) and the sets of errors (errq, θberr, and ωberr) corresponding to the individual candidates of the search objects in the vicinity thereof. Then, the processing from S754 is repeated again.

As described above, (a1, ZMPrecpeaka1, and ZMPrecpeakb1) being the search objects, the current time's gait parameter that satisfies the boundary condition at the terminating end of the current time's gait is exploratorily determined.

Incidentally, the processing of S754 in the processing of FIG. 22 is carried out by the subroutine processing shown by the flowchart of FIG. 24. This will be discussed hereinafter.

The processing of S700-1 explained above constitutes the first gait parameter determining means in the first invention.

Further, all the processing of S700-2 . . . , S700-n of FIG. 21 is carried out as shown by the flowchart of FIG. 23. This processing differs from the processing of FIG. 22 in the initial values of search objects set in S1700 and the dynamic models used in S1704 and S1714, the rest thereof being the same as the processing of FIG. 22. In FIG. 23, "n" generally denotes an integer of 2 or more and it is 2 or 3 in the first embodiment. More specifically, the processing of S700-2 is the processing in which "n" of FIG. 23 is set to "2" and the processing of S700-3 is the processing in which "n" of FIG. 23 is set to "3."

In S1700, the values of search objects previously determined (the values in S700-m) by using the m-th model (m=n−1) are set as the initial values (initial candidate values) of "a", ZMPrecpeaka, and ZMPrecpeakb, which are the search objects. Then, the processing of S1704 and S1714 calculates a provisional current time's gait by using the n-th model.

Incidentally, the processing of S1704 in the processing of FIG. 23 is carried out by the subroutine processing shown by the flowchart of FIG. 24, as with S754 in FIG. 22.

The processing of FIG. 24 is, as shown in the figure, the processing (S802 to S806) in which the state at the terminating end of the last time's gait (specifically, the state at the terminating end of the last time's gait observed in the supporting leg coordinate system of the current time's gait) is taken as the initial state of the current time's gait (the provisional current time's gait)(S800) and the instantaneous values of the current time's gait are created in time series up to the terminating end time Tcurr of the current time's gait (the estimated landing time of the free leg foot 22 of the current time's gait) from the initial state. Incidentally, "k" in FIG. 24 denotes the time of the time series of the instantaneous values of the normal gait to be created. And, the subroutine processing of S804 in FIG. 24 is carried out in the same manner as the processing of FIG. 18 previously explained in relation to the processing for creating normal gaits.

In the processing of FIG. 18 in this case, the processing of S400 and S404 to S410 determines the instantaneous values of a desired floor reaction force vertical component, desired positions/postures of both feet, a reference body posture, a desired arm posture, a desired body vertical position, and a floor reaction force horizontal component permissible range on the basis of the parameters of the current time's gait determined in S026. This applies to all of S700-1, 700-2, . . . , 700-n in FIG. 21. Further, in the processing of S402 in FIG. 18 carried out in each of S700-m(m=1, 2, 3) in FIG. 21, the instantaneous value of the desired ZMP is determined on the basis of the ZMP trajectory parameter obtained by correcting the ZMP trajectory parameter, which has been provisionally determined in S610 of the aforesaid FIG. 20, by a current candidate value am of the ZMP correction parameter "a." More specifically, the instantaneous value of the ZMP trajectory obtained by correcting the desired ZMP trajectory (refer to the bottom diagram of FIG. 27) is determined in S402 by adding the ZMP correction amount specified by the current candidate value am (refer to the middle diagram of FIG. 27) to the desired ZMP trajectory specified by the ZMP trajectory parameter provisionally determined in S610 (refer to the top diagram of FIG. 27).

Further, the processing of S412 determines the instantaneous values of a body horizontal acceleration and a body posture angular acceleration by using the n-th model (n denotes "1" in the processing of S700-1, "2" in the processing of S700-2, . . ., and "n" in the processing of S700-n. The same applies to FIG. 19, which shows the subroutine processing of S412) such that the conditions shown in the figure are satisfied. Then, the processing of S414 subjects the body horizontal acceleration and the body posture angular acceleration to the second-order integration so as to determine the instantaneous values of the body horizontal position and the body posture angle.

Further, the processing in FIG. 19, which is the subroutine processing of S412 in creating a provisional current time's gait is also carried out in the same manner as normal gaits. More specifically, if the current time k at which the instantaneous value of a provisional current time's gait is to be created (time within the provisional current time's gait that is being created) is not time within the aforesaid body inclination angle restoring period, then the processing of S504 to S516 determines a body horizontal acceleration α of the body translational mode and a body angular acceleration β (the angular acceleration of a body posture angle) of the body rotation mode such that a desired ZMP (the desired ZMP corrected by a ZMP correction amount) is satisfied on the n-th model and the floor reaction force horizontal component that balances out the inertial force attributable to a horizontal acceleration of the total center-of-gravity falls within an instantaneous value of a floor reaction force horizontal component permissible range at time k.

Supplementally, in the present embodiment, the first dynamic model does not consider the body rotation mode, so that when the processing of S504 to S516 in FIG. 19 in the processing of S700-1 is carried out, the floor reaction force horizontal component permissible range is set to an infinitely large range or set to a sufficiently large range so that a floor reaction force horizontal component securely falls within the permissible range, as in the case where the processing of S504 to S516 in FIG. 19 is carried out in the processing of S200-1.

Incidentally, in the present embodiment, the floor reaction force horizontal component permissible range set in S700-2 or S700-3 using the second model or the third model may be basically the same, or it may be set to a different range, as in the case of S200-2 and S200-3.

Further, if the current time k (the time in a provisional current time's gait that is being created) is time within the aforesaid body inclination angle restoring period, then the body angular acceleration β is determined by the processing of S518 to S526 such that a floor reaction force moment corresponding to the instantaneous value of a body inclination restoring moment ZMP-converted value pattern (this depends on the current candidate values of the first peak value ZMPrecpeaka and the second peak value ZMPrecpeakb of the body inclination restoring moment ZMP-converted value provisionally determined in S700-n(n=1, 2 or 3) and the current time k. Refer to FIG. 26) is generated on the n-th dynamic model. Further, the body horizontal acceleration is determined as the difference between a body horizontal acceleration for the floor reaction force moment about a desired ZMP generated by the body translational mode to become zero and a body horizontal acceleration that generates a floor reaction force moment equivalent to the floor reaction force moment due to the body angular acceleration β on the n-th dynamic model. Thus, the body angular acceleration β and the body horizontal acceleration α are determined such that a desired ZMP is satisfied while restoring a body posture toward the reference body posture.

In the first embodiment, the first dynamic model does not consider the body rotation mode; therefore, in the processing of S700-1, when the processing of S518 to S526 in FIG. 19 is carried out, β is always set to zero.

The body inclination restoring period when a provisional current time's gait is generated is the period from time Ta to Tb determined in S612 of FIG. 20 described above; therefore, the processing of S500 of FIG. 19 is omitted.

To supplement the relevance to the invention of the present application, the processing of S700-2 to 700-n in FIG. 21 constitutes the gait parameter correcting means in the first invention. And, a set of errq, θberr, and ωberr determined in S1712 in FIG. 23 carried out in the processing of each of S700-2 to 700-n in FIG. 21 corresponds to the degree of deviation in the first invention. Further, the gait parameter having a plurality of candidates in the vicinity of the values of the current search objects (an, ZMPrecpeakan, and ZMPrecpeakbn) that are determined in S1714 in the same FIG. 23 as the search objects (parameters to be corrected) correspond to the auxiliary gait parameters in the seventeenth invention, and a set of errq, θberr, and ωberr respectively corresponding to the auxiliary gait parameters corresponds to the auxiliary degree of deviation in the seventeenth invention. Incidentally, the search objects (an, ZMPrecpeakan, and ZMPrecpeakbn) are of course the parameters to be corrected in the second invention. In this case, "an" is for correcting a desired ZMP trajectory parameter, so that at least a part of the desired ZMP trajectory parameter itself may be said to be also a parameter to be corrected.

In the processing of FIG. 21 explained above, the first dynamic model, the second dynamic model, and the third dynamic model have dynamic accuracy that increases in this order in the present embodiment. Hence, by the processing in FIG. 21, a gait parameter that makes it possible to efficiently and quickly determine a current time's gait connecting to a normal gait (satisfying the boundary condition at the terminating end of the current time's gait) without causing divergence of body positions/postures, while fully satisfying dynamic accuracy.

Further, since the n-th dynamic model (n=1, 2 or 3) is constructed as described above, when performing the search processing as the aforesaid processing shown in FIG. 22 or FIG. 23, the linearity between the values of the aforesaid search objects of the current time's gait parameter and the errors errq, θberr, and ωberr at the terminating end of the current time's gait (the linearity of error changes relative to search object value changes) increases as the value of n decreases. Therefore, in the aforesaid search processing in FIG. 22 that uses the first dynamic model, search object values that satisfy boundary conditions can be promptly found. Further, in the search processing that uses the second dynamic model, the approximately proper current time's gait parameter search objects have been obtained by the search processing that uses the first dynamic model, so that they can be used as initial candidates to perform search processing to quickly determine a proper (boundary-condition-satisfying) current time's gait parameter without developing divergence of the values of search objects on the second dynamic model, although the linearity deteriorates as compared with the search processing that uses the first dynamic model. The same applies to the search processing that uses the third dynamic model.

Furthermore, since the n-th dynamic model (n=1, 2 or 3) is constructed as described above, as the value of n decreases, the calculation time for actually generating a current time's gait shortens. In this case, as the value of n increases, search objects that satisfy boundary conditions can be promptly found, because the initial candidates of the search objects can be properly set as described above, although the calculation time for actually generating current time's gaits increases. Thus, as a result, a final current time's gait parameter can be efficiently and promptly determined.

Returning to the explanation of FIG. 12, after the processing of S028 is carried out as explained above, the procedure proceeds to S030 wherein the parameters that define a ZMP permissible range for full-model correction and a floor reaction force horizontal component permissible range are determined.

This processing is the same as the processing of S030 shown in FIG. 13 in the aforesaid publication document 1, so that the explanation herein will be omitted.

The processing of S018 to S030 explained above is the processing carried out by the aforesaid gait parameter determiner 100a shown in FIG. 5.

After the processing of S030 is carried out, or if the determination result of S016 is NO, then the procedure proceeds to S032 wherein the instantaneous values of the current time's gait are determined one after another. The subroutine processing of this processing is the same as the aforesaid processing of the flowchart of FIG. 24 explained in relation to generating a provisional current time's gait. However, the dynamic model used in this case is fixed to the third model in the present embodiment. Further, as the ZMP correction parameter "a" defining a ZMP correction amount and the first peak value ZMPrecpeaka and the second peak value ZMPrecpeakb of a body inclination restoring moment ZMP-converted value, the ones finally determined in S028 of FIG. 12 (the ones finally searched for in the processing of S700-n of FIG. 21) are used.

Subsequently, the procedure proceeds to S034 wherein the operation of the arm bodies 5, 5 to cancel a spin (the rotation about a vertical axis) of the robot 1 is determined. This processing is for determining the postures of the arm bodies 5, 5 such that a floor reaction force moment in the opposite direction from the vertical component of the floor reaction force moment, which would be generated about the desired ZMP if the robot 1 were operated according to a desired gait without swinging the arms of the robot 1, is generated by the arm swings of the arm bodies 5, 5 (a motion of swinging the two arm bodies 5, 5 back and forth in the opposite directions from each other). This is performed in exactly the same manner as that in S034 of FIG. 13 in the aforesaid publication document 1. The details thereof are described in the publication document 1, so that no further explanation will be given.

Subsequently, the procedure proceeds to S036 wherein the instantaneous value of the ZMP permissible range and the instantaneous value of the floor reaction force horizontal component permissible range for full-model correction (for the processing of the aforesaid full-model corrector 100e) are determined. In this processing, they are determined on the basis of the gait parameter that defines the ZMP permissible range and the floor reaction force horizontal component permissible range determined in S030 described above.

The processing of S032 to S036 explained above is the detailed processing carried out by the desired instantaneous value generator 100b in FIG. 5 described above.

Subsequently, the procedure proceeds to S038 wherein a corrected gait using a full model is generated. This processing is the processing carried out by the aforesaid full-model corrector 100c. In this case, the processing is the same as the processing of S038 of FIG. 13 in the aforesaid publication document 1, and it is carried out according as described in the publication document 1. Hence, detailed explanation thereof will be omitted in the present description. This processing determines a corrected desired body position/posture, which is obtained by further correcting the desired body position/posture (the body position/posture of the aforesaid displacement-dimension corrected gait), and a corrected desired floor reaction force moment.

The above is the gait generation processing of the gait generating device 100 in the present embodiment.

The operation of the composite-compliance control unit 101 will now be explained with reference to FIG. 4. Incidentally, the operation of the composite-compliance control unit 101 is described in detail in Japanese Unexamined Patent Application Publication No. H10-277969 and the like previously applied by the present applicant; therefore, only schematic explanation will be given in the present description. In the gait generating device 100, the corrected desired body position/posture (trajectory) and the desired arm posture (trajectory) out of the desired gait generated as described above are sent out to a robot geometric model (inverse kinematics calculator) 102.

Further, the desired foot position/posture (trajectory), the desired ZMP trajectory (the desired total floor reaction force central point trajectory), and the desired total floor reaction force (trajectory)(the corrected desired floor reaction force moment and the desired floor reaction force vertical component) are sent to the composite-compliance operation determiner 104 and also to a desired floor reaction force distributor 106. Then, in the desired floor reaction force distributor 106, the floor reaction force is distributed to each foot 22 and the desired each foot floor reaction force central point and the desired each foot floor reaction force are determined. The determined desired each foot floor reaction force central point and the desired each foot floor reaction force are sent to the composite-compliance operation determiner 104.

Corrected desired foot position/posture (trajectory) with deformation compensation is sent from the composite-compliance operation determiner 104 to the robot geometric model 102. Upon receipt of the desired body position/posture (trajectory) and the corrected desired foot position/posture (trajectory) with deformation compensation, the robot geometric model 102 calculates the joint displacement commands (values) of the twelve joints of the leg bodies 2, 2 that satisfy them and sends them to a displacement controller 108. The displacement controller 108 carries out follow-up control of the displacements of the twelve joints of the robot 1, using the joint displacement commands (values) calculated by the robot geometric model 102 as the desired values. Further, the robot geometric model 102 calculates displacement commands (values) of arm joints that satisfy desired arm postures and sends them to the displacement controller 108. The displacement controller 108 carries out follow-up control of the displacements of the twelve joints of the arm bodies of the robot 1, using the joint displacement commands (values) calculated in the robot geometric model 102 as desired values.

The floor reaction forces (specifically, the actual each foot floor reaction force) generated in the robot 1 is detected by the six-axis force sensor 50. The detected values are sent to the aforesaid composite-compliance operation determiner 104. Further, the posture inclination errors θerrx and θerry (specifically, the errors of actual posture angles relative to the desired body posture angle, the posture angle error in the roll direction (about the X-axis) being denoted by θerrx and the posture angle error in the pitch direction (about the Y-axis) being denoted by θerry) generated in the robot 1 are detected through the intermediary of the posture sensor 54, and the detected values are sent to a posture stabilization control calculator 112. The posture stabilization control calculator 112 calculates the compensating total floor reaction force's moment about the desired total floor reaction force central point (the desired ZMP) for restoring the body posture angle of the robot 1 to the desired body posture angle and the calculation result is sent to the composite-compliance operation determiner 104. The composite-compliance operation determiner 104 corrects the desired floor reaction force on the basis of the input value. To be specific, the desired floor reaction force is corrected such that the compensating total floor reaction force's moment or the sum of the compensating total floor reaction force's moment and the corrected desired floor reaction force moment acts about the desired total floor reaction force central point (the desired ZMP).

The composite-compliance operation determiner 104 determines the aforesaid corrected desired foot position/posture (trajectory) with deformation compensation so as to make the states of the actual robot and the floor reaction force calculated from sensor-detected values and the like coincide with the desired floor reaction force that has been corrected. In this case, the corrected desired foot position/posture with deformation compensation considers the mechanical deformation of the aforesaid compliance mechanism 72 or the like. However, it is virtually impossible to make all states agree with desired values, so that a trade-off relationship is imparted among them to make them compromisingly agree as much as possible. More specifically, a control error for each desired value is weighted in conducting control so that the weighted average of the control error (or the square of the control error) is minimized. Thus, actual foot position/posture and total floor reaction force are controlled so as to approximately follow the desired foot position/posture and the desired total floor reaction force.

Incidentally, in the first embodiment explained above, the first to the third dynamic models described above have been used; alternatively, however, a plurality of dynamic models other than them may be used. The plurality of dynamic models in this case may be configured, for example, as follows. This will be explained below as a second embodiment.

Referring to FIG. 28, model A corresponds to, for example, the aforesaid second dynamic model and model B corresponds to the aforesaid third dynamic model. In this case, both models A and B can be expressed as dynamic models that receive desired motions, such as desired body position/posture, a desired ZMP, a desired floor reaction force horizontal component permissible range and the like as inputs, and then output a floor reaction force moment about the desired ZMP and a translational floor reaction force (a floor reaction force horizontal component). Further, model C is defined as a model that outputs a floor reaction force moment of the sum of the moment obtained by multiplying the floor reaction force moment output from model A by a certain weight $r(0 \leq r \leq 1)$ and the moment obtained by multiplying the floor reaction force moment output from model B by a weight 1-r, and also outputs a translational floor reaction force of the sum of the translational floor reaction force obtained by multiplying the translational floor reaction force output from model A by a weight r and the translational floor reaction force obtained by multiplying the translational floor reaction force output from model B by a weight 1-r. When model C is defined as described, the dynamic behaviors of model C approximate those of model A if the weight r approximates 1, while the dynamic behaviors approximate those of model B if the weight r approximates 0. Thus, a plurality of types of dynamic models C can be constructed by setting the value of r to a plurality of different values within the range of 0 to 1. Hence, in the second embodiment, a plurality of dynamic models thus constructed is used in place of the aforesaid first to third dynamic models. In this case, as the values of the weight r is set to, for example, three different values, 0, 0.5, and 1, and dynamic models C defined on the basis of the individual values are referred to as the first dynamic model, the second dynamic model, and the third dynamic model. And, these first to third dynamic models are used in place of the first to the third dynamic models in the first embodiment so as to construct the second embodiment. Hence, in the second embodiment, only the first to the third dynamic models used in S200-1, s200-2, . . . , S200-n(n=3) of FIG. 14 and S700-1, S700-2, . . . , S700-n(n=3) of FIG. 21 differ from those in the first embodiment, and the rest is the same as that in the first embodiment.

As in the aforesaid first embodiment, to generate a gait that satisfies a translational floor reaction force horizontal component permissible range by adjusting the body rotation mode, both models A and B are required to be models that consider (do not ignore) a floor reaction force moment generated by the body rotation mode. In this case, the requirements are met by making, for example, models A and B to be the same as the second dynamic model and the third dynamic model, respectively, of the first embodiment. In this case, according to the second embodiment, the body rotation mode can be adjusted with either dynamic model, so that there is no need to set the floor reaction force horizontal component permissible range to a wide permissible range or an infinitely large permissible range that can be substantially ignored when using the first dynamic model as explained in the first embodiment, and appropriate permissible ranges can be set with either dynamic model.

The above is the second embodiment according to the present invention.

According to the aforesaid first embodiment, in a plurality of dynamic models, the motion/floor reaction force models representing the relationships between their motions and floor reaction forces have been set to have structures that are different from each other. Alternatively, however, a plurality of dynamic models may share the same motion/floor reaction force models (the structures of the mass points, inertias, and the like and dynamic equations (equations of motion) of the models) and have different restrictive conditions related to motions or floor reaction forces of the robot 1 that are added to the individual dynamic models. The following will explain an example thereof as a third embodiment. The motion/floor reaction force models of the plurality of (three in the present embodiment) of dynamic models are set to be the same as the motion/floor reaction force models of, for example, the second dynamic model, in the first embodiment. And, the floor reaction force horizontal component permissible ranges as the restrictive conditions of floor reaction forces to be added to the first to the third dynamic models are set to be different from each other, as shown in FIG. 29. In this example, the floor reaction force horizontal component permissible ranges in the one-leg supporting period of the robot 1 are set to decrease in the order of the first dynamic model, the second dynamic model, and the third dynamic model. And, in the third embodiment, the first to the third dynamic models constructed as described above are used as the first to the third dynamic models used in S200-1, S200-2, . . . , S200-n(n=3) of FIG. 14 and S700-1, S700-2, . . . , S700-n(n=3) of FIG. 21. The rest is the same as the first embodiment. Incidentally, according to the third embodiment, the body rotation mode can be adjusted in any dynamic models, thus obviating the need for setting the floor reaction force horizontal component permissible range to a wide permissible range or an infinitely large permissible range that can be substantially ignored when using the first dynamic model, as explained in the first embodiment.

Supplementally, according to the third embodiment, in the n-th dynamic model (n=1, 2 or 3), the permissible range of a floor reaction force horizontal component broadens and the linearity increases as the value of n decreases. Hence, when searching for search objects of a gait parameter (a normal gait parameter or a current time's gait parameter) by the first dynamic model, the search processing can be promptly completed.

Further, the model having the highest dynamic accuracy among the plurality of dynamic models may be the same as the aforesaid full model. In this case, it is desirable to set the floor reaction force horizontal component permissible ranges for these plurality of dynamic models (the dynamic models used in S024 and S028 of FIG. 12 described above) to be wider than those for full-model correction in order to enhance the convergence of the search processing of a gait parameter.

Supplementally, it is effective for the plurality of dynamic models used in the aforesaid S024 and S028 of FIG. 12 to have slightly lower dynamic accuracy than the full models for full-model correction. This is because the correction amount of a corrected desired floor reaction force moment about a desired ZMP or a desired ZMP equivalent thereto in full-model correction can be decreased while enhancing the convergence of the search processing of a gait parameter, thus making it possible to increase the stability margin of a gait finally generated by full-model correction.

In the embodiments explained above, it has been the boundary condition on the current time's gait that the divergence component at the terminating end of the current time's gait substantially agrees with the divergence component at the beginning of a normal gait, so that the current time's gait approximates a normal gait, and the search objects of the current time's gait parameter have been searched for and determined to satisfy the boundary condition. Alternatively, however, the boundary condition of the current time's gait may be set such that the body position (the horizontal position and the vertical position) and the body velocity (the horizontal velocity and the vertical velocity) at the terminating end of the current time's gait substantially agree with the body position and the body velocity at the beginning of the normal gait, and the search objects of the current time's gait parameter may be searched for and determined so that the boundary condition is satisfied.

Alternatively, the boundary condition may be set such that the weighted average values of the position of the total center-of-gravity of the robot 1 and the changing velocity thereof at the terminating end of the current time's gait substantially agree with the weighted average values at the beginning of the normal gait, and the search objects of the current time's gait parameter may be determined such that the boundary condition is satisfied.

Further, when determining a normal gait parameter, the aforesaid weighted mean values of the robot 1 or divergence components may be used as the search objects of the normal gait parameter to satisfy the boundary condition of the normal gait. Incidentally, a weighted mean value becomes equivalent to a divergence component (more precisely, proportional to a divergence component) by setting a predetermined weight and ignoring an absolute magnitude.

INDUSTRIAL APPLICABILITY

As is obvious from the above explanation, the gait generating system for a mobile robot in accordance with the present invention is useful in that it is capable of efficiently generating a gait that makes it possible to satisfy a predetermined boundary condition with high dynamic accuracy while preventing divergence of the gait, and capable of generating a gait of a mobile robot, such as a biped mobile robot in particular, which inherently has low stability, while securing the stability of the mobile robot.

Figure 1:
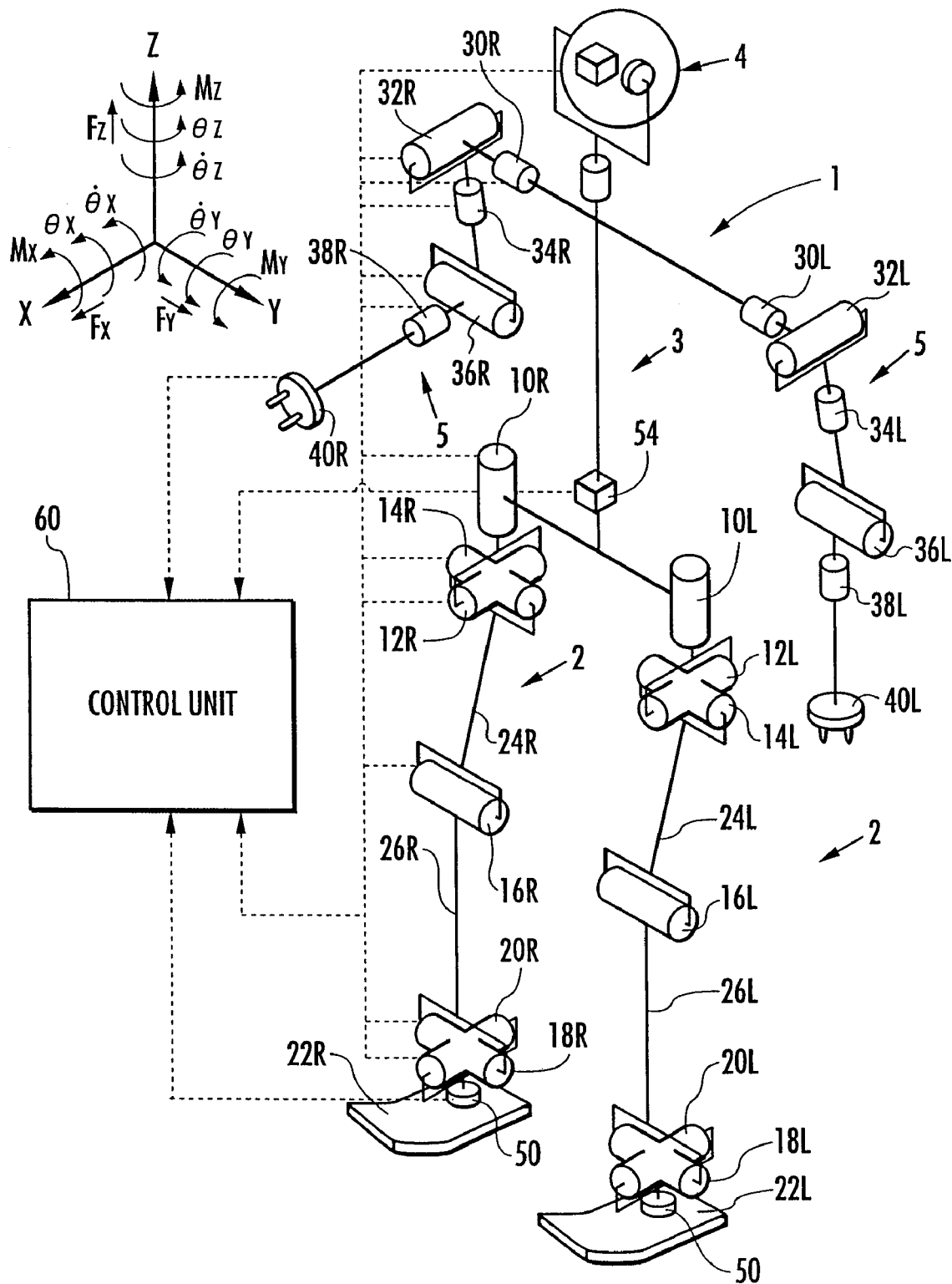
FIG. 1 is a diagram showing the overview of the entire structure of a mobile robot (a bipedal walking robot) to which the embodiments of the present invention are applied.
Figure 2:
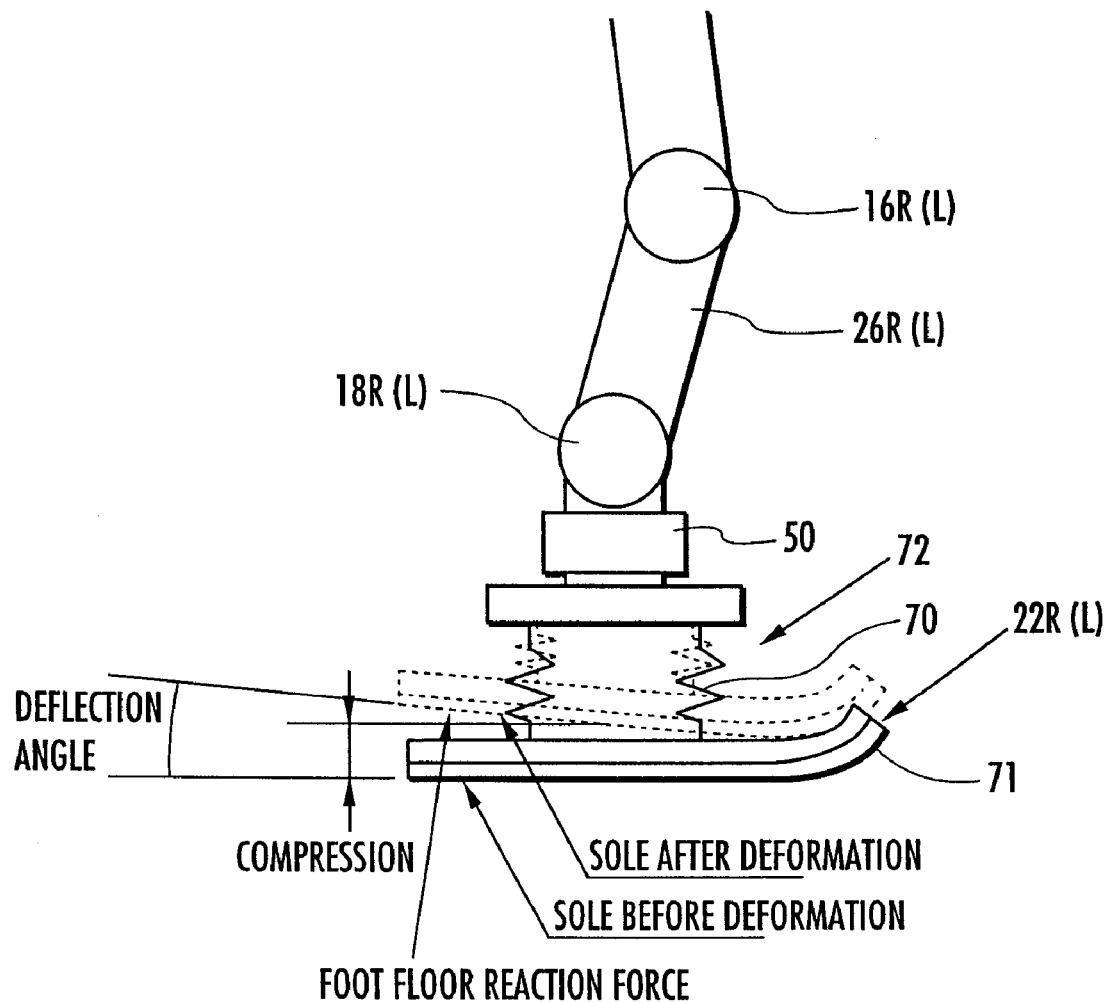
FIG. 2 is a side view showing the structure of a foot portion of each leg of the robot shown in FIG. 1.
Figure 3:
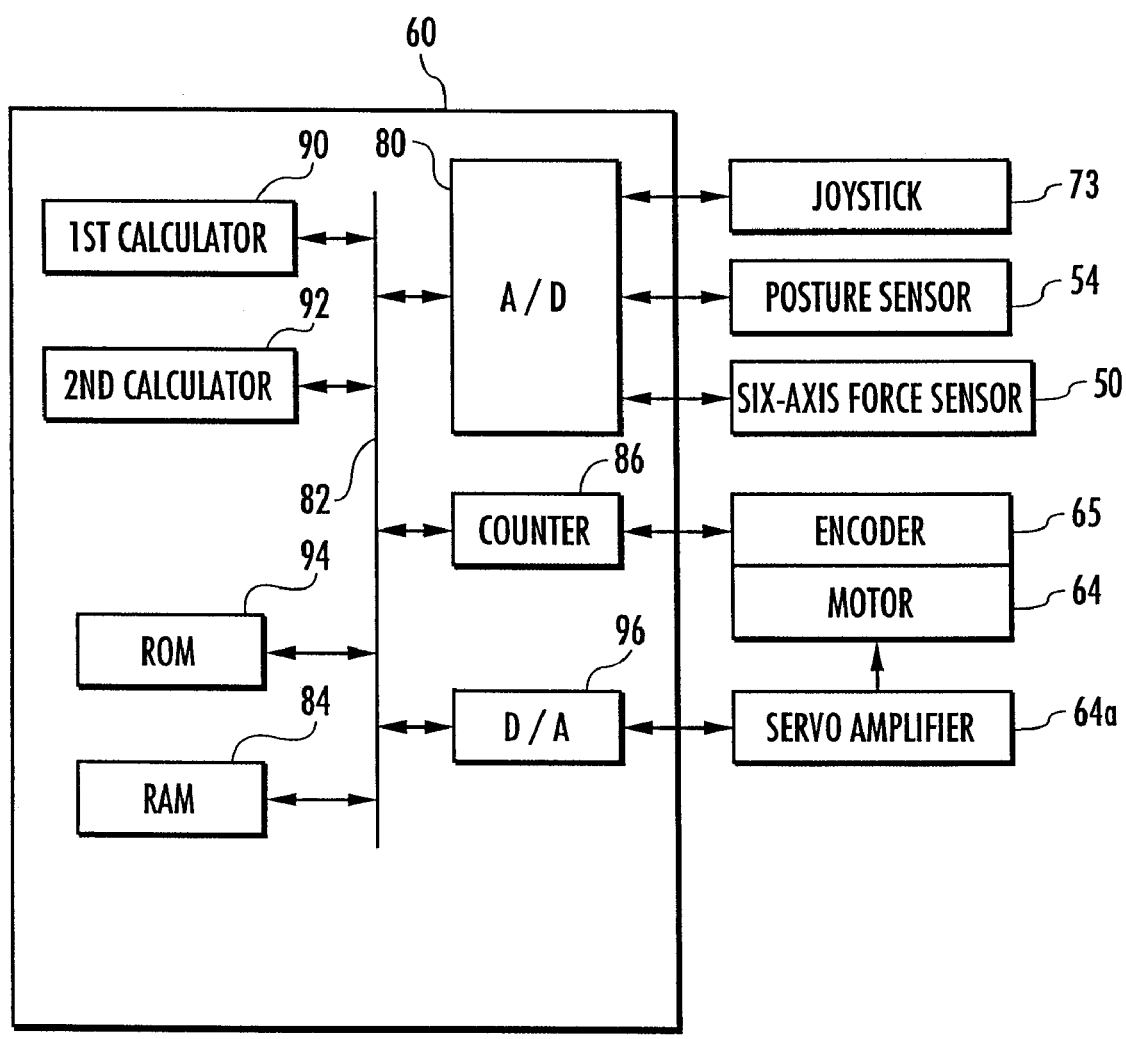
FIG. 3 is a block diagram showing the structure of a control unit provided in the robot shown in FIG. 1.
Figure 4:
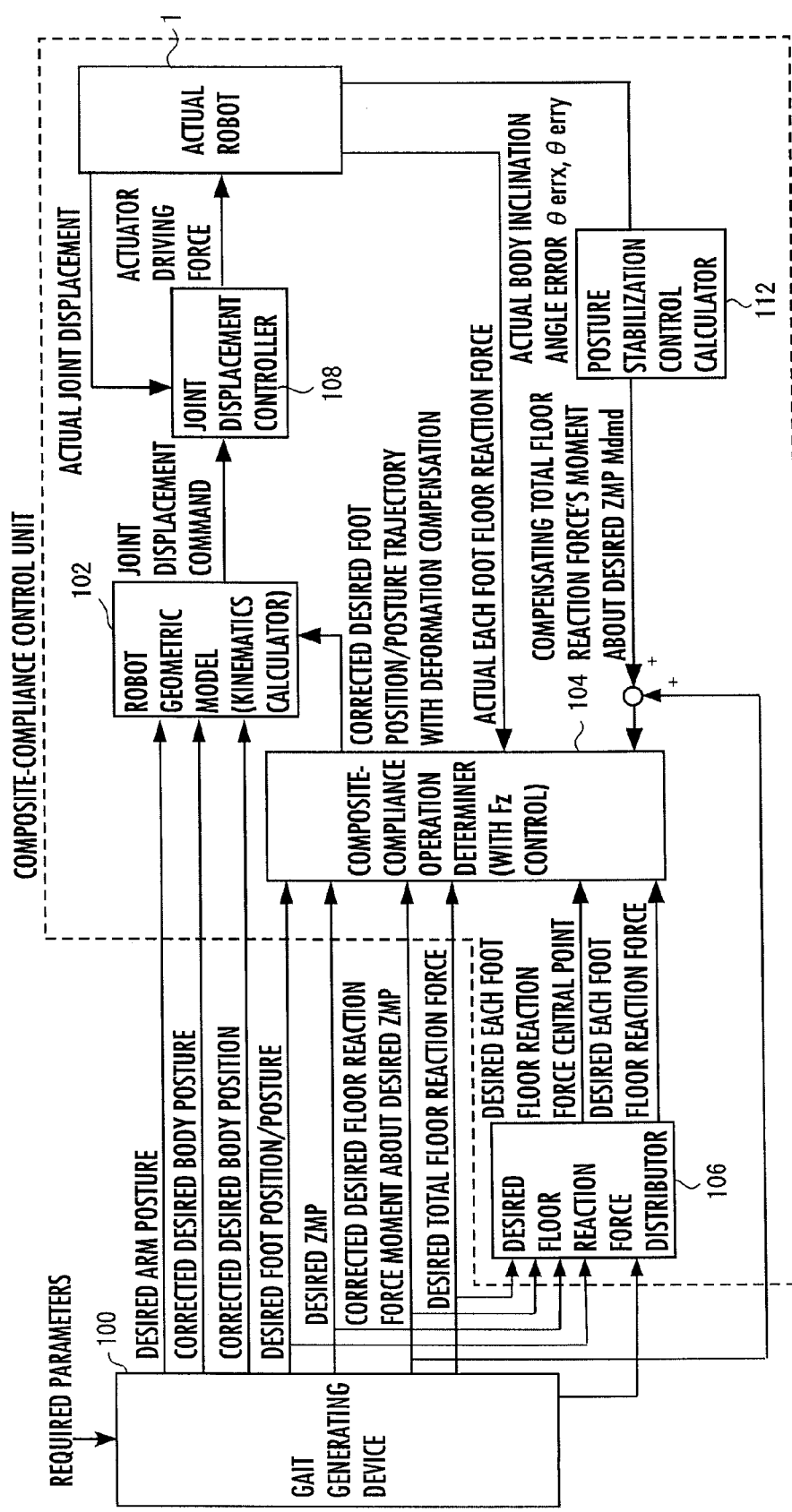
FIG. 4 is a block diagram showing the functional structure of the control unit shown in FIG. 3.
Figure 5:
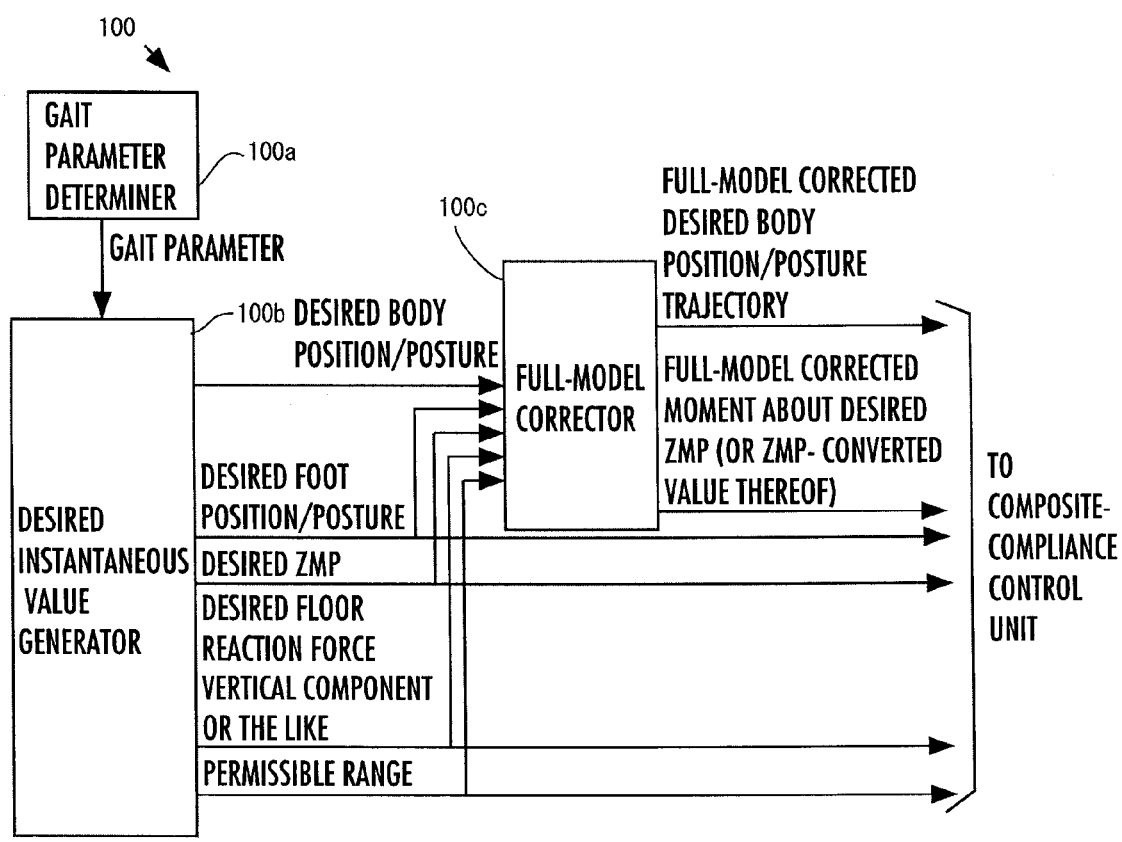
FIG. 5 is a block diagram showing the functions of a gait generating device shown in FIG. 4.
Figure 6A:
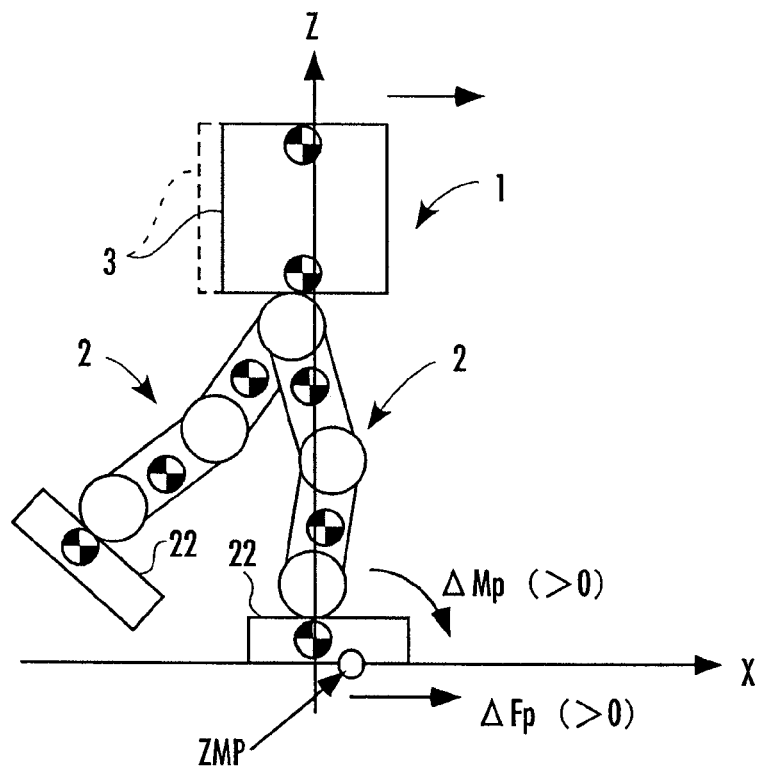
FIGS. 6(a) and (b) are diagrams for explaining the motion modes (a body translational mode and a body rotation mode), respectively, of the robot.
Figure 6B:
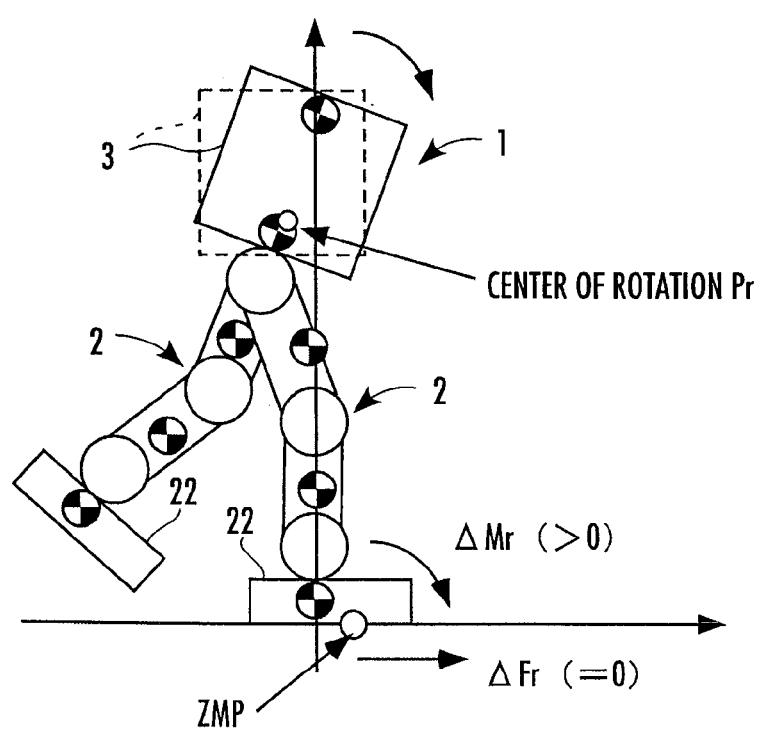
Figure 7:
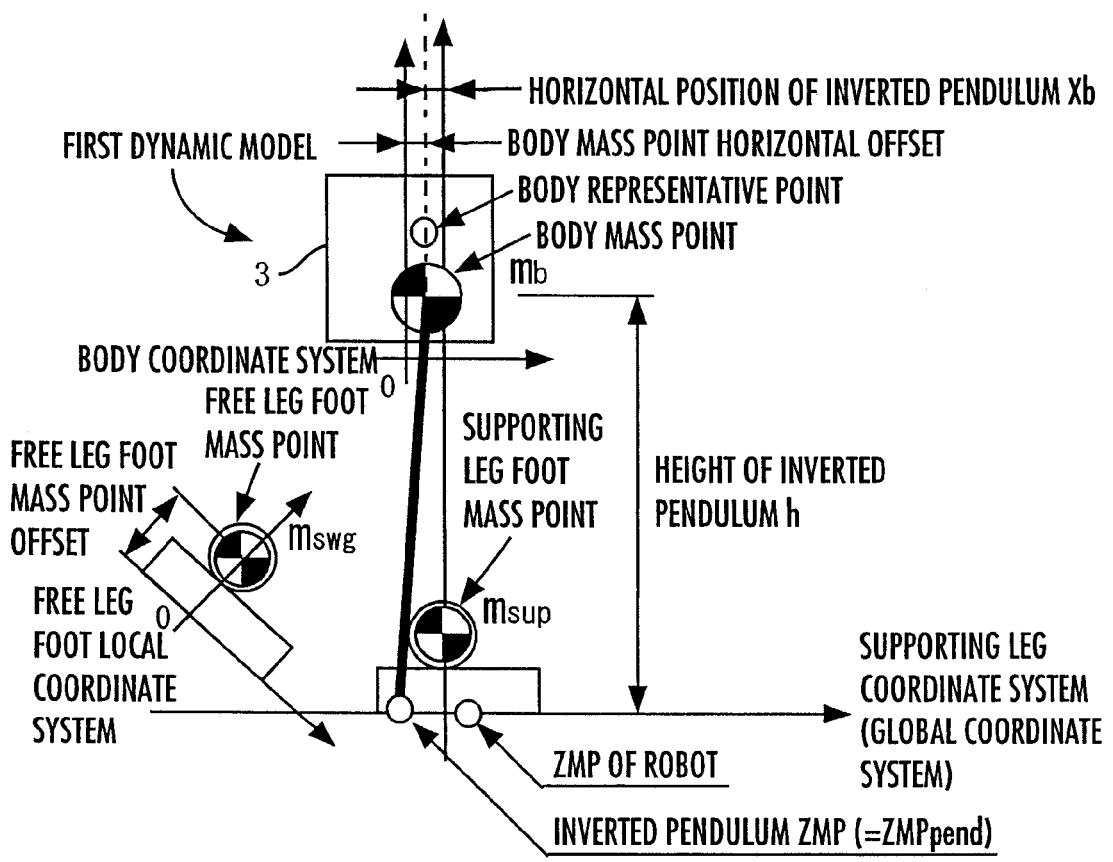
FIG. 7 is a diagram showing the structure of a first dynamic model used for generating gaits.
Figure 8:
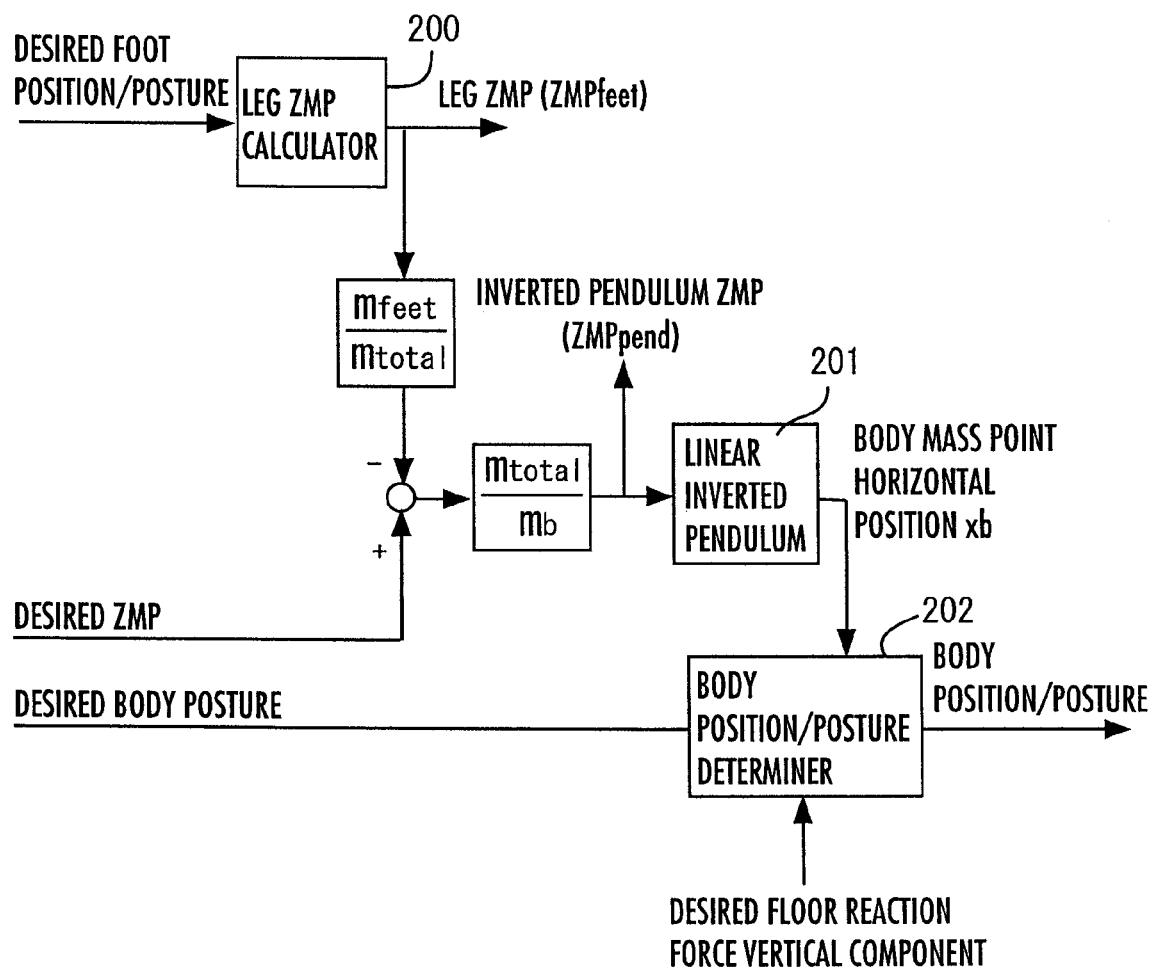
FIG. 8 is a block diagram showing the calculation processing of the first dynamic model.
Figure 9:
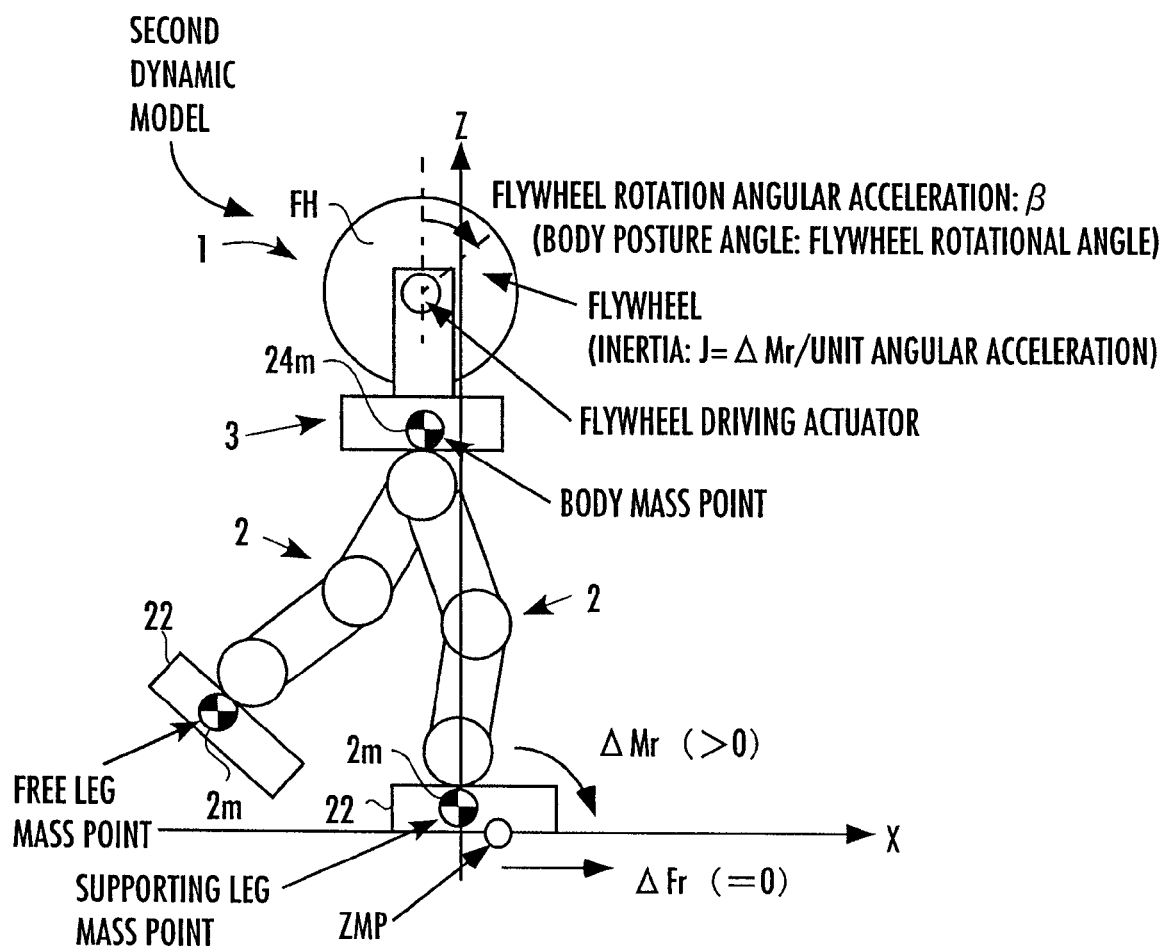
FIG. 9 is a diagram showing the structure of a second dynamic model used for generating gaits.
Figure 10:
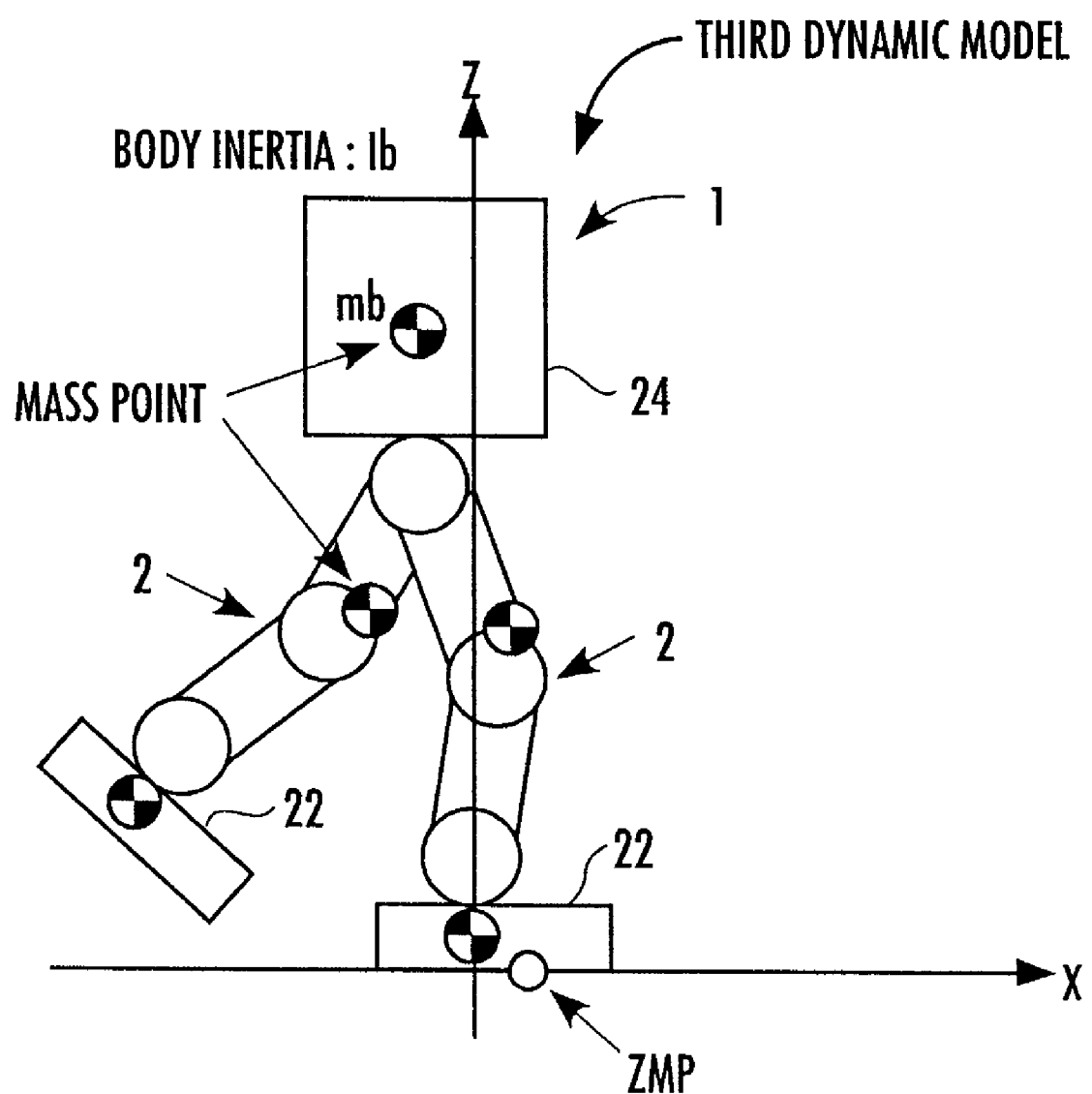
FIG. 10 is a diagram showing the structure of a third dynamic model used for generating gaits.
Figure 11:
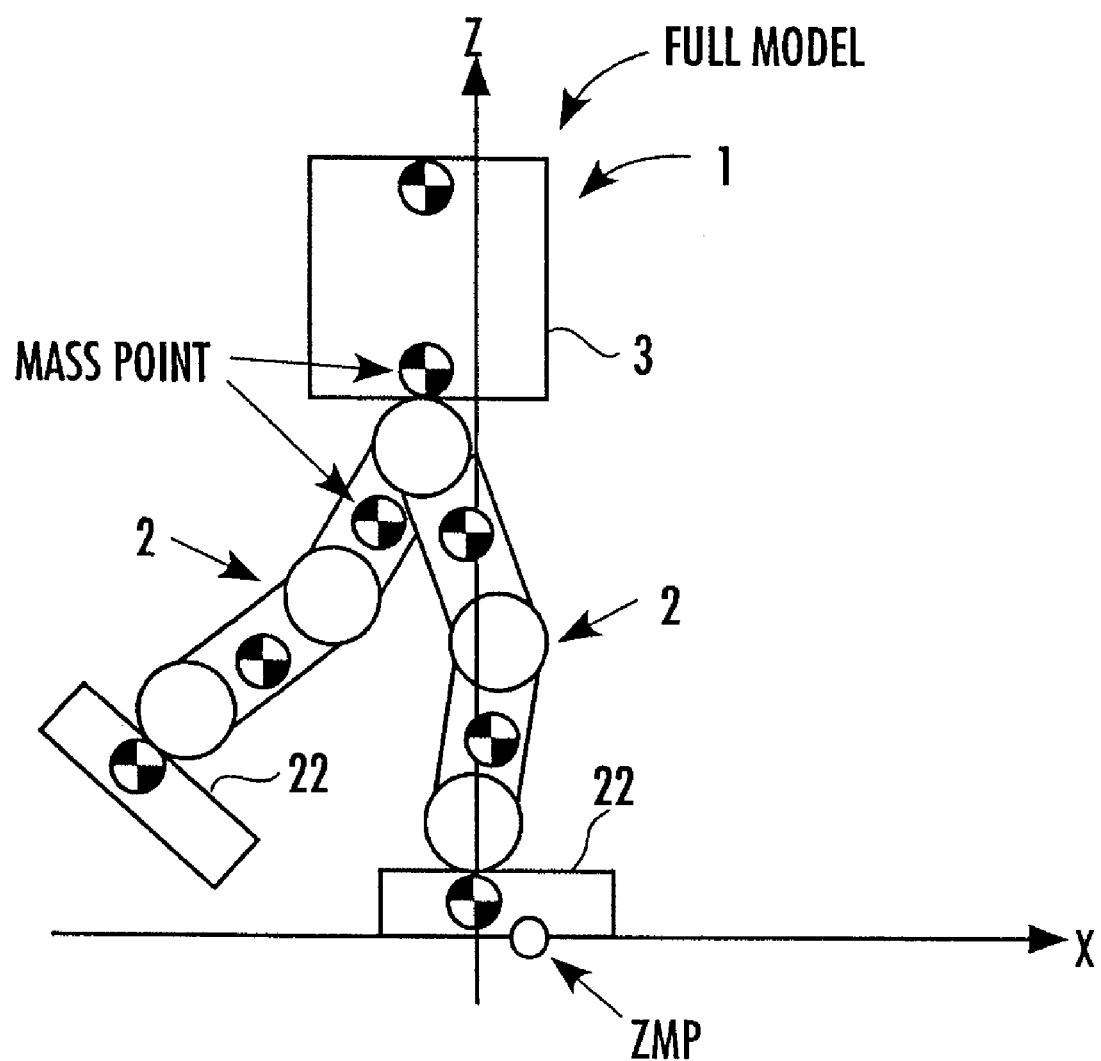
FIG. 11 is a diagram showing the structure of a full model used for generating gaits.
Figure 12:
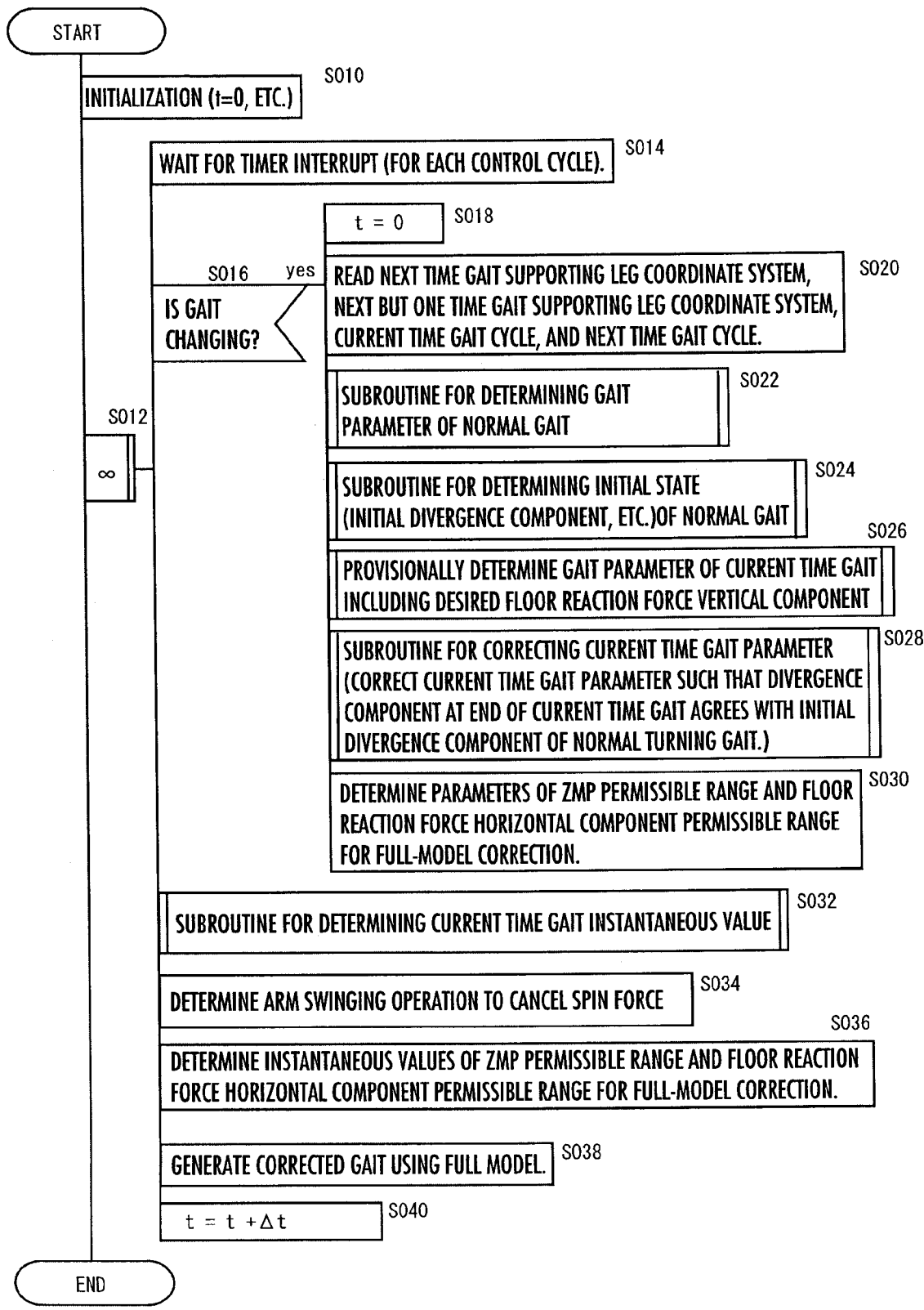
FIG. 12 is a flowchart showing the main routine processing of the gait generating device in a first embodiment.
Figure 13:
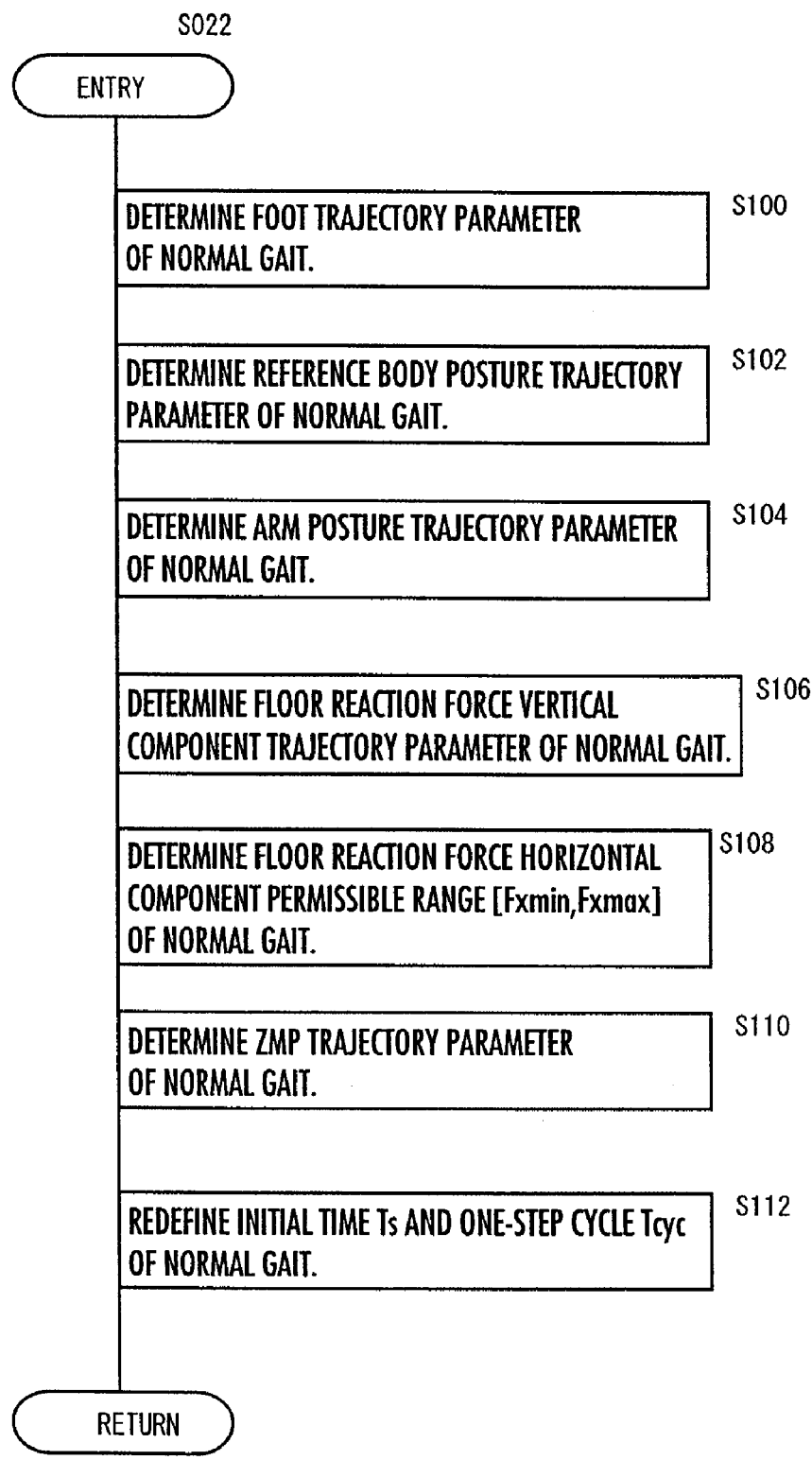
FIG. 13 is a flowchart showing the subroutine processing of FIG. 12.
Figure 14:
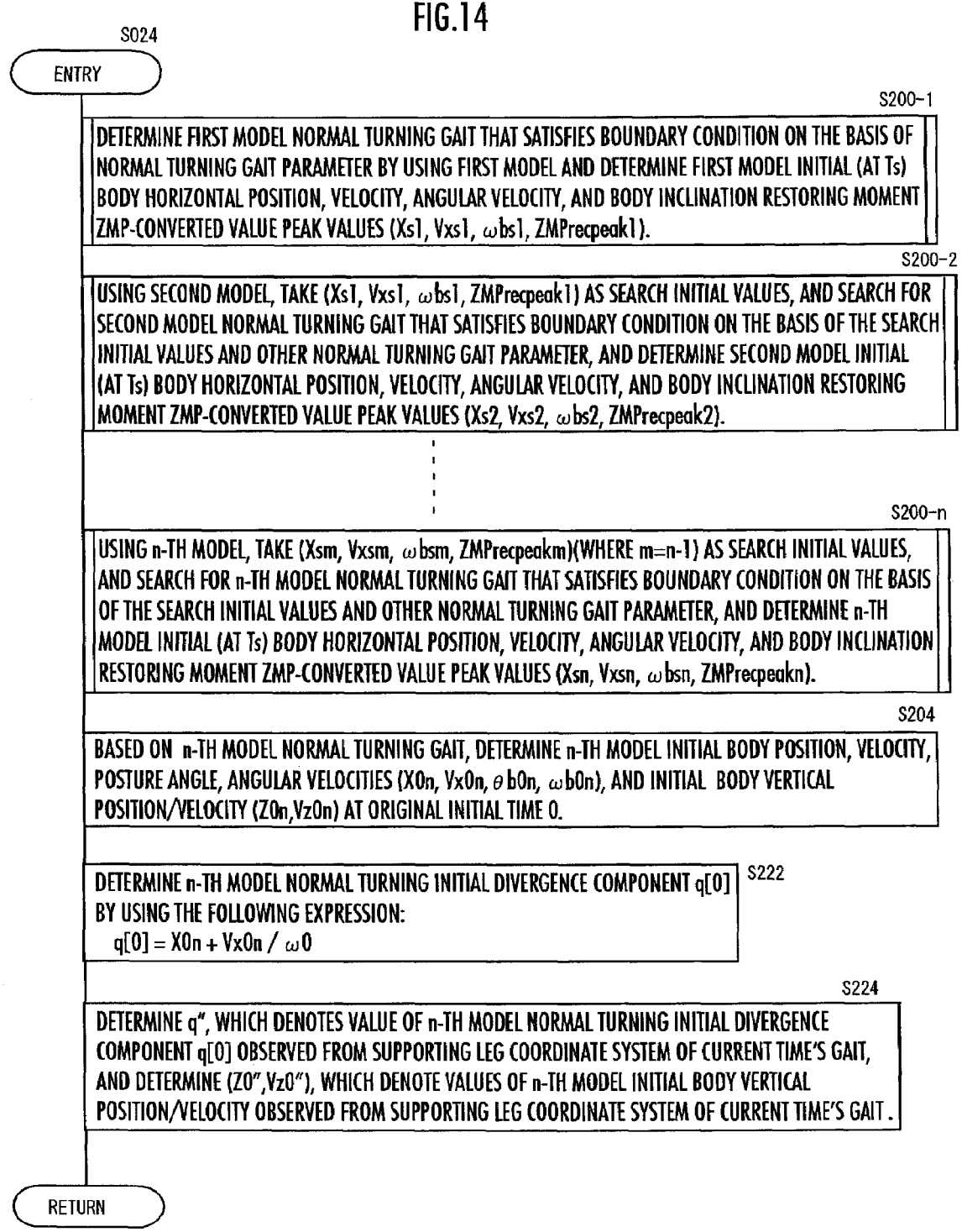
FIG. 14 is a flowchart showing the subroutine processing of FIG. 12.
Figure 15:
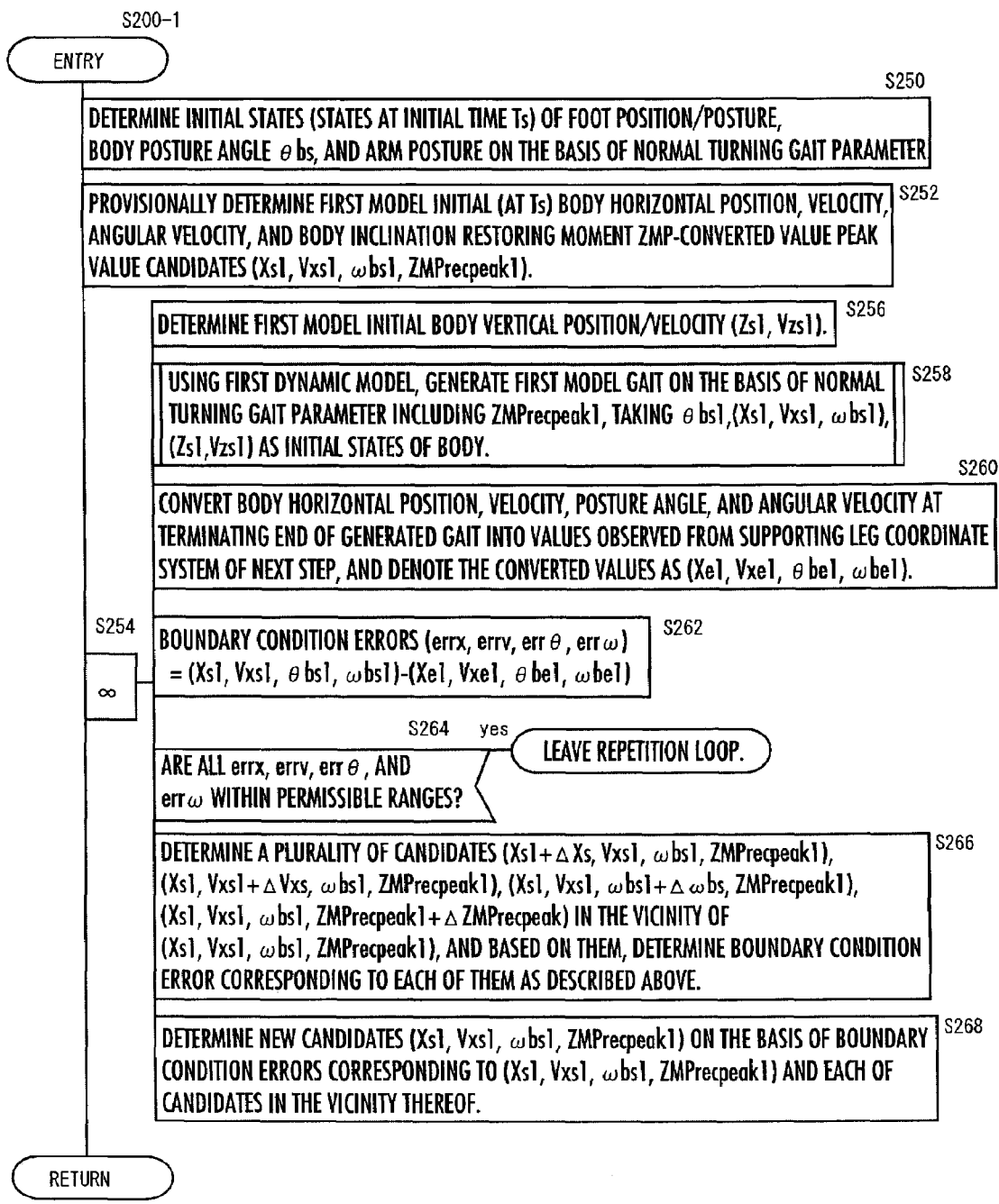
FIG. 15 is a flowchart showing the subroutine processing of FIG. 14.
Figure 16:
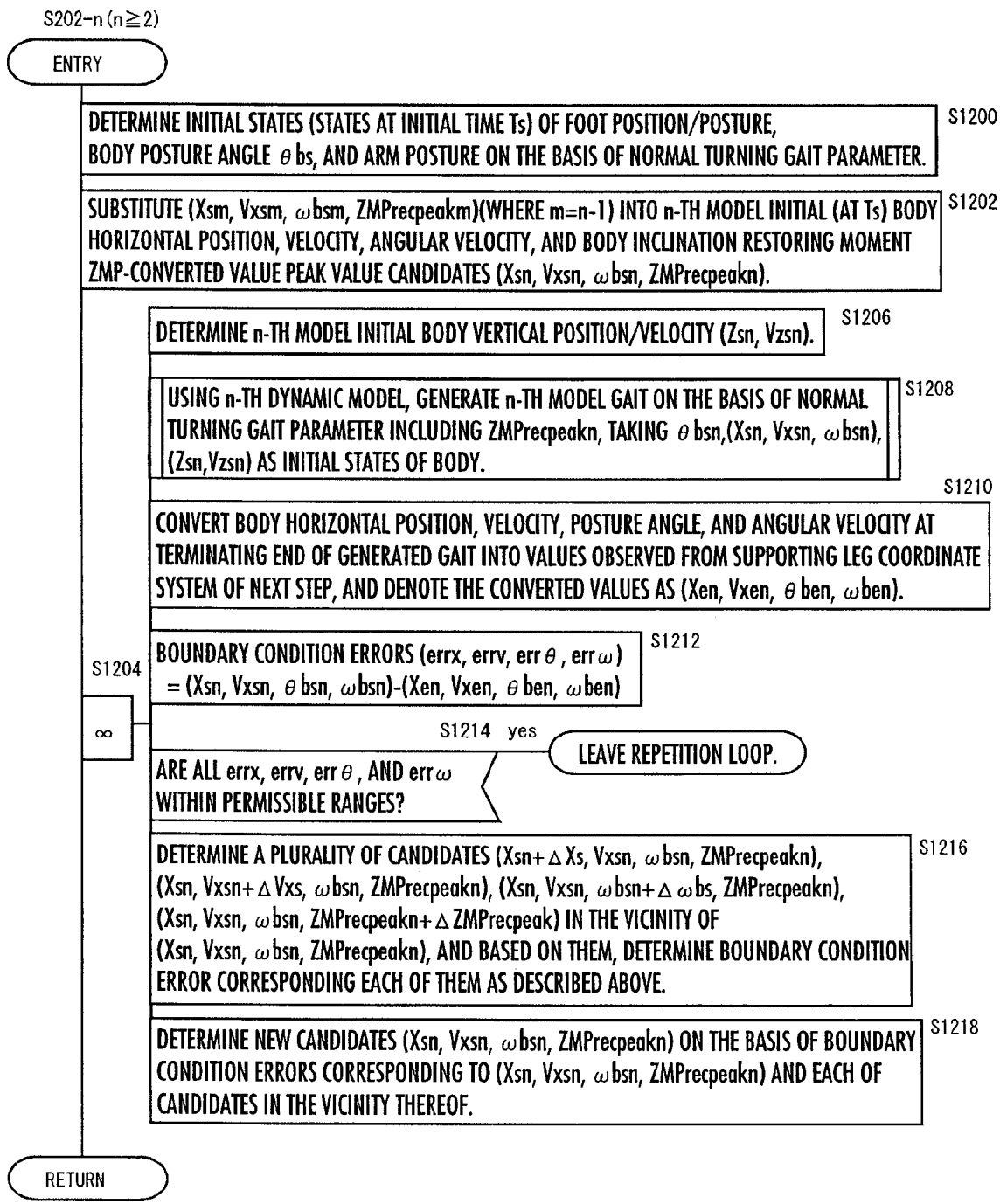
FIG. 16 is a flowchart showing the subroutine processing of FIG. 14.
Figure 17:
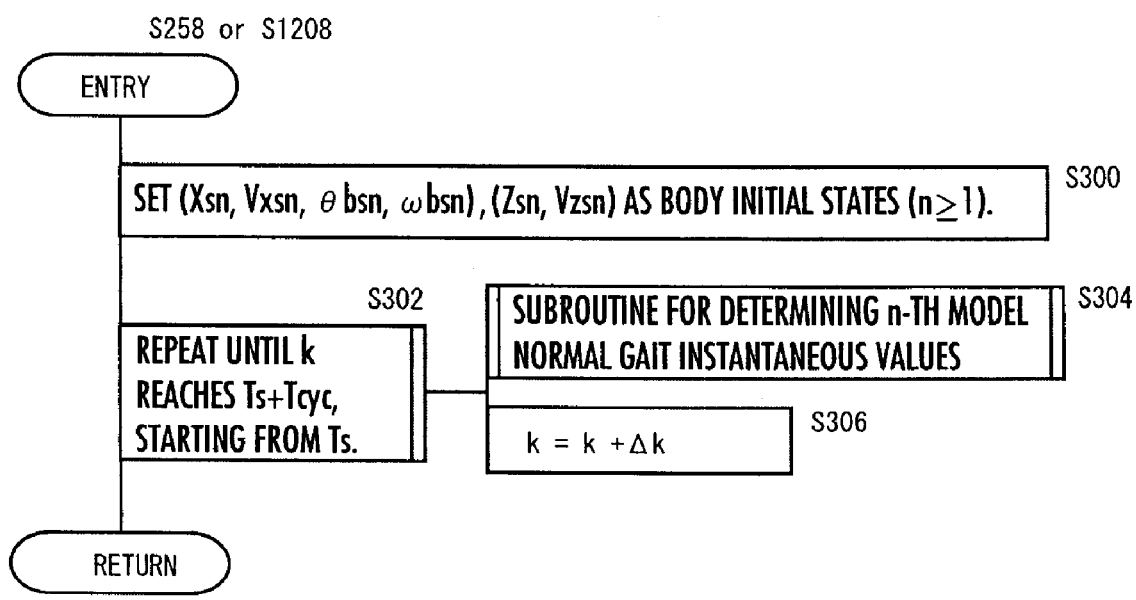
FIG. 17 is a flowchart showing the subroutine processing of FIG. 15 or FIG. 16.
Figure 18:
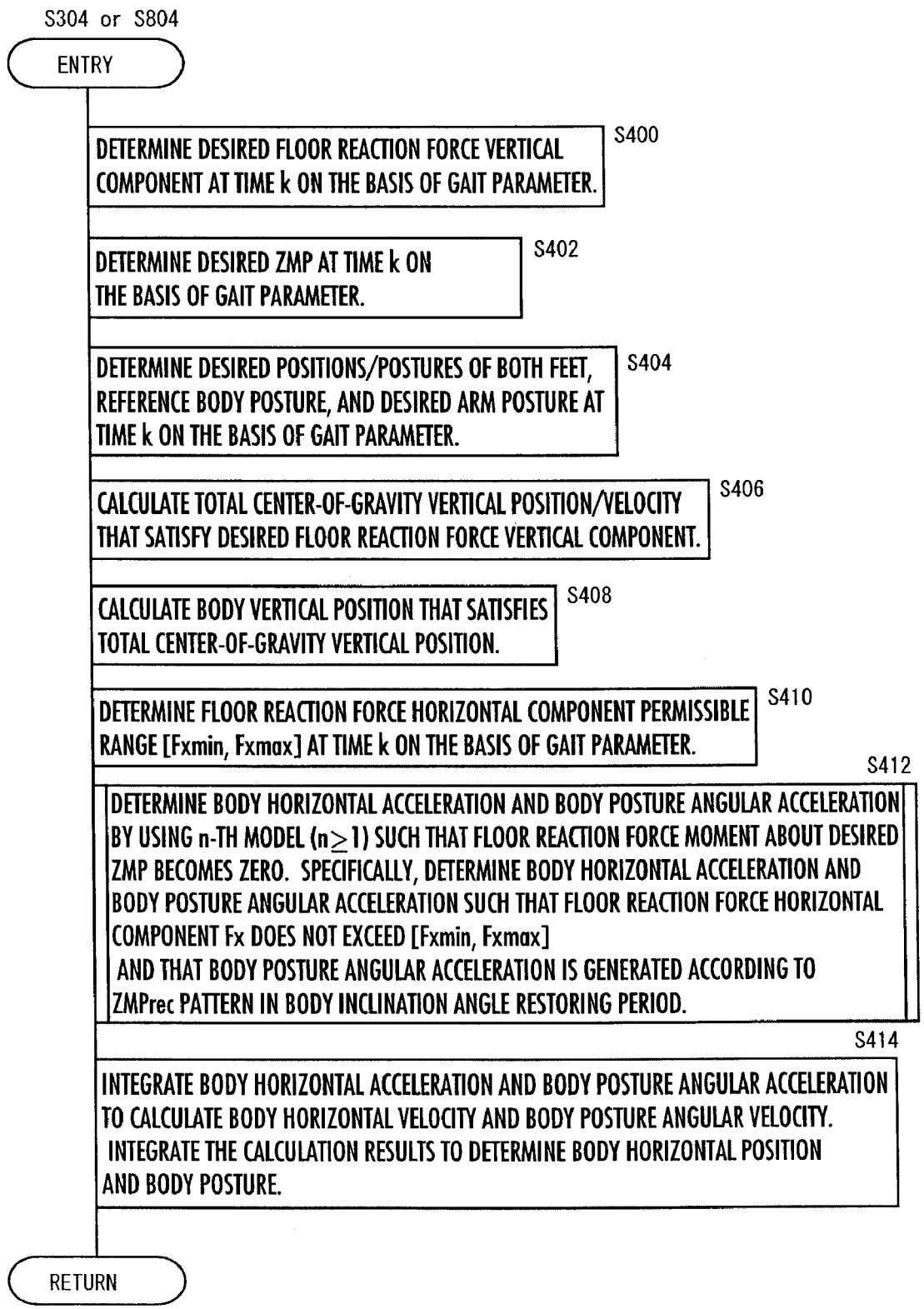
FIG. 18 is a flowchart showing the subroutine processing of FIG. 17.
Figure 19:
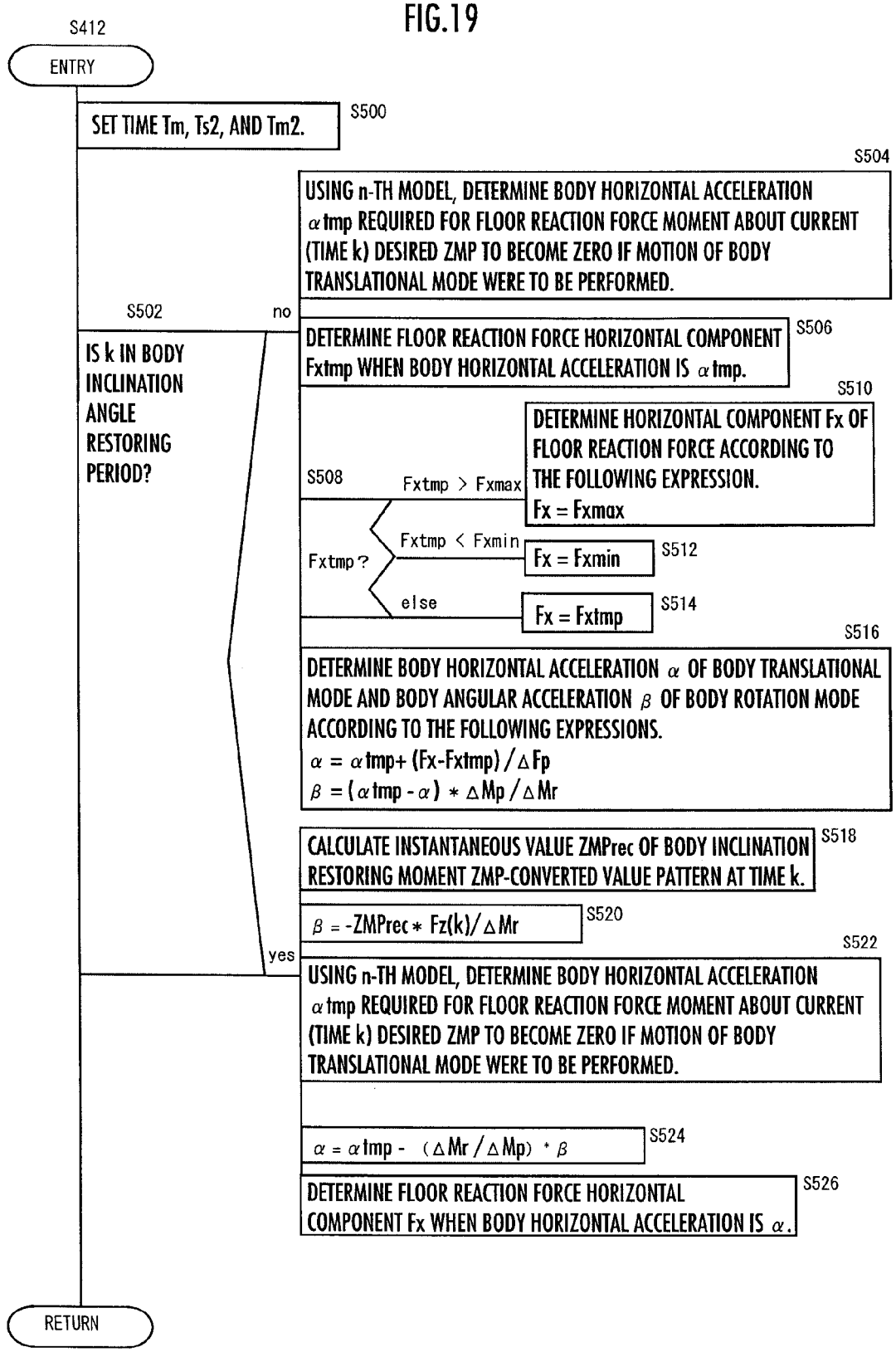
FIG. 19 is a flowchart showing the subroutine processing of FIG. 18.
Figure 20:
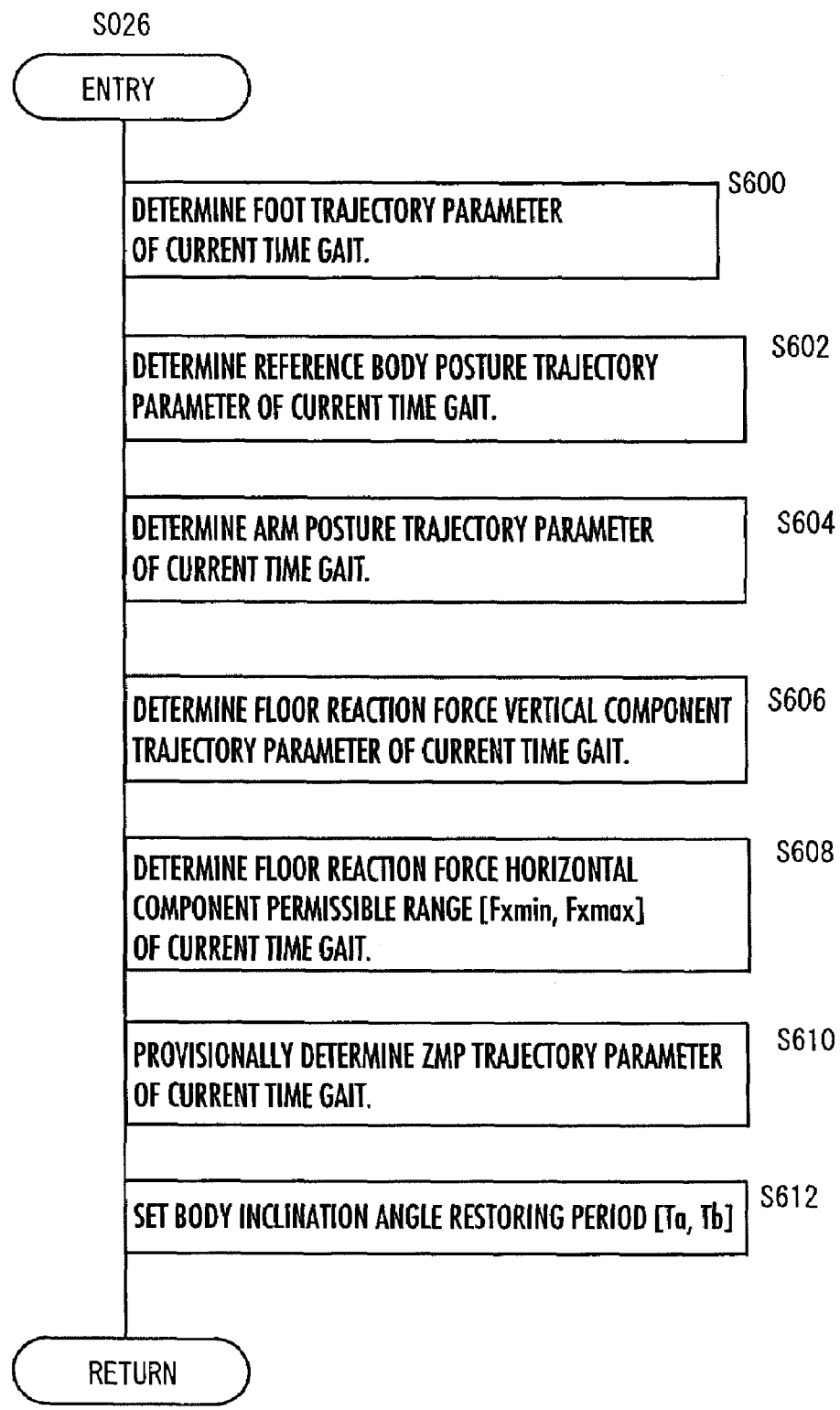
FIG. 20 is a flowchart showing the subroutine processing of FIG. 12.
Figure 21:
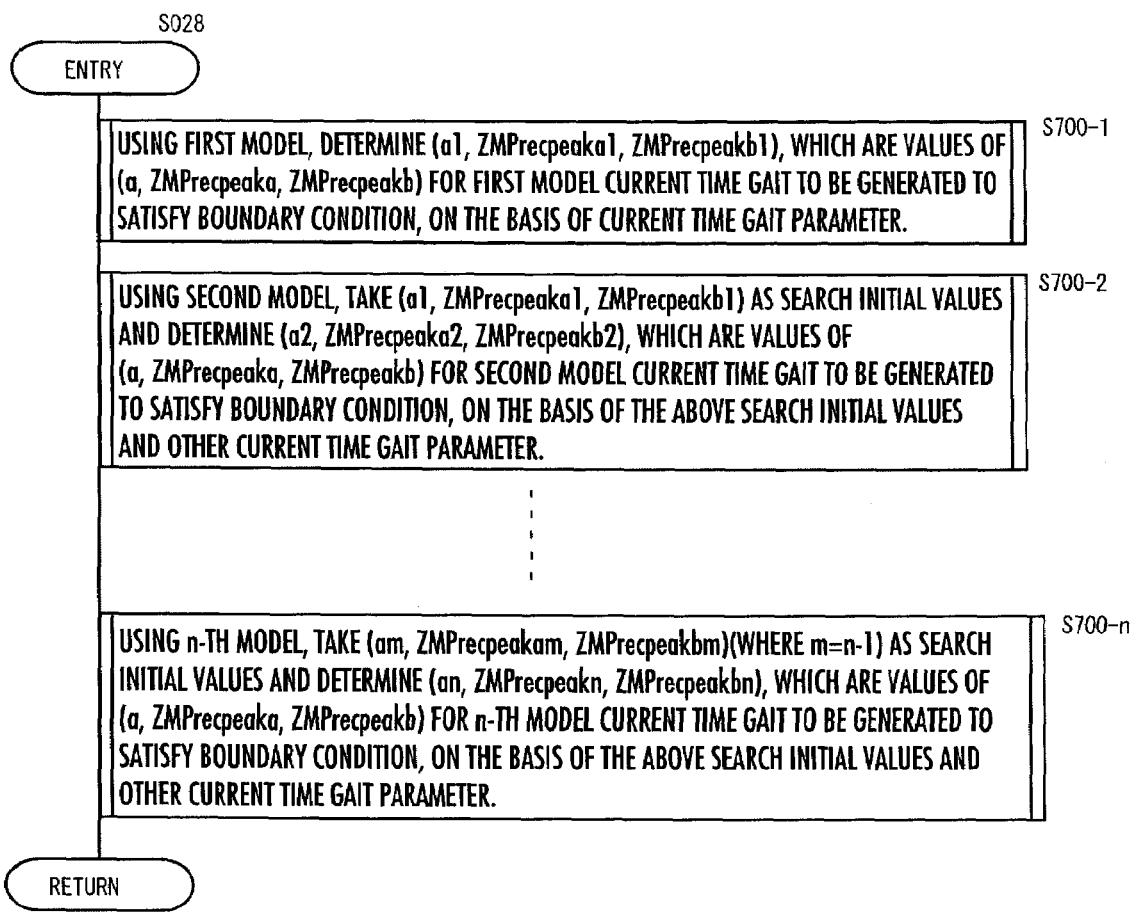
FIG. 21 is a flowchart showing the subroutine processing of FIG. 12.
Figure 22:
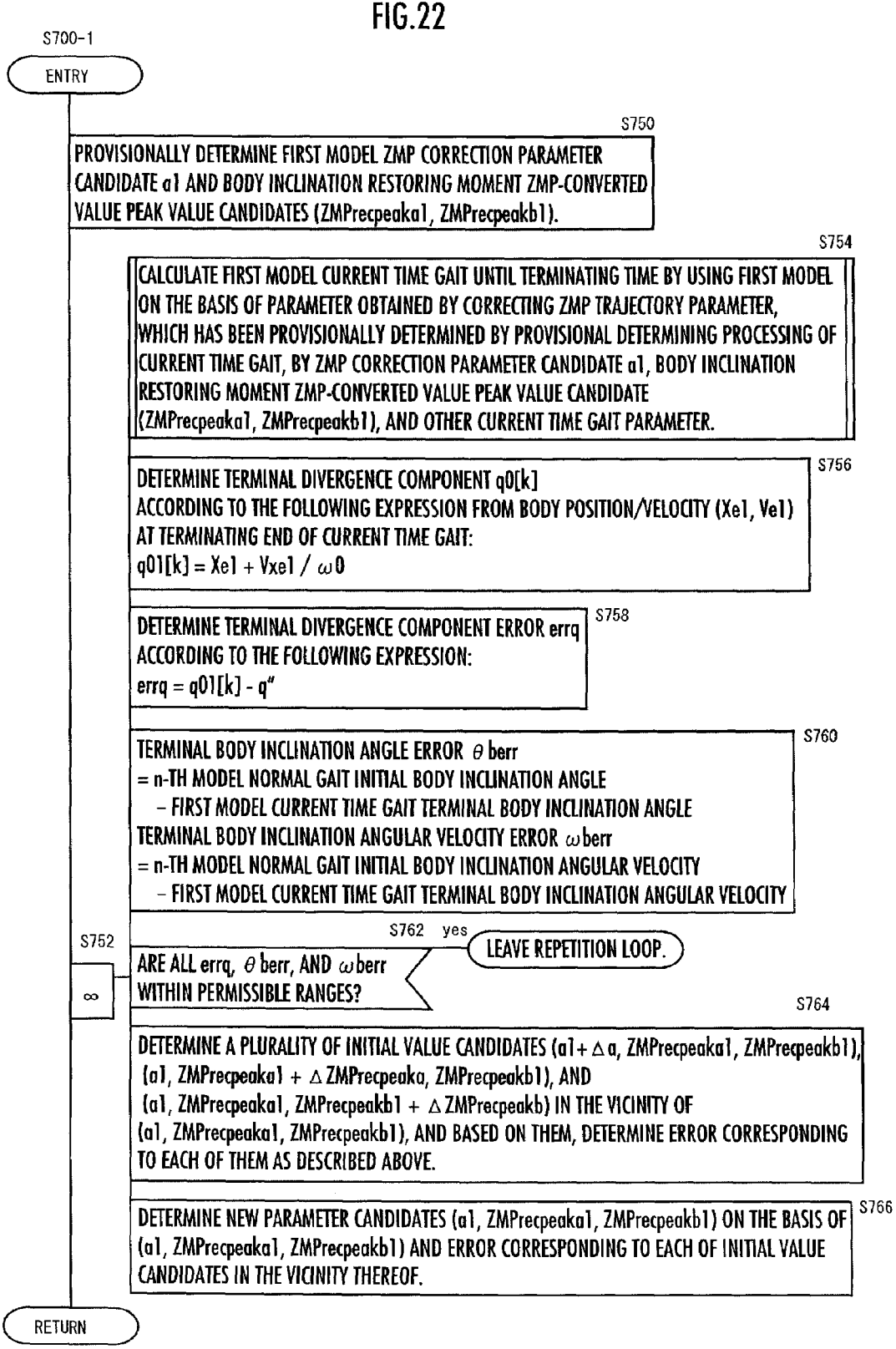
FIG. 22 is a flowchart showing the subroutine processing of FIG. 21.
Figure 23:
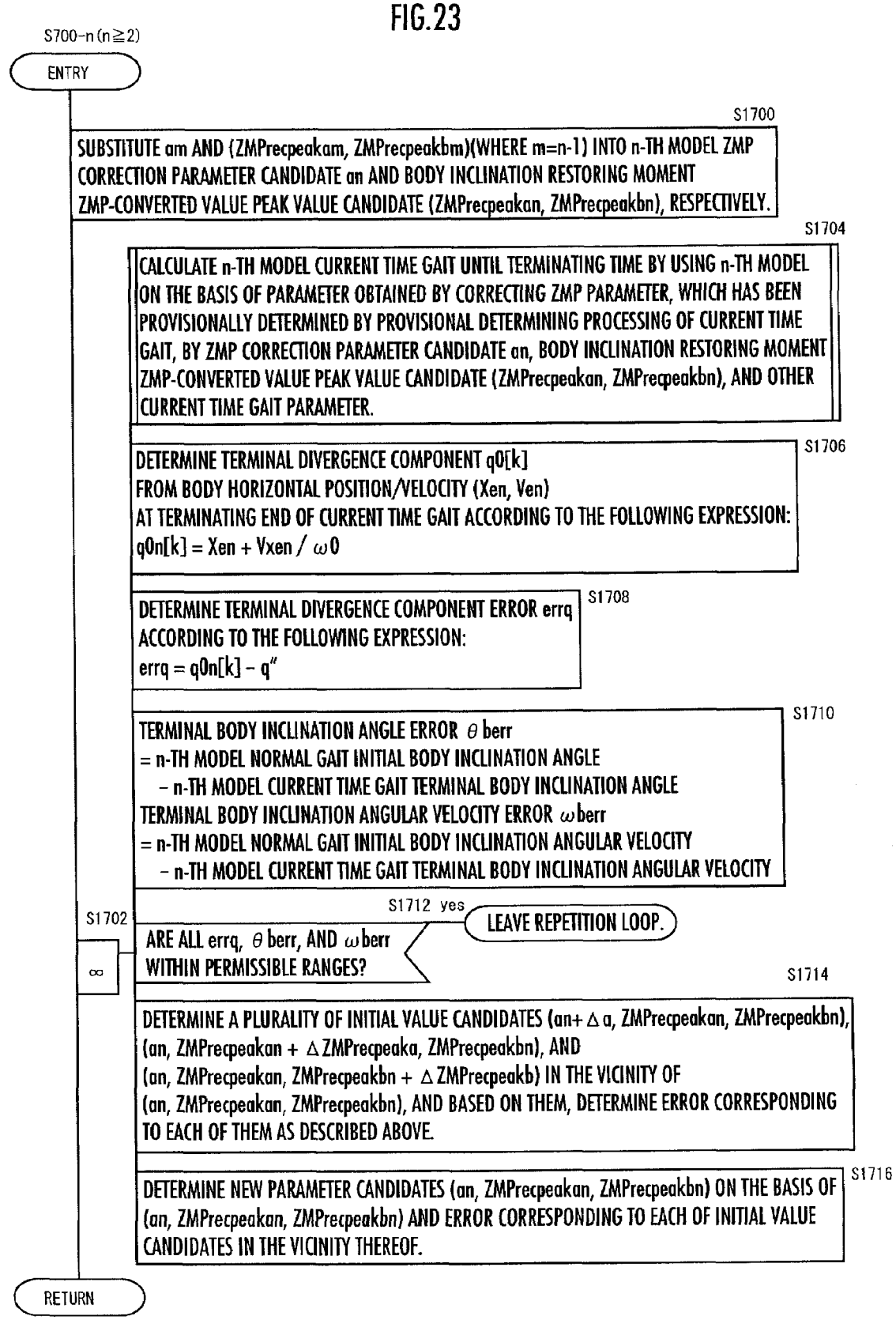
FIG. 23 is a flowchart showing the subroutine processing of FIG. 21.
Figure 24:
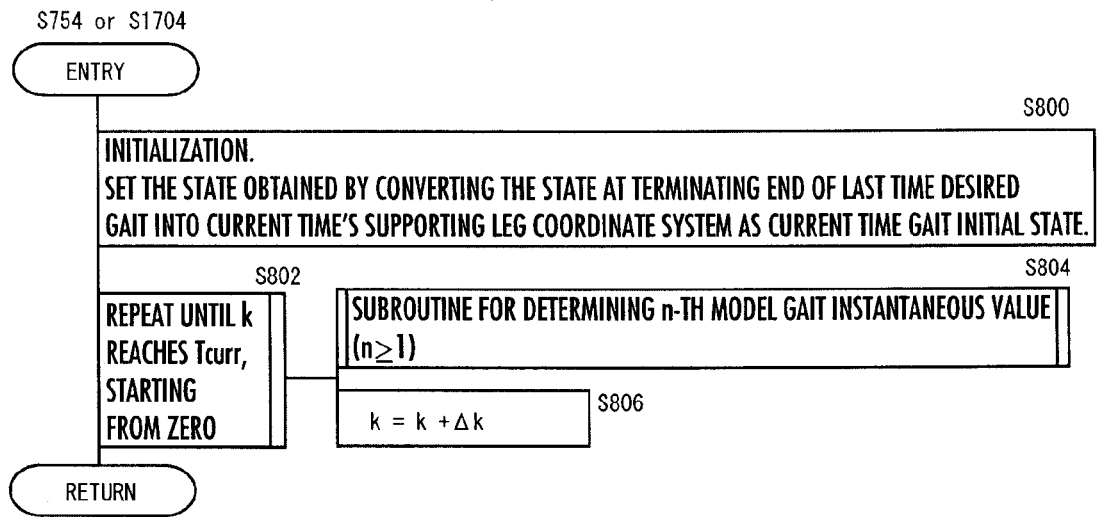
FIG. 24 is a flowchart showing the subroutine processing of FIG. 22 or FIG. 23.
Figure 25:
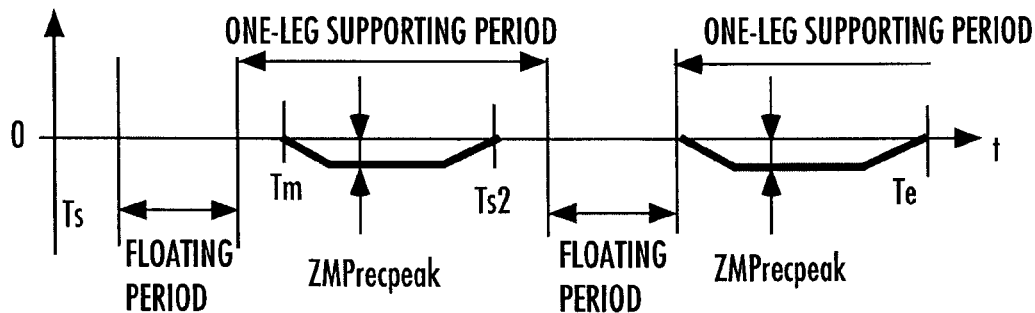
FIG. 25 is a graph showing examples of body inclination restoring moment ZMP-converted values in a normal gait.
Figure 26:
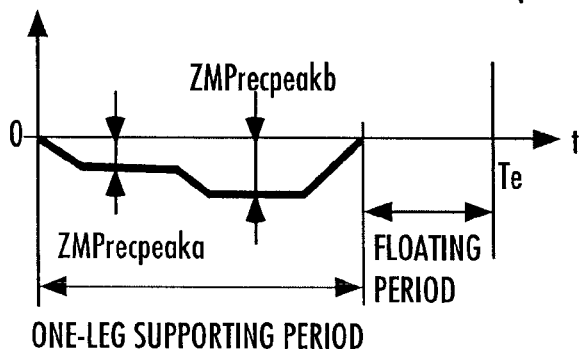
FIG. 26 is a graph showing examples of body inclination restoring moment ZMP-converted values in a current time's gait.
Figure 27:
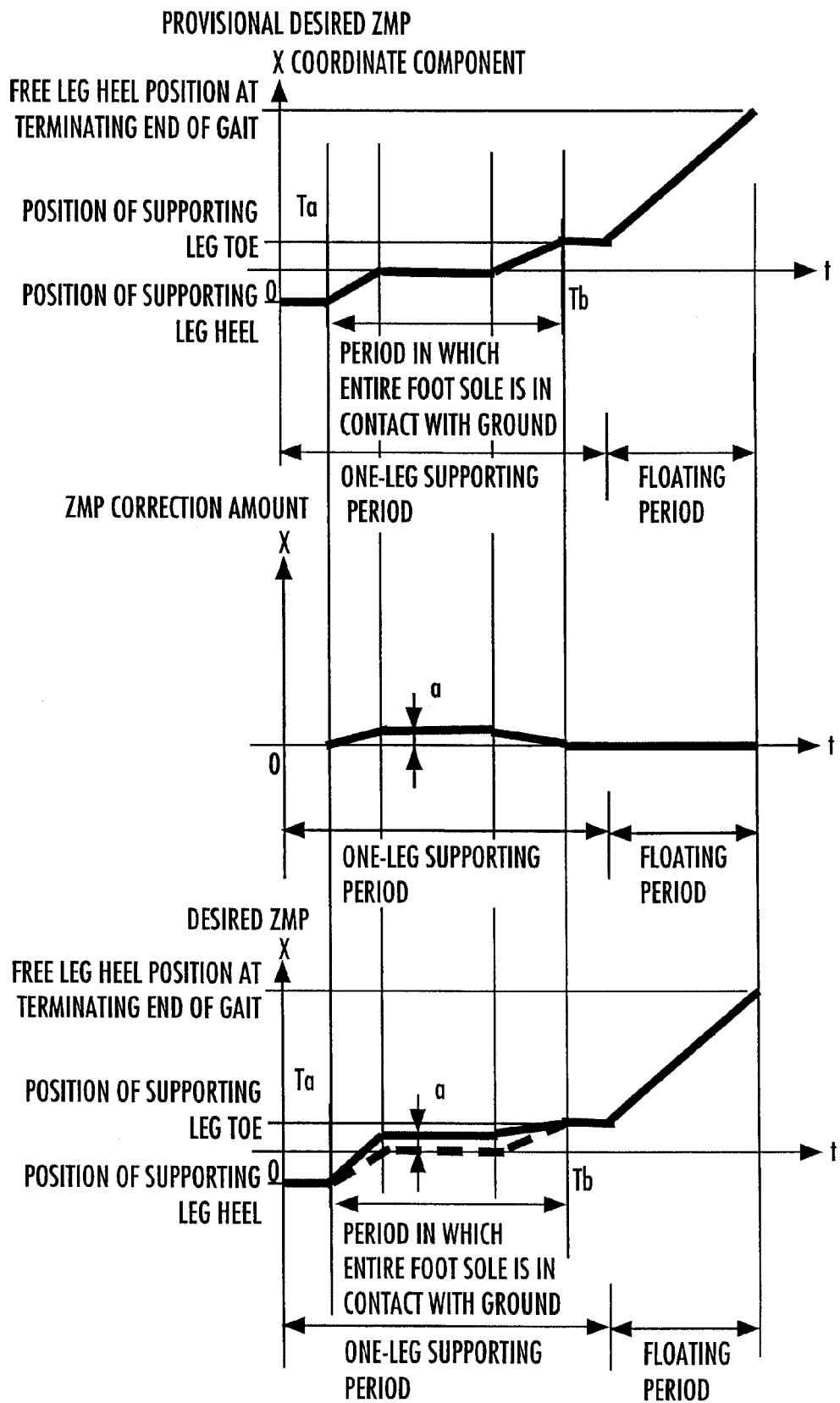
FIG. 27 is a graph showing examples of a provisional desired ZMP, a ZMP correction amount, and a desired ZMP in a current time's gait.
Figure 28:
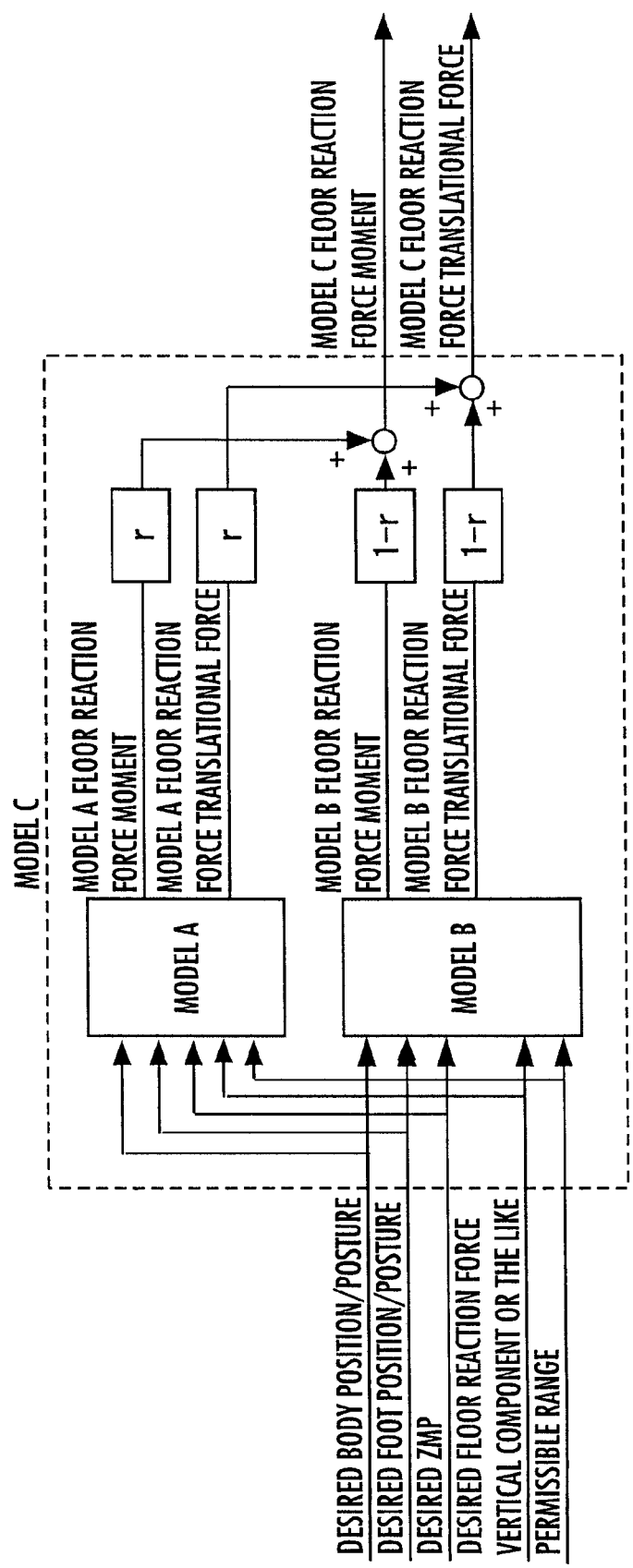
FIG. 28 is a block diagram showing a structure example of a dynamic model in a second embodiment.
Figure 29:
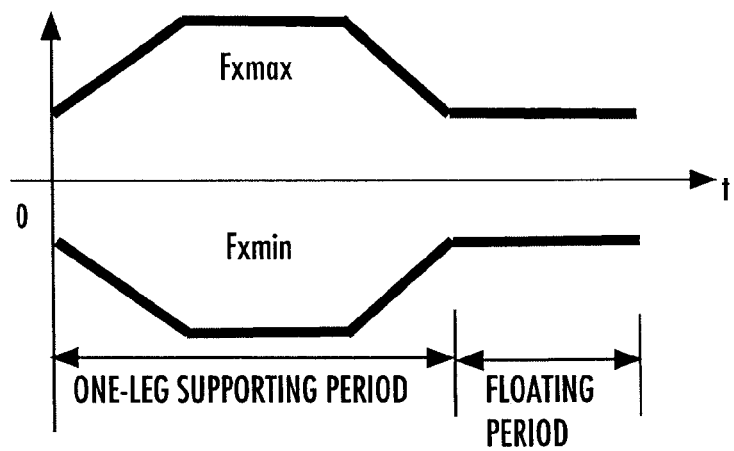
FIG. 29 is a graph showing an example of a case where each dynamic model in a third embodiment has a different floor reaction force horizontal component permissible range.
Figure 29:
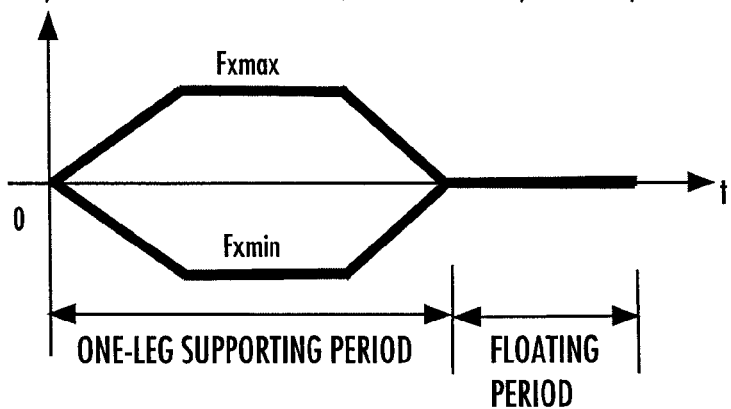
Figure 29:
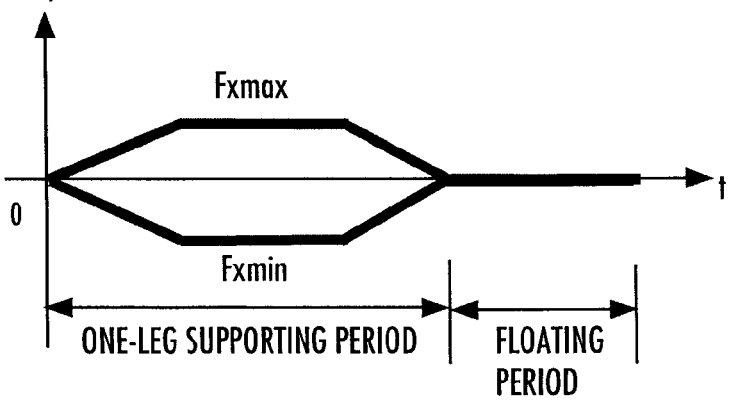

The invention claimed is:

1. A gait generating system for a mobile body, the system determining a gait parameter, which is composed of a set of a plurality of parameters defining a gait of a mobile robot in a predetermined period, and generating a desired gait of the mobile robot in the predetermined period by using the determined gait parameter and a dynamic model of the mobile robot, comprising:

n (n: an integer of 2 or more) dynamic models that include a motion/floor reaction force model representing a relationship between motions of the mobile robot and the floor reaction forces acting on the robot and that are constructed such that at least one of the motion/floor reaction force model, a restrictive condition added to a motion of the mobile robot in the motion/floor reaction force model, and a restrictive condition added to a floor reaction force in the motion/floor reaction force model is different from each other;

a first gait parameter determining means for determining a first gait parameter, which is composed of a set of provisional values of the plurality of parameters, such that a gait in the predetermined period that is generated using the first gait parameter and a first dynamic model, which is a predetermined dynamic model among the n dynamic models, satisfies a predetermined boundary condition; and a gait parameter correcting means for determining an m-th gait parameter, which is a gait parameter obtained by correcting a predetermined parameter to be corrected out of an (m−1)th gait parameter, from a second gait parameter to an n-th gait parameter in order by using an m-th dynamic model (m: integer satisfying $2 \leq m \leq n$), wherein each of n−1 dynamic models excluding the first dynamic model among the n dynamic models is defined as the m-th dynamic model, wherein the gait parameter correcting means comprises a means for determining the m-th gait parameter by, when the m-th gait parameter is respectively determined, generating a gait in the predetermined period by using the (m−1)th gait parameter and the m-th dynamic model and by correcting the parameter to be corrected out of the (m−1)th gait parameter such that the degree of deviation after correction, which is the degree of deviation of a gait in the predetermined period that is generated using the m-th gait parameter and the m-th dynamic model from the predetermined boundary condition is smaller than the degree of deviation before correction or the degree of deviation after correction falls within a predetermined degree of deviation permissible range on the basis of at least the degree of deviation before correction, which is the degree of deviation of the generated gait from the predetermined boundary condition, and a desired gait in the predetermined period is generated using an n-th gait parameter out of the determined m-th gait parameter and an n-th dynamic model.

2. A gait generating system for a mobile robot, when generating a desired gait of a mobile robot in a predetermined period, the system determining a normal gait parameter, which is composed of a set of a plurality of parameters defining a normal gait, which is a virtual cyclic gait following the desired gait, and generating the desired gait such that the desired gait approximates a normal gait generated using the determined normal gait parameter and a predetermined dynamic model of the mobile robot, comprising:

n (n: an integer of 2 or more) dynamic models that include a motion/floor reaction force model representing a relationship between motions of the mobile robot and the floor reaction forces acting on the robot and that are constructed such that at least one of the motion/floor reaction force model, a restrictive condition added to a motion of the mobile robot in the motion/floor reaction force model, and a restrictive condition added to a floor reaction force in the motion/floor reaction force model is different from each other a first normal gait parameter determining means for determining a first normal gait parameter, which is formed of a set of provisional values of the plurality of parameters, such that a normal gait generated using the first normal gait parameter and a first dynamic model, which is a predetermined dynamic model among the n dynamic models, satisfies a predetermined boundary condition; and a normal gait parameter correcting means for determining an m-th normal gait parameter, which is a normal gait parameter obtained by correcting a predetermined parameter to be corrected out of an (m−1)th normal gait parameter, from a second normal gait parameter to an n-th normal gait parameter in order by using an m-th dynamic model (m: integer satisfying $2 \leq m \leq n$), wherein each of n−1 dynamic models excluding the first dynamic model among the n dynamic models is defined as the m-th dynamic model, wherein the normal gait parameter correcting means comprises a means for determining, when the m-th normal gait parameter is determined, the m-th normal gait parameter by generating gaits for a period of at least one cycle of the normal gait by using the (m−1)th normal gait parameter and the m-th dynamic model and by correcting the parameter to be corrected out of the (m−1)th normal gait parameter on the basis of at least the degree of deviation before correction, which is the degree of deviation of the generated gait from the predetermined boundary condition, such that the degree of deviation after correction, which is the degree of deviation of a gait generated using the m-th normal gait parameter and the m-th dynamic model from the predetermined boundary condition, is smaller than the degree of deviation before correction or the degree of deviation after correction falls within a predetermined permissible range of the degree of deviation, and a desired gait in the predetermined period is generated such that the desired gait approximates a normal gait generated using an n-th normal gait parameter out of the determined m-th normal gait parameter and an n-th dynamic model.

3. The gait generating system for a mobile robot according to claim 1, wherein the n dynamic models are constructed such that the linearity between the degree of deviation of a gait generated using an arbitrary gait parameter and the (m−1)th dynamic model from the predetermined boundary condition and the parameter to be corrected out of the gait parameter is higher than the linearity between the degree of deviation of a gait generated using the gait parameter and the m-th dynamic model from the predetermined boundary condition and the parameter to be corrected out of the gait parameter.

4. The gait generating system for a mobile robot according to claim 2, wherein the n dynamic models are constructed such that the linearity between the degree of deviation of a normal gait generated using an arbitrary normal gait parameter and the (m−1)th dynamic model from the predetermined boundary condition and the parameter to be corrected out of the normal gait parameter is higher than the linearity between the degree of deviation of a normal gait generated using the normal gait parameter and the m-th dynamic model from the predetermined boundary condition and the parameter to be corrected out of the gait parameter.

5. The gait generating system for a mobile robot according to claim 1, wherein the n dynamic models are constructed such that the calculation time for generating a gait in the predetermined period by a computer by using an arbitrary gait parameter and the (m−1)th dynamic model is shorter than the calculation time for generating a gait in the predetermined period by the computer by using the gait parameter and the m-th dynamic model.

6. The gait generating system for a mobile robot according to claim 2, wherein the n dynamic models are constructed such that the calculation time for generating a gait in the one-cycle period of the normal gait by a computer by using an arbitrary normal gait parameter and the (m−1)th dynamic model is shorter than the calculation time for generating a gait in the one-cycle period of the normal gait by the computer by using the gait parameter and the m-th dynamic model.

7. The gait generating system for a mobile robot according to claim 1, wherein the mobile robot is a legged mobile robot, and at least the first dynamic model and a second dynamic model out of the n dynamic models are constructed such that the ratio of the mass of the legs of the robot to the total mass of the mobile robot in the first dynamic model is smaller than the ratio of the mass of the legs of the robot to the total mass of the mobile robot in the second dynamic model.

8. The gait generating system for a mobile robot according to claim 1, wherein if one predetermined dynamic model out of the n dynamic models, excluding the n-th dynamic model, is denoted as a k-th dynamic model (k: any integer that satisfies $1 \leq k \leq n-1$), then at least the k-th dynamic model and a (k+1)th dynamic model are dynamic models, respectively, to which a condition in which at least one of a motion of the mobile robot and a floor reaction force in a gait generated using the dynamic models and arbitrary gait parameters falls within the predetermined permissible ranges set for the individual dynamic models is added as the restrictive condition, and a permissible range used with the (k+1)th dynamic model is set to be narrower than a permissible range used with the k-th dynamic model.

9. The gait generating system for a mobile robot according to claim 2, wherein if one predetermined dynamic model out of the n dynamic models, excluding the n-th dynamic model, is denoted as a k-th dynamic model (k: any integer that satisfies $1 \leq k \leq n-1$), then at least the k-th dynamic model and a (k+1)th dynamic model are dynamic models, respectively, to which a condition in which at least one of a motion of the mobile robot and a floor reaction force in a normal gait generated using the dynamic models and arbitrary normal gait parameters falls within the predetermined permissible ranges set for the individual dynamic models is added as the restrictive condition, and the permissible range used with the (k+1)th dynamic model is set to be narrower than the permissible range used with the k-th dynamic model.

10. The gait generating system for a mobile robot according to claim 1, wherein if a predetermined motion/floor reaction force model representing a relationship between motions of the mobile robot and floor reaction forces is defined as an A-th motion/floor reaction force model, a predetermined motion/floor reaction force model that represents a relationship between the motions of the mobile robot and floor reaction forces and the relationship is constructed such that the floor reaction forces generated in response to predetermined motions of the robot are different from those of the A-th motion/floor reaction force model is defined as a B-th motion/floor reaction force model, and one predetermined dynamic model out of the n dynamic models, excluding the n-th dynamic model, is defined as a k-th dynamic model (k: any integer that satisfies $1 \leq k \leq n-1$), then the k-th dynamic model will be a dynamic model in which the floor reaction force generated on the k-th dynamic model in response to an arbitrary motion of the mobile robot takes a weighted mean value calculated using a predetermined weight from a floor reaction force generated on the A-th motion/floor reaction force model in response to the motion and a floor reaction force generated on the B-th motion/floor reaction force model in response to the motion, and the (k+1)th dynamic model will be a dynamic model in which the floor reaction force generated on the k-th dynamic model in response to an arbitrary motion of the mobile robot takes a weighted mean value calculated using a predetermined weight different from that in the k-th dynamic model from a floor reaction force generated on the A-th motion/floor reaction force model in response to the motion and a floor reaction force generated on the B-th motion/floor reaction force model in response to the motion.

11. The gait generating system for a mobile robot according to claim 1, wherein the gait parameter includes a parameter specifying a desired ZMP trajectory in the gait during the predetermined period as the parameter to be corrected.

12. The gait generating system for a mobile robot according to claim 2, wherein the normal gait parameter includes a parameter that specifies a predetermined state amount of a motion of the mobile robot at one end of the one-cycle period of the normal gait as the parameter to be corrected.

13. The gait generating system for a mobile robot according to claim 1, wherein the predetermined boundary condition includes a condition in which a predetermined state amount of a motion of the mobile robot in a boundary of a gait during the predetermined period agrees with the predetermined state amount of the motion of the mobile robot in an adjacent gait in the boundary.

14. The gait generating system for a mobile robot according to claim 1, wherein the predetermined boundary condition includes a condition in which the predetermined state amount of a motion of a mobile robot in the boundary of at the terminating end of a gait in the predetermined period agrees with the predetermined state amount of a motion of the mobile robot in a normal gait determined as the virtual cyclic gait that is to follow the gait.

15. The gait generating system for a mobile robot according to claim 2, wherein the predetermined boundary condition includes a condition in which the predetermined state amounts of a motion of a mobile robot at the starting end and the terminating end of one cycle of the normal gait agree with each other.

16. The gait generating system for a mobile robot according to claim 12, wherein the mobile robot is a legged mobile robot equipped with a plurality of legs extended from its body, and the predetermined state amount includes at least one of the position of the body of the robot, the velocity of the body, the posture angle of the body, the angular velocity of the posture angle of the body, the weighted mean values of the position and the velocity of the body, the position of the total center-of-gravity of the robot, the velocity of the total center-of-gravity of the robot, the weighted mean values of the position and the velocity of the total center-of-gravity, and a divergence component.

17. The gait generating system for a mobile robot according to claim 1, wherein the gait parameter correcting means is a means that, when determining each of the m-th gait parameters, generates a gait in the predetermined period by using the (m−1)th gait parameter and the m-th dynamic model, determines at least one set of auxiliary gait parameters obtained by correcting the parameter to be corrected out of the (m−1)th gait parameter by a predetermined amount, generates a gait in the predetermined period by using the determined auxiliary gait parameter of each set and the m-th dynamic model, determines the correction amount of the parameter to be corrected out of the (m−1)th gait parameter on the basis of the degree of deviation before correction, which is the degree of deviation of the gait, which has been generated using the (m−1)th gait parameter, from the predetermined boundary condition and the auxiliary degree of deviation of the gait, which has been generated using the auxiliary gait parameters of each set, from the predetermined boundary condition, and corrects the parameter to be corrected, thereby determining the m-th gait parameter.

18. The gait generating system for a mobile robot according to claim 2, wherein the normal gait parameter correcting means is a means that, when determining each of the m-th normal gait parameters, generates a gait for at least one-cycle period of the normal gait by using the (m−1)th normal gait parameter and the m-th dynamic model, determines at least one set of auxiliary normal gait parameters obtained by correcting the parameter to be corrected out of the (m−1)th gait parameter by a predetermined amount, generates a gait for at least the one-cycle period of the normal gait by using the determined auxiliary normal gait parameters of each set and the m-th dynamic model, determines the correction amount of the parameter to be corrected out of the (m−1)th normal gait parameter on the basis of the degree of deviation before correction, which is the degree of deviation of the gait, which has been generated using the (m−1)th normal gait parameter, from the predetermined boundary condition and the auxiliary degree of deviation, which is the degree of deviation of a gait generated using the auxiliary normal gait parameters of each set from the predetermined boundary condition, and determines the m-th normal gait parameter by correcting the parameter to be corrected.

19. The gait generating system for a mobile robot according to claim 2, wherein the mobile robot is a legged mobile robot, and
    at least the first dynamic model and a second dynamic model out of the n dynamic models are constructed such that the ratio of the mass of the legs of the robot to the total mass of the mobile robot in the first dynamic model is smaller than the ratio of the mass of the legs of the robot to the total mass of the mobile robot in the second dynamic model.

20. The gait generating system for a mobile robot according to claim 2, wherein if a predetermined motion/floor reaction force model representing a relationship between motions of the mobile robot and floor reaction forces is defined as an A-th motion/floor reaction force model, a predetermined motion/floor reaction force model that represents a relationship between the motions of the mobile robot and floor reaction forces and the relationship is constructed such that the floor reaction forces generated in response to predetermined motions of the robot are different from those of the A-th motion/floor reaction force model is defined as a B-th motion/floor reaction force model, and one predetermined dynamic model out of the n dynamic models, excluding the n-th dynamic model, is defined as a k-th dynamic model (k: any integer that satisfies $1 \leq k \leq n-1$), then the k-th dynamic model will be a dynamic model in which the floor reaction force generated on the k-th dynamic model in response to an arbitrary motion of the mobile robot takes a weighted mean value calculated using a predetermined weight from a floor reaction force generated on the A-th motion/floor reaction force model in response to the motion and a floor reaction force generated on the B-th motion/floor reaction force model in response to the motion, and the (k+1)th dynamic model will be a dynamic model in which the floor reaction force generated on the k-th dynamic model in response to an arbitrary motion of the mobile robot takes a weighted mean value calculated using a predetermined weight different from that in the k-th dynamic model from a floor reaction force generated on the A-th motion/floor reaction force model in response to the motion and a floor reaction force generated on the B-th motion/floor reaction force model in response to the motion.

21. The gait generating system for a mobile robot according to claim 13, wherein the mobile robot is a legged mobile robot equipped with a plurality of legs extended from its body, and the predetermined state amount includes at least one of the position of the body of the robot, the velocity of the body, the posture angle of the body, the angular velocity of the posture angle of the body, the weighted mean values of the position and the velocity of the body, the position of the total center-of-gravity of the robot, the velocity of the total center-of-gravity of the robot, the weighted mean values of the position and the velocity of the total center-of-gravity, and a divergence component.

22. The gait generating system for a mobile robot according to claim 14, wherein the mobile robot is a legged mobile robot equipped with a plurality of legs extended from its body, and the predetermined state amount includes at least one of the position of the body of the robot, the velocity of the body, the posture angle of the body, the angular velocity of the posture angle of the body, the weighted mean values of the position and the velocity of the body, the position of the total center-of-gravity of the robot, the velocity of the total center-of-gravity of the robot, the weighted mean values of the position and the velocity of the total center-of-gravity, and a divergence component.

23. The gait generating system for a mobile robot according to claim 15, wherein the mobile robot is a legged mobile robot equipped with a plurality of legs extended from its body, and the predetermined state amount includes at least one of the position of the body of the robot, the velocity of the body, the posture angle of the body, the angular velocity of the posture angle of the body, the weighted mean values of the position and the velocity of the body, the position of the total center-of-gravity of the robot, the velocity of the total center-of-gravity of the robot, the weighted mean values of the position and the velocity of the total center-of-gravity, and a divergence component.

* * * * *